United States Patent
Zhang

Patent Number: 5,818,131
Date of Patent: Oct. 6, 1998

[54] LINEAR MOTOR COMPRESSOR AND ITS APPLICATION IN COOLING SYSTEM

[76] Inventor: Wei-Min Zhang, 36 Brooksby Street, London, United Kingdom, N1 1HA

[21] Appl. No.: 855,437

[22] Filed: May 13, 1997

[51] Int. Cl.$^6$ ............................. H02K 33/12; F04B 35/04
[52] U.S. Cl. ........................... 310/15; 310/90.5; 417/417; 128/DIG. 3
[58] Field of Search .................................. 310/14, 23, 30, 310/34, 90.5, 15, 17; 417/241, 417; 128/DIG. 3; 92/162 R, 162 P; 335/281, 296, 297, 299, 306

[56] References Cited

U.S. PATENT DOCUMENTS

| | | | |
|---|---|---|---|
| 3,274,795 | 9/1966 | Gray | 335/266 |
| 3,858,135 | 12/1974 | Rotors et al. | 310/14 |
| 3,891,874 | 6/1975 | Fowle et al. | 310/14 |
| 4,210,409 | 7/1980 | Child | 417/241 |
| 4,404,503 | 9/1983 | Ward et al. | 310/37 X |
| 4,507,579 | 3/1985 | Turner | 310/23 |
| 4,726,640 | 2/1988 | Iwana et al. | 310/90.5 X |
| 4,763,032 | 8/1988 | Bramm et al. | 310/90.5 |

FOREIGN PATENT DOCUMENTS

| | | |
|---|---|---|
| 2603348 | 3/1988 | France . |
| 407726 | 12/1924 | Germany . |
| 125233 | 8/1982 | United Kingdom . |
| 81/00794 | 9/1980 | WIPO . |
| 94/14173 | 6/1994 | WIPO . |

*Primary Examiner*—Thomas M. Dougherty
*Assistant Examiner*—Judson H. Jones
*Attorney, Agent, or Firm*—Samson G. Yu

[57] ABSTRACT

A compressor (10; 100; 200; 300; 500) with a build-in reciprocating motor, comprises a cylindrical housing (20; 120; 210; 510) with two ends thereof fitted with two opposing electromagnets (30; 130; 230; 530), each has a circular inner pole (36; 136) and a coaxial annular outer pole (34; 134). A free piston (50; 150; 250; 560; 600) is disposed in the housing between the two electromagnets, dividing the interior of the housing into two chambers (I, II). The piston carries permanent magnet (40; 140, 145; 561; 610), providing inner and outer poles (44, 46; 141, 146) which have conical surface portions (43, 49; 141, 146) complementary with the corresponding poles (34, 36; 134, 136) of the electromagnets. Sliding pole pieces (630 and 660) can be used to increase the stroke length and reduce the piston's total weight. Valves (61, 63, 65; 161, 165) are fitted to form one-way flow passage connecting the inlet and the outlet of the compressor. In operation, the complementary surfaces of the electromagnets and the permanent magnets form concentric forces which drive the free piston axially while keeping it magnetically suspended, so as to minimize the frictional resistance to the piston's movement and to reduce its wear to minimum. Buffer mechanisms, including air, spring and/or magnetic cushioning, are formed between the piston and each of the electromagnets to prevent direct physical impact between them. A movable support (280; 580) provides automatic adjustment of piston's stroke length in response to changes of output pressure. A circuit (285, 283, 212, 211, 221) is formed to circulate a lubricant for keeping the piston lubricated. Magnetic coupling arrangement (570, 545, 555) is made to further improve the compressor's energy efficiency. In application, a number of the compressors can be connected in series to build up a high pressure output.

31 Claims, 25 Drawing Sheets

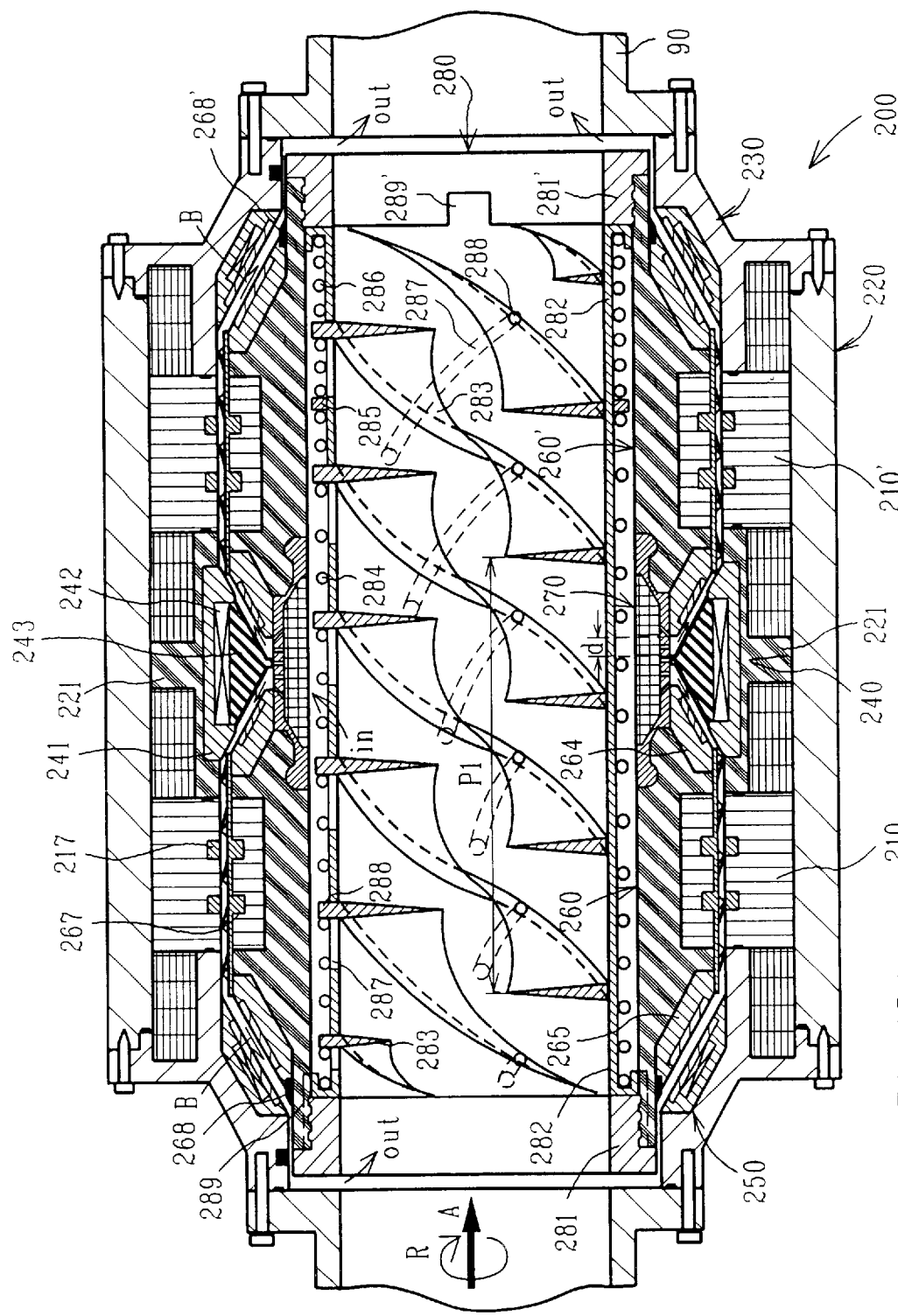

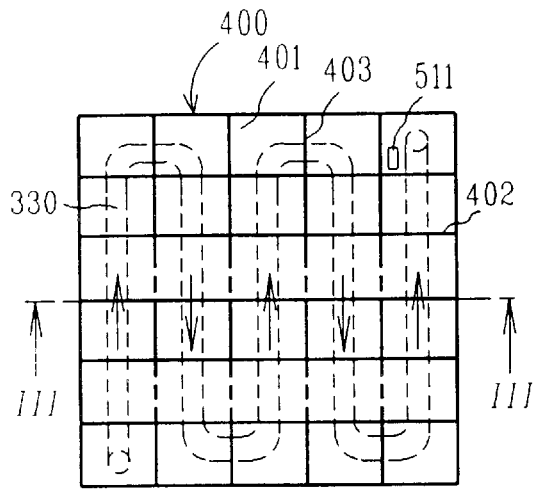
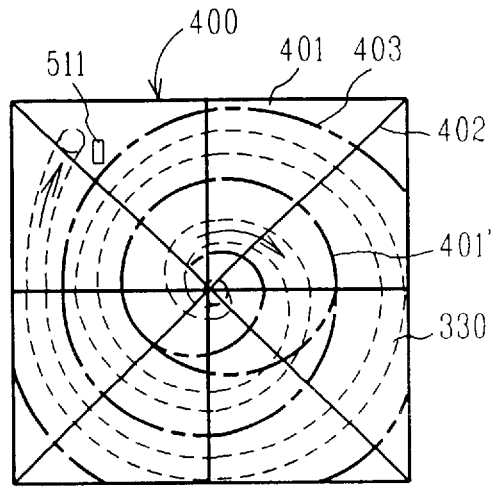
Fig. 23A　　　Fig. 23B
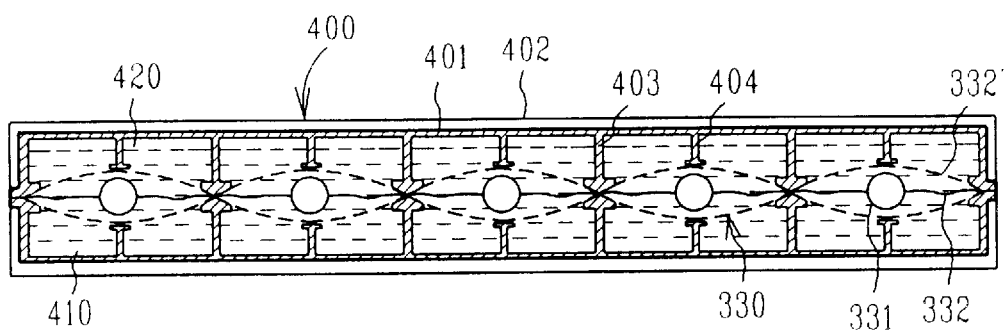
Fig. 23C

LINEAR MOTOR COMPRESSOR AND ITS APPLICATION IN COOLING SYSTEM

TECHNICAL FIELD OF INVENTION

This invention relates to a linear motor and a compressor incorporating such a motor. It also relates to a pump and a cooling system suitable for refrigeration or air-conditioning, using the compressor and pump.

BACKGROUND OF INVENTION

It is known that a conventional reciprocating compressor is driven by a rotary motor, in which a crank or cam mechanism is used to convert motor's rotational movements into reciprocating movements of one or more pistons. Such an compressor has the following drawbacks. Firstly, the arrangement is not efficient because its electric input has to drive a chain of mechanical parts, including unavoidably a motor rotor, a crankshaft, a piston-rod and a piston-head. Keeping such a chain of parts in operation per se consumes a lot of power before any useful work can be done to the working medium. Secondly, due to the conversion from rotary to reciprocating movements it is unavoidable that the piston-head is subject to sideways forces, which cause friction and wear and produce unwanted heat. To cope with this problem, it is necessary to incorporate further arrangements for supplying lubricant oil to the moving parts and keeping the mechanism cooled, which add more complications to the structure and further burden to the motor. Furthermore, due to the above reasons the parts used in such a compressor have to be made of high strength materials by precise machining processes, therefore high costs. Finally, the compressor, once built, has to work within a narrow range of rated working conditions with little flexibility to cope with changes of operation conditions or load.

It is also known that an axial flow pump having a propeller driven by a motor can produce an axial flow in a pipeline. The pipeline has to be angled so that the propeller can be fitted into the pipeline with the motor shaft extending through the wall of the pipeline at the angled position, otherwise a more complicated gear arrangement has to be used. Such arrangements make it difficult to arrange a pipeline to suit a pump, while on the other hand, a reliable sealing of the rotary shaft which passes through the wall of the pipeline is difficult to achieve but easy to wear out.

It is also known that conventional vapour-compression type cooling systems are responsible for serious damages to the environment. Generally speaking, the damages are in the following three main aspects. Firstly, these systems consume a huge quantity of power because they operate 24 hours a day for all the year round (in case of refrigerators or freezers) or for the whole season (in case of air-conditioners). This huge consumption contributes indirectly to the accumulation of greenhouse gases produced during power generation. Secondly, these systems use CFCs or HCFCs as refrigerant which cause direct damages to the ozone layer. Thirdly, a conventional system uses metal materials such as copper or aluminium for making thermally conductive components, i.e. condenser and evaporator, which consume natural resources.

SUMMARY OF INVENTION

It is, therefore, a first general object of the invention to provide a linear motor and a compressor which overcomes the above problems and disadvantages.

According to one aspect of the invention, there is provided a reciprocating motor and/or a compressor using such a motor, comprising: two opposing magnetic driving members with coaxial poles; a reciprocating member, serving as a piston in the compressor, with magnetic poles disposed movably between and coaxially with said driving members; and means for energising said driving members and/or reciprocating member to generate an alternating electromagnetic field therebetween; wherein said poles of each said driving member include an outer one of a first polarity and an inner one of a second polarity located within said outer one, and said reciprocating member has complementary poles arranged therebetween to form a push-and-pull driving force pair for said reciprocating member to reciprocate.

It is preferable that each driving member is an electromagnet having conical pole faces, and the reciprocating member has pole faces formed by permanent magnet, so as to provide concentric driving forces to suspend the reciprocating member magnetically.

The piston can have a permanent magnet with a radially arranged magnetic field and a shunt mechanism to regulate its magnetic flux to the driving members. Furthermore, sliding pole pieces can be arranged to improve the piston's flexibility and agility for a better energy efficiency. It is preferable to provide a lubricant circulating circuit in the compressor to keep the piston's sliding parts lubricated. Fluid dynamic and/or magnetic means can be used to cause the piston to rotate during its reciprocating movements, so as to improve its lubrication and reduce its wear. Also, buffer mechanisms can provide cushion effects to protect the reciprocating member at the end positions of its movements, including fluid cushion, spring cushion and/or magnetic cushion. Furthermore, the buffer mechanisms can also be used to balance the reciprocating member's movements in opposite directions to improve its energy efficiency. The driving members can have magnetic coupling means to selectively adjust the magnetic flux of each driving member according to the position of the reciprocating member. The mechanism can be powered by either AC or DC current. It further comprises sensor means which adjust the AC current or reverse the DC current in response to the movements of said reciprocating member to each end position. At least one driving member can be arranged in a manner that its position is adjustable in response to the output pressure to provide automatic compensation to load changes.

The fully "floated" piston reduces friction to ensure a long service life. In case of high pressure application, a plurality of the reciprocating compressors can be connected in series to build up output pressure, so a wide range of application requirements can be met by combining standard modules.

Furthermore, it is a second general object of the invention to provide an axial-flow pump/marine propeller which overcomes the problems of the conventional products.

According to another aspect of the invention, there is provided an axial flow pump/marine propeller comprising: a hollow body, a stator carried by the body and defining a cylindrical inner space, a hollow rotor member fitted in the inner space with means for propelling fluid therethrough, and electromagnetic means for generating a rotational magnetic field to drive the rotor to rotate; wherein the rotor is supported by a suspension bearing for providing rotational and thrust bearing when the rotor rotates. The bearing can include means sensitive to the rotor's rotational and/or axial movements to retain it at a balanced position. Preferably, the bearing includes at least one spiral vane formed on the outer surface of the rotor for producing a peripheral flow of a fluid in the gap between the stator and the rotor when the rotor rotates.

Also, there is provided a suspension bearing mechanism for levitating a rotary member during its rotation. Advantageously, the mechanism includes magnetic axial registration and suspension arrangements formed by annular magnets. Also, it can include flow dividing means for keeping the rotary member self-balanced during its rotation. Furthermore, there is provided an axial flow pump/marine propeller having fluid driving means formed by one or more flexible spiral blades which can be compressed axially in response to the changes of power input or working load. The axial flow pump can have two coaxial driving members with driving means in opposite spiral directions so that when they have opposite rotational movements, they cancel each other's swirling effects. The central driving member can be supported by a pivot bearing. Also, a conical impeller can be fitted to promote the axial flow. The pump can be used as an electric generator or flow-meter.

For the sack of easy understanding, the axial flow pump/marine propeller of the invention is to be described hereinbelow as a pump unless specifically stated otherwise.

Furthermore, it is a third general object of the invention to provide a cooling system, and components for it, which are environment-friendly, i.e. easy to manufacture, use environmentally less hazardous materials, and operate with high energy efficiency.

According to one aspect of the invention, there is provided a cooling system comprising: a mechanism for transferring heat from a cold-generating member to a heat-rejecting member, and a circuit thermally engaged with said heat-rejecting member; wherein a coolant with at least one evaporable component is used to circulate in said circuit which has means for promoting evaporation of said evaporable component. Preferably, the coolant comprises at least one endothermic salt for cooling said heat-rejecting member by endothermic dissolution. The system can have a brine circuit for dissipating cold energy. Preferably, said brine is also used as a cold storage material when there is low cost electricity. Environmentally benign refrigerant, such as carbon dioxide, ammonia or propane, can be used in the system to avoid environment damages.

Also, there is provided a compression assembly comprising: a plurality of compressors serially connected for a refrigerant to be compressed progressively therein, and a coolant passage for circulating a coolant fluid; wherein said gas passage and coolant passage are thermally coupled to each other so that the heat generated in the compressed refrigerant can be absorbed and carried away by said coolant.

Further, there is provided a circuit for cooling a heat source by circulating a coolant of at least two components, said circuit comprising: a heat absorbing portion adapted in thermal coupling with said heat source, and a heat dissipating portion in fluid communication with said heat absorbing portion; wherein said heat absorbing portion is arranged to have an upper part with a coolant outlet, an lower part with a coolant inlet, and an intermediate zone engaging said heat-generating member, said intermediate zone has baffling means for stabilising a temperature gradient in the coolant flow from said lower end to said upper end so that at least one component of the coolant solution can evaporate and be circulated to said heat dissipating portion via said outlet. Preferably a thermoelectric member is fitted in the intermediate zone to provide an elevated temperature to promote said evaporation. A relatively low pressure can be formed in said heat dissipating portion and/or a vapour compressor can be used to promote said evaporation.

Furthermore, there is provided a defrosting arrangement comprising a thermoelectric member with one thermal pole coupled to a cold-generating member and the other thermal pole coupled to a heat exchange member, and a unit for control electric supply to said thermoelectric member to reverse its heat transfer direction, thereby selectively changing the operation of said arrangement from a frost accumulating mode to a defrosting mode.

Finally, there is provided a method of operating a cooling system having a brine circuit, comprising steps of: (a) setting a control unit for selecting one of two operation modes in response to the availability of low-cost electricity; (b) operating the system in a first mode when said low-cost electricity is not available, in which the brine is cooled to a first temperature range and circulated; and (c) operating the system in a second mode when said low-cost electricity is available, in which the brine is cooled to a second temperature for it to be frozen so as to store latent cold energy therein. It is to be understood that the terms "low cost" materials or electricity are used here in the sense of both low commercial and ecological costs, i.e. causing less environment damages and being easily recyclable or renewable.

BRIEF DESCRIPTION OF DRAWINGS

The above described objects, aspects, features, advantages, and structural and functional details of the invention will become apparent in the following description of the embodiments with reference to the accompanying drawings, in which:

FIGS. 15A and 15B are sectional views of a fourth embodiment of the pump/marine propeller;

FIGS. 23A to 23C are different views showing details and different arrangements of the heat storage tank 400 shown in FIGS. 21 and 22A;

DETAILED DESCRIPTION OF PREFERRED EMBODIMENTS

Firstly, details of the embodiments according to the first general object are described. In the following description, the illustrated embodiments are described as compressors for the sake of easy understanding. The same concept can be used for a liquid pump or a vacuum pump. The term compressor should be interpreted as covering all these applications, unless stated otherwise specifically. Also, the same concept can be used to build a linear motor by simply removing valves and seal members.

Figure 1:
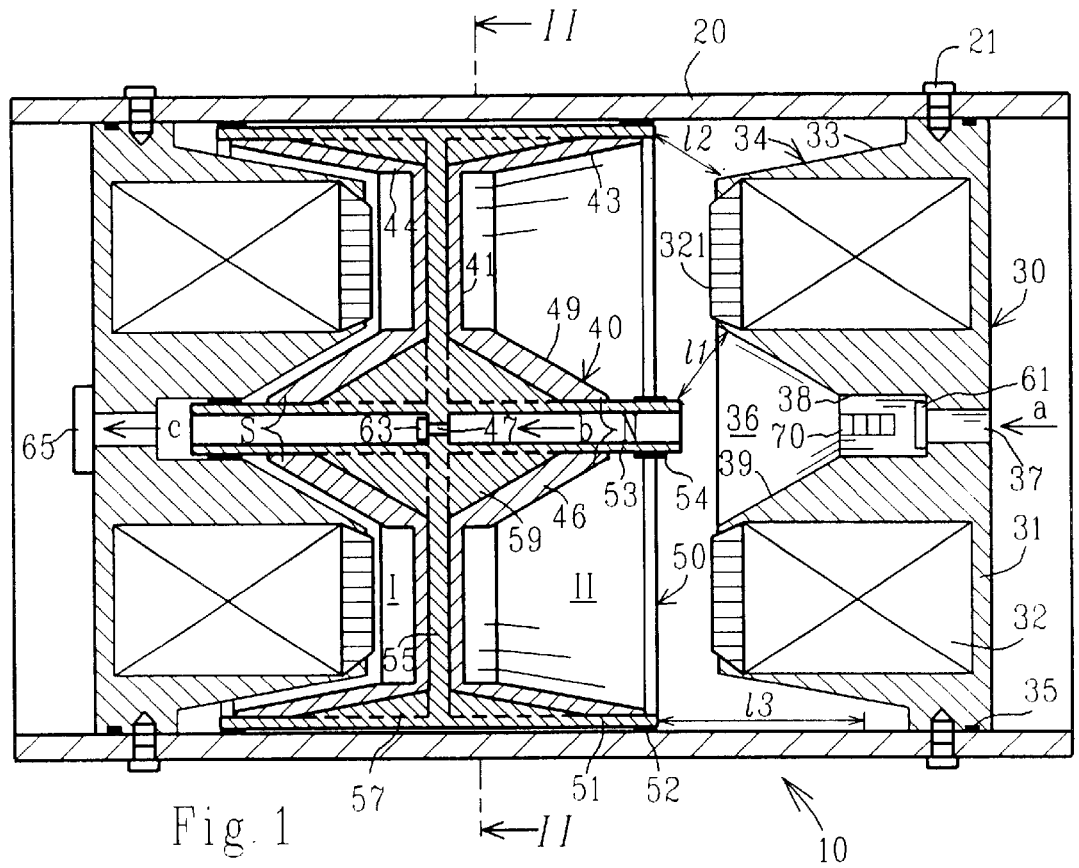
FIG. 1 is a cross-sectional view taken along the central axis of a compressor according to a first embodiment of the invention.
Figure 2:
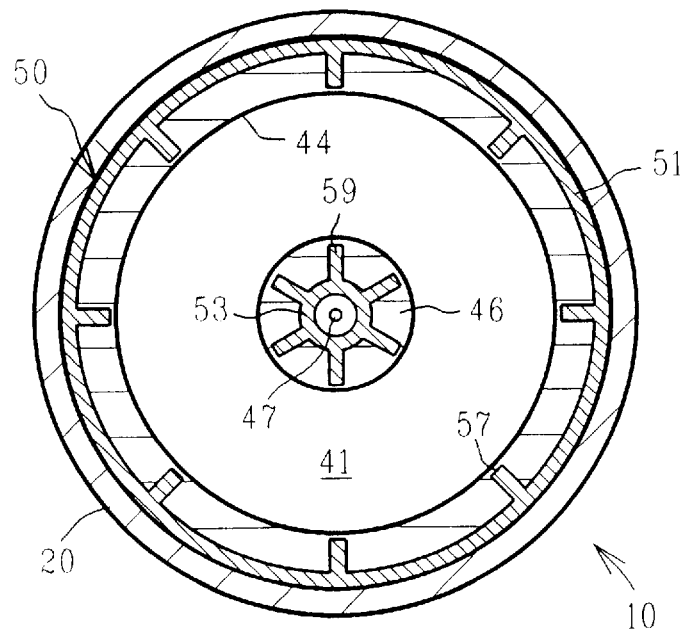
FIG. 2 is a cross-sectional view taken along the plane B—B shown in FIG. 1.

FIGS. 1 and 2 show a compressor 10 having a housing 20, two electromagnets 30 fitted to two ends of the housing, and a free piston 50 in the housing, dividing its inner space into chambers I and II. The housing 20 is a cylinder which can have external ribs and/or fins to improve its mechanical strength and heat dissipation, especially when it is used as a gas compressor. It can be made of any non-magnetic material, such as plastics, fibre-reinforced resin, ceramics, aluminium, copper, brass, stainless steel etc. In case of the application as a gas compressor in a cooling system, metals are preferable for good heat dissipation. A low friction and wear resistance coating (not shown) can be formed on its inner surface by conventional methods.

The two electromagnets 30 have basically the same structure, i.e. each has an annular core with an outer pole 34 and a coaxial inner pole 36, which is connected to the outer pole by a connection portion 31. A toroidal coil 32 is fitted in the space between the poles 34 and 36. The pole 34 has an outer surface which is formed by a conical portion 33, and a cylindrical portion engaging the inner surface of the housing 20. Two seals 35 are fitted to this cylindrical portion to ensure an airtight engagement between the electromagnet 30 and the housing 20, which are secured by fixing members 21. The inner pole 36 has a central hole formed by a small through-hole portion 37, a cylindrical middle portion 38 and a conical portion 39 extending towards the free end of the pole 36. An one-way valve 61 or 65 is fitted to one end of the through hole 37 of each electromagnet 30 to cover the hole 37 forming an one-way fluid communication between the exterior of the housing 20 and each of the chambers I and II. The leading edges of the poles 34 and 36 are separated by a nonmagnetic member 321, which can be a part of the bobbin for the coil 32. The core of the electromagnets 30 can be made of any "soft" magnetic material, such as iron, steel or ferrite, and it can be made by moulding, casing or die-pressing, using particles of magnetic material held together by a bonding agent, e.g. a resin.

The piston 50 is axisymmetrical and also symmetrical about the central plane perpendicular to its axis, i.e. its left-hand half is a mirror image of its right-hand half. The piston 50 has a supporting frame formed by a non-magnetic material, including an outer cylinder 51, an inner tube 53 and a central disc 55 connecting the outer cylinder 51 to the inner tube 53. The material of the disc 55 is thicker than that of the cylinder 51 or tube 53, and a number of ribs 57 and 59 are formed to further strengthen the connection between the cylinder 51 and the disc 55 and between the tube 53 and the disc 55. The central disc 55 is perpendicular to the central axis of the cylinder 51 and the tube 59, which are coaxial. At each end of the outer surface of the cylinder 51 there is a seal 52 made of low friction and wear resistance material for forming an airtight engagement with the inner surface of the housing 20. To further reduce the frictional resistance between them, the seal 52 can have by a number of spiral ridges. At the central point of the disc 55 there is a through hole 47 which forms the only fluid communication between the two chambers I and II, via an one-way valve 63. The piston 50 carries, on each side thereof, a permanent magnet 40 formed in a structure which is generally complementary to the configuration of the two poles of a corresponding electromagnet 30. That is to say that each permanent magnet 40 has a central pole 46 with a conical outer surface portion 49 corresponding to the conical surface portion 39 of the electromagnet's inner pole 36, and an annular outer pole 44 with a conical inner surface portion 43 corresponding to the conical outer surface portion 33 of the outer pole 34. The central and outer poles 46 and 44 are magnetically connected to each other by a magnetic layer 41 formed on the non-magnetic disc 55, so that the two magnets 40 are magnetically insulated from each other. As shown in the left-hand side of FIG. 1, the permanent magnet 40 is attracted towards the electromagnet 30 at left end of the compressor 10 so that their corresponding poles are brought close to each other. The leading end of the tube 53 has a seal 54 which forms an airtight contact with the middle portion 38 of the inner pole 36 of the left-hand electromagnet 30.

The supporting frame of the piston 50 can be formed by moulding, casting or die-pressing. Preferably it is the same material as that of the housing 20 so that they have the same thermal expansion during operation. The magnets 40 can be formed by a separate casting or pressing step after the supporting frame has been made. It is preferable to use rare-earth material for forming the magnets 40, so as to have high magnetic strength and low weight. The magnets 40 can be formed as a thin layer on the frame or even as a film of magnetic coating, as long as they provide a strong enough magnetic field and the required general configuration. An extra coating of a magnetic conductive material can be formed on the surface of the central tube 53 and the cylinder 51 before the magnet is formed on top of it, to make their axial ends magnetically conductive.

Since both the housing 20 and the supporting frame of the piston 50 are non-magnetic, the two pairs of the permanent magnets 40 and the electromagnets 30 are magnetically separated. The polarity of the poles of the electromagnets 30 and the permanent magnets 40 are arranged in a manner that when the two electromagnets are energised at the same time, they provide a combined push-and-pull force onto the piston 50, forcing it to move towards one end of the compressor 10 (the left-hand end as shown in FIG. 1). When the current is changed, the push-and-pull force will also reverse to force the piston to move to the other end. One way of arranging the magnetic polarity is to keep the inner pole 36 of the two electromagnets 30 at the same polarity while the two inner poles 46 of the magnets 40 are in different polarity. For example, the left-hand one is S and the right-hand one is N as shown in FIG. 1.

The conical portions 33 and 39 of the electromagnets 30 and the conical portions 43 and 43 of the magnets 40 have the effects of reducing the air gaps between them, while at the same time allowing a relatively long stroke length for the piston movement. As shown in FIG. 1, the lengths of the maximum air gaps are $l_1$ and $l_2$, respectively, while the stroke length is $l_3$, which is significantly longer. When the piston is at an end position, one pair of magnets would have a minimum gap, as the left-hand pair shown in FIG. 1. At this status the pair would have the maximum repelling force when the current through the coil 32 is reversed. This would compensate the weak attraction of the other pair which have the maximum gap. As the gap increases at one side of the piston the other side decreases so the combined push-and-pull force by the two sides would be stable. The arrangement has the effects of reducing magnetic leakage to the exterior of the housing for the flux is evenly distributed around the central axis. This will in turn form an evenly distributed concentric driving force between each magnet pair. By such a driving force, the piston is magnetically suspended and axially aligned, therefore the friction between the piston 50 and the housing 20 is minimized. Since the piston 50 is the only movable component in the compressor, the above "floating" effects of the annular magnetic field would prolong the service life of the compressor significantly.

The fluid circuit through the compressor 10 is formed by three one-way valves 61, 63 and 65 which connect the inlet (right-hand end as shown in FIG. 1) to chamber II, then to chamber I and finally to the outlet. The valves 61, 63 and 65 can be any conventional type, such as flap valve, disc valve or ball valve.

As shown in FIG. 1, the seal 54 at left-hand free end of the piston's central tube 53 also serves as a valve to stop fluid flow from the chamber I to the outlet valve 65, therefore the remaining space of the chamber I becomes a "dead" space because the fluid in the space is trapped and cannot flow out. This is designed to work as a cushion to prevent the piston 50 from hitting the electromagnet 30 at the left-hand end of the compressor. The seal 54 at the other end of the piston works in the same way in an opposite stroke of the compressor. The size of this buffer space depends on whether the fluid is gas or liquid, and it can be easily adjusted by changing the axial position of the seals 54 along the tube 53. In case of a gas compressor, the space needs to be relative larger to allow the gas trapped in the space to be compressed so the seals 54 are positioned at leading edge of each end of the tube 53, and the space would work as a gas spring, while in case of a liquid pump, the space can be smaller and the seal 54 can be positioned backwards or even omitted because the narrow gap between each end of the tube 53 and the inner wall of the corresponding hole 38 would be small enough to restrict flow rate of the liquid so as to effectively buffer the piston's movement. When the two strokes of the piston 40 are subject to different resistance, e.g. due to higher output pressure which produces higher resistance to the output stroke, the seals 54 at the two opposite ends of the tube 53 can be located at different positions relative to the respective leading edge have different buffering effects which balance the piston's movement.

It is clear now that although the piston 50 itself is made of light material and carries highly fragile permanent magnets, it is nevertheless fully protected and highly durable due to the evenly distributed driving forces and the fluid buffer arrangement.

For control purposes, a sensor 70 is fitted in the through-hole 38 of each electromagnet 30, for detecting the position of the piston 50. The sensor 70 can be simply a series of electric contacts which are connected when in contact with the seal 54 which is made conductive. The sensor can also be capacitive or magnetic type, which produces sensing signals without physical contact. The output signals from the sensor 70 are used to control the current to the coil 32 of the electromagnet 30 in response to a change of load. For example, when the electromagnet 30 is powered by an AC input, the signals from the sensor 70 are compared with the phase of the input current to see whether the current is too large or too small. In case the input current is too large, the magnetic driving force to the piston would also be large so the piston 50 would move faster and arrive at the end position earlier, while when input is too small, the magnetic force would be small and move the piston slowly, so it arrives at the end position later, or even not arrive at the position of the sensor at all. This would be checked by the sensor, and the input current can be adjusted accordingly. When DC power is used, the signals from the sensors 70 are used to switch the DC input, causing the piston to reciprocate.

Figure 3:
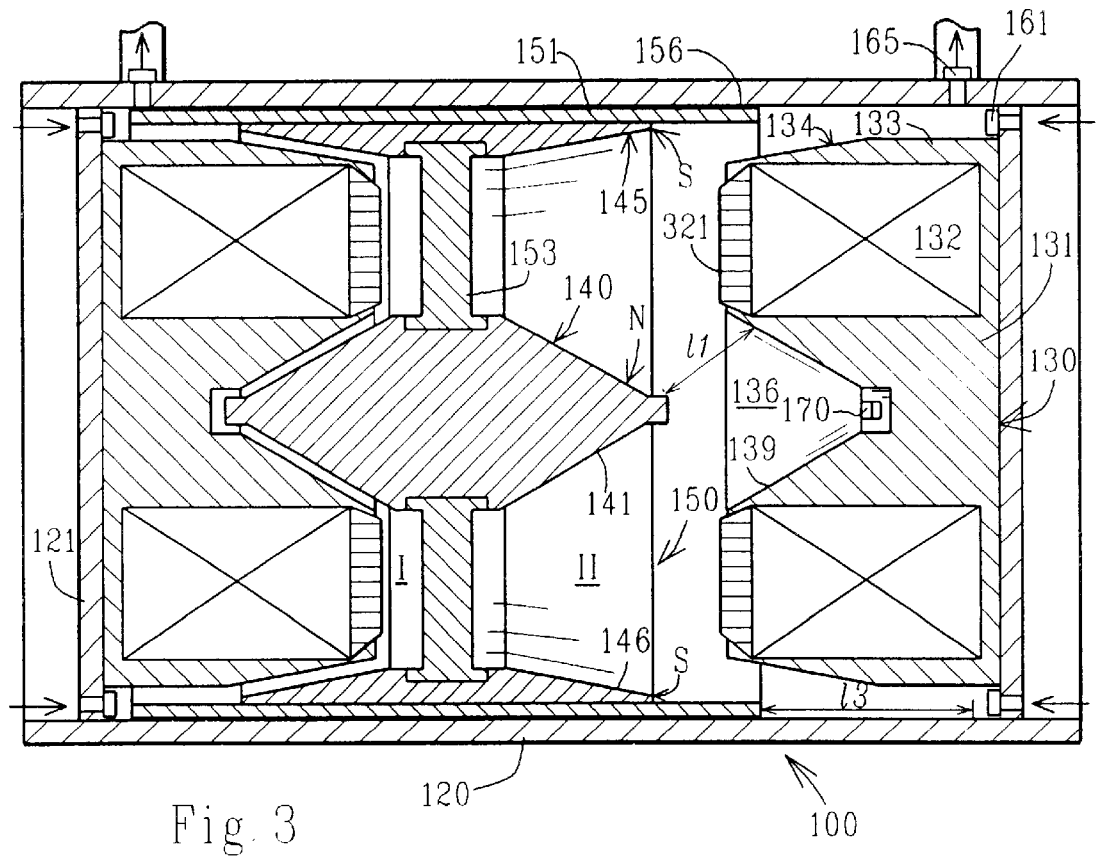
FIG. 3 is a cross-sectional view of a compressor of a second embodiment.

FIG. 3 shows a compressor 100 has a cylindrical housing 120, two electromagnets 130 fixed via supporting plates 121 to each end of the housing and a piston 150 between the two electromagnets.. Inlet valves 161 are also fitted on the plates 121. Each electromagnet 130 has an annular core providing two poles 134 and 136 and a coil 132 fitted between them. A central conical cavity 139 is formed in the central pole 136. The piston 150 has a central permanent magnet 140 having two conical tips, a cylindrical permanent magnet 145 and an annular member 153 of non-magnetic material for securing the tow magnets 140 and 145 together. The magnet 145 is surrounded by a cylinder 151 which is non-magnetic, preferably the same material as the housing 120. The cylinder 151 has seals 156, similar to that of the first embodiment. The tips of the permanent magnet 140 are shaped to fit into the central cavity 139 of the electromagnets 130 when the piston is attracted to one of the electromagnets. The pole direction of the two electromagnets 130 are arranged in the same manner, that is to say, when an electrical current is supplied to each of the coils 132, the central poles 136 are both North. In this case the piston 150 is attracted to left as shown in FIG. 3 and repelled from right. By changing the current direction in the coils 132, the piston moves back. The inlet valves 161 are arranged at two ends so that when the piston 140 is moved from right to left, the valves 160 at right end are opened to let the fluid into the chamber II while the outlet valve 165 at the left end is opened to let the fluid to be forced out of the chamber I. When the piston arrives at the end position as shown in FIG. 3, the leading edge of the outer cylinder 151 blocks the outlet valve 165 to form a buffer space, similar as the first embodiment. In this embodiment the second permanent magnet 145 is not essential for its operation. When the magnetic field provided by the magnet 140 is strong enough, the magnet 145 can be replaced by a magnetically conductive member. This embodiment provides a well balanced operation in the sense that the piston's left and right strokes have exactly the same fluid compression function, and are subject to the same moving resistance. When two identical compressors 100 are arranged end to end along the same axis, and their pistons are made to move always in opposite directions, e.g. by connecting the electric supply in opposite direction, the pair would provide a highly balanced arrangement in which the impacts by the two pistons always cancel each other so the pair as a whole cause virtually no vibration. Obviously, the arrangement would be highly beneficial to the applications where low noise and vibration are required.

Figure 5:
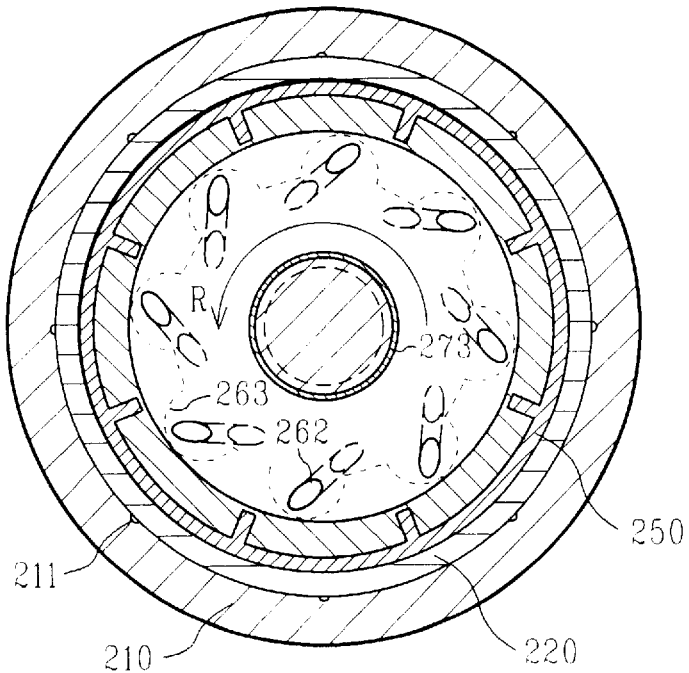
FIG. 5 is a cross-sectional view taken along the plane C—C shown in FIG. 4.
Figure 4:
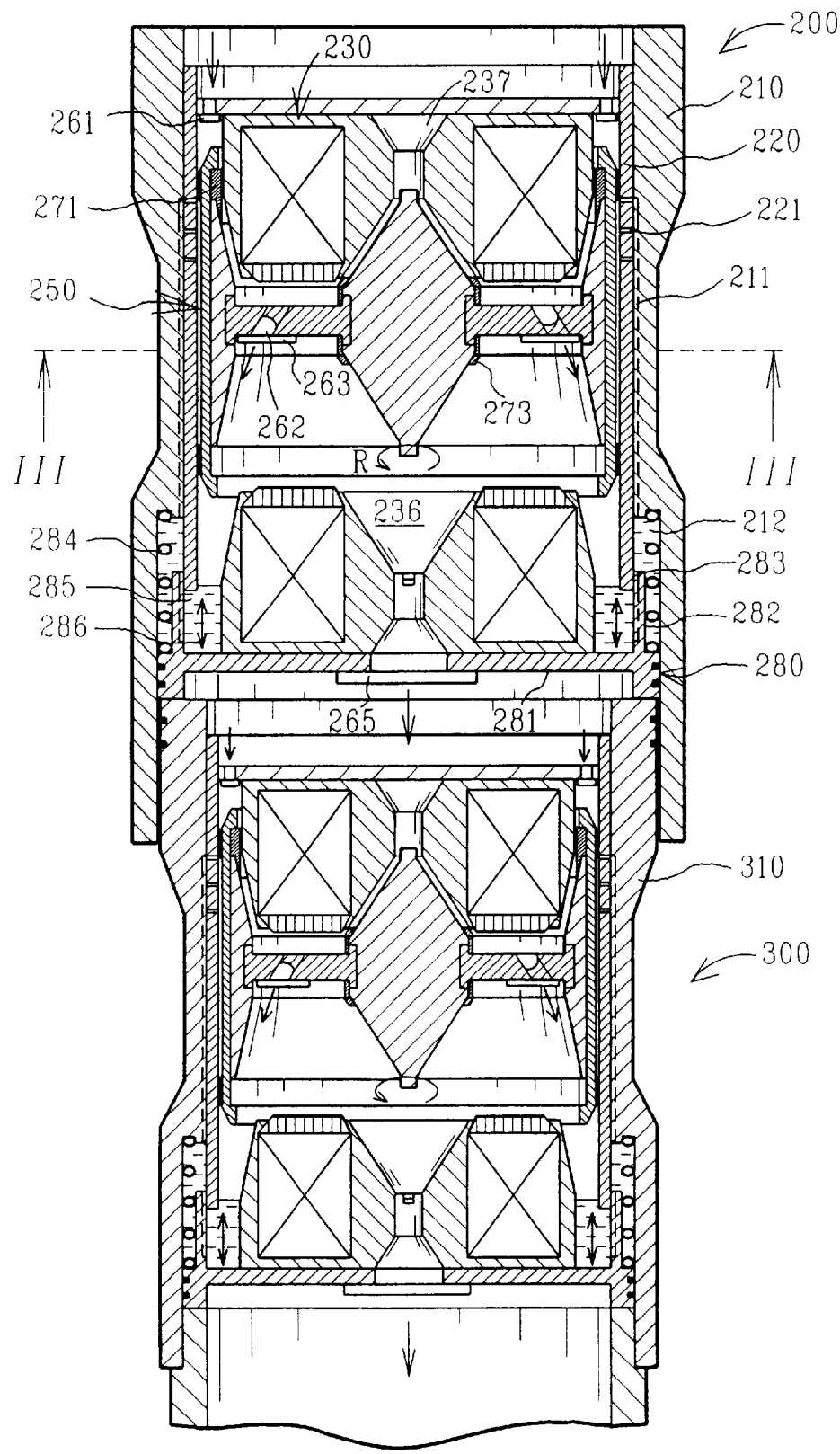
FIG. 4 is a cross-sectional view of a compressor assembly according to a third embodiment.

FIG. 4 shows a compressor assembly according to a third preferred embodiment. FIG. 5 on sheet 2 of the drawings is the cross-sectional view taken along the plane C—C in FIG. 4, showing details of the piston 250. In FIG. 4, the assembly is a multistage arrangement formed by two serially connected compressors, 200 and 300, which are of the similar structure. The difference between them is that the first stage compressor 200 is one size larger than the next stage compressor 300, so a gaseous working medium can be progressively compressed. If the working medium is liquid, the chain should be made of pumps of the same size for the liquid is not compressible, but the operating principles are the same. Obviously, further stages of compressors can be connected for a higher output pressure, and adapter members can be used between compressors. In the following description, only the details of the compressor 200 are explained. The compressor 200 has a tubular housing 210 with a lining member 220, two electromagnets 230, a free-piston 250 and a movable support 280. The electromagnets and the piston work in the similar manner as the previous embodiment.

In FIGS. 4 and 5, the lining member 220 is secured inside the housing 210 by thermal fitting, i.e. by fitting a cool lining 220 into a heated and expanded casing 210 so that when it cools down the housing grips the lining firmly. The one-way fluid communication through the compressor 200 is formed by the inlet valves 261, piston valves 263 and an outlet valve 265. As shown in FIG. 5, the piston valves are formed by a number of angled through-holes 262 formed on the piston disc, directing fluid flow in outward tangential directions. A flap member indicated by the dot line encourages such outward flow, causing the piston to rotate, as shown by the arrow sign R.

Between the piston 250 and each of the two electromagnets 230 and 230', a buffer mechanism is formed by seals 271 and 273. When the piston 250 moves upwards to the end position as shown in FIG. 4, the seal 271, on the inner surface of the piston cylinder, acts with the outer cylindrical surface of the top electromagnet 230 to form an annular gas cushion between the leading edge of the piston cylinder and the inlet valves 261 on the supporting plate of the top electromagnet 230. At the same time, the inner seal 273 engages the central cavity of the electromagnet 230 to form a central gas cushion in the top cavity 237. These two cushions protect the piston from hitting the upper electromagnet 230. When the piston moves downwards to the lower end, the other inner seal 273 would block the outlet valve 265, forming a cushion between the piston disc and the top end of the lower electromagnet 230'. Lubricant 285 collected around the electromagnet 230' would also have buffer effects.

The movable support 280 carries the lower electromagnet 230' and the outlet valve 265. The support 280 has a base 281, a sleeve 282 and a biasing spring 284, which urges the base away from the piston. The leading edge of the sleeve 282 forms a sliding contact with the lower edge of the lining 220, and defines a chamber 212, in which is located the spring 284. The sleeve 282 also serves as a stopper, when it contacts with the top edge of the chamber 212, to define the upmost position of the support 280. The range of movement for the support 280 is shown by the double-arrow sign 286. In operation, when the output pressure is low, e.g. during the start-up of the compressor, the spring 284 urges the support 280 downwards against the leading end of the next stage compressor 300, and at this position the piston has the longest stroke, so the compressor has the largest throughput. As the output pressure is gradually built up, the total force on the bottom surface of the base 281 would eventually become larger than the biasing force of the spring 284, so the support 280 would be forced to move upwards. This movement reduces the stroke length therefore reduces the output by each stroke. Furthermore, due to the reduced stroke length, the average air gap in the magnetic circuit is also reduced, with the effect of an increased driving force, producing a higher output pressure. When there is a big enough drop of the output pressure, e.g. due to an increased release of the compressed medium at the system outlet, the support 280 would immediately resume its original position under the biasing force of the spring 284, then the compressor is ready to work at its maximum output rate. That is to say, the compressor changes automatically from a low-pressure high-output operation to a high-pressure low-output operation, or vice versa. This automatic adjustment becomes more beneficial when a number of compressors are connected serially in a multistage arrangement, in which each of them can adjust its own rate to match with the others in the chain so that the load is evenly distributed over the whole chain.

A lubricant 285 used in the compressor 200 keeps the outer surface of the piston 250 and the inner surface of the lining 220 lubricated, and it would end up in the collecting area around the lower electromagnet 230'. A lubricant circulating circuit is formed by the grooves 283 formed on the inner surface of the sleeve member 282, the chamber 212, the grooves 211 formed between the housing 210 and the lining 220, and the through-holes 221 which return the lubricant back to the piston. The grooves 211 and 283 are made small enough so that the lubricant is sucked into the grooves mainly by capillary effects. When the piston 250 moves downwards, the increased pressure on the liquid surface would help the liquid into the chamber 212 then to enter the capillary grooves 211, while on the other hand the holes 221 would be exposed to the low pressure side of the piston, allowing the liquid to come out of the grooves. When the piston moves upwards in a return stroke, the valves 263 would open, causing the piston to rotate as mentioned above, therefore to spread the lubricant evenly around the whole inner surface of the lining 220, forming a film of lubricant between the outer surface of the piston and the inner surface of the lining 220. This film also improves the sealing around the piston. The holes 221 are positioned so that they are covered when the piston is at its upper position, not causing gas leakage between the two sides of the piston.

Figure 6A:
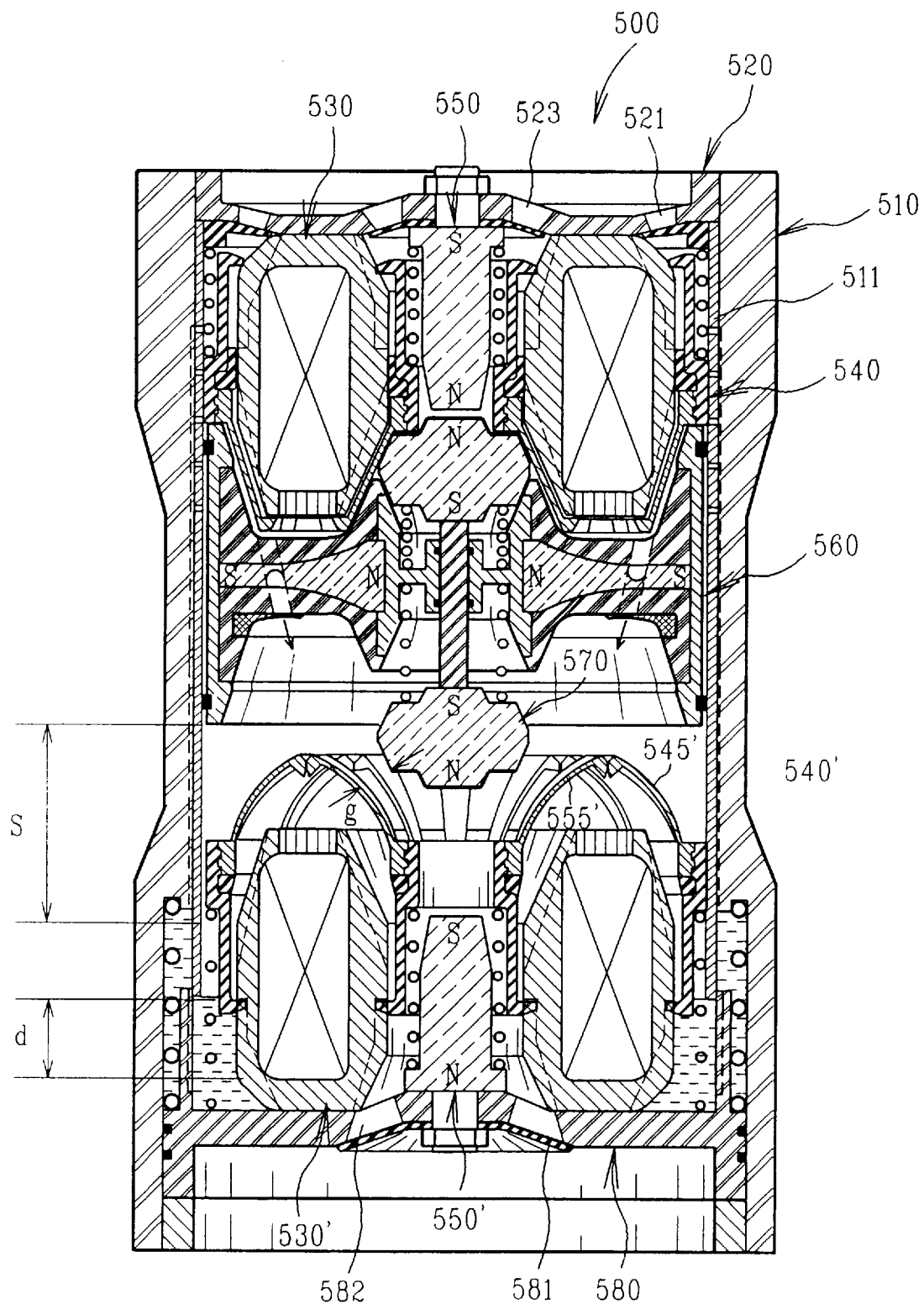
FIGS. 6A and 6B are cross-sectional views of a compressor according to a fourth embodiment.
Figure 6B:
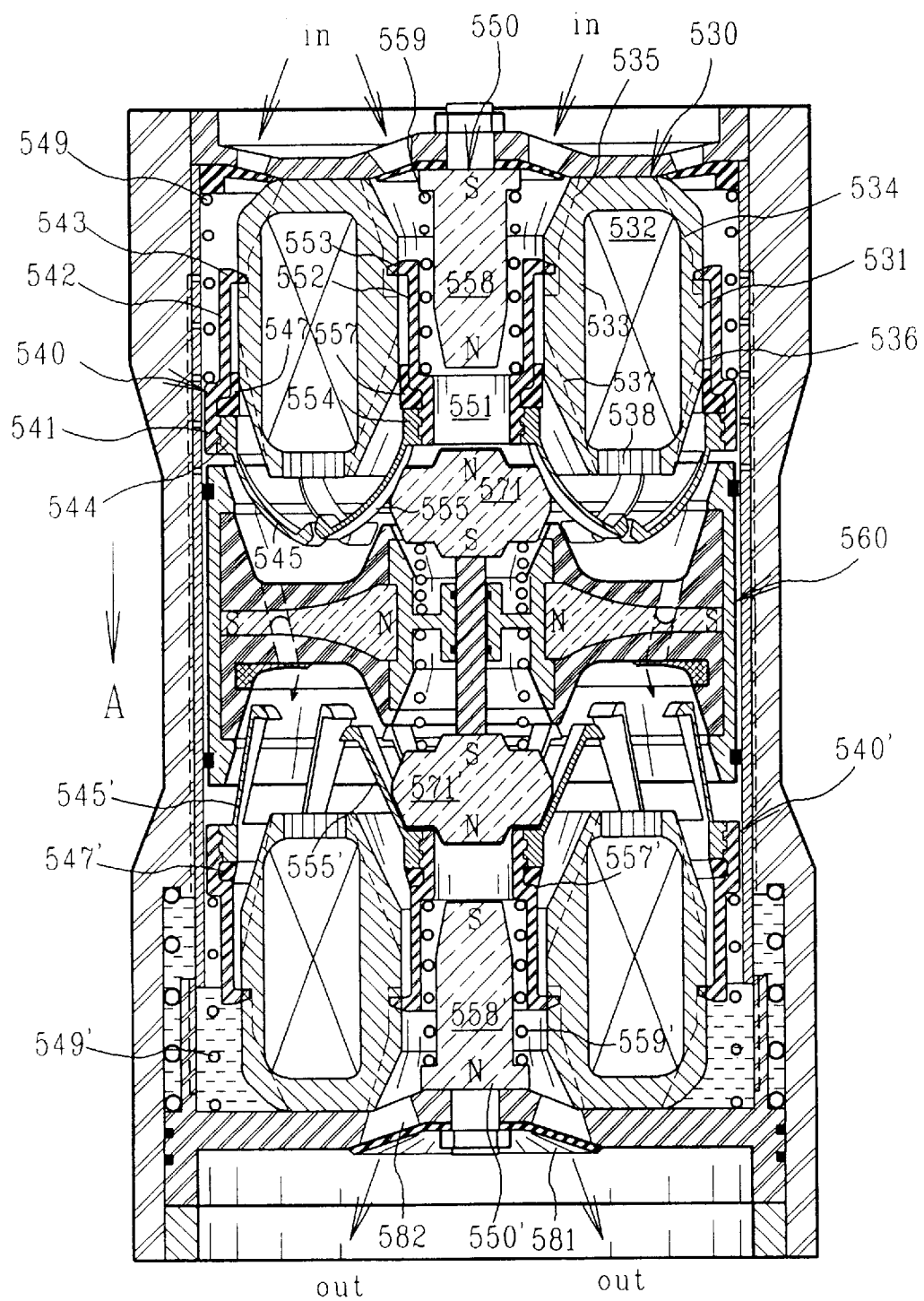
Figure 7A:
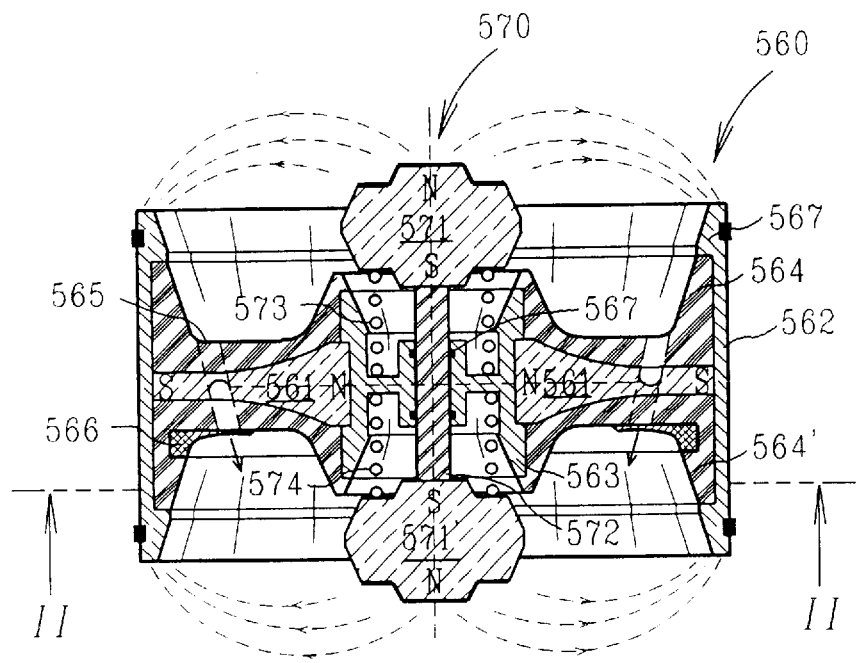
FIGS. 7A and 7B are sectional views of the piston 560 shown in FIGS. 6A and 6B.
Figure 7B:
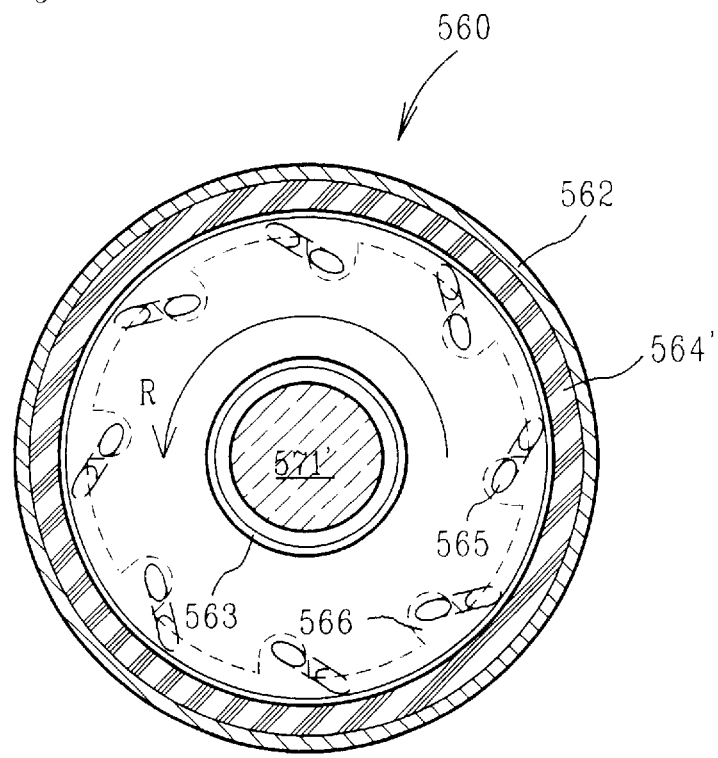
Figure 8A:
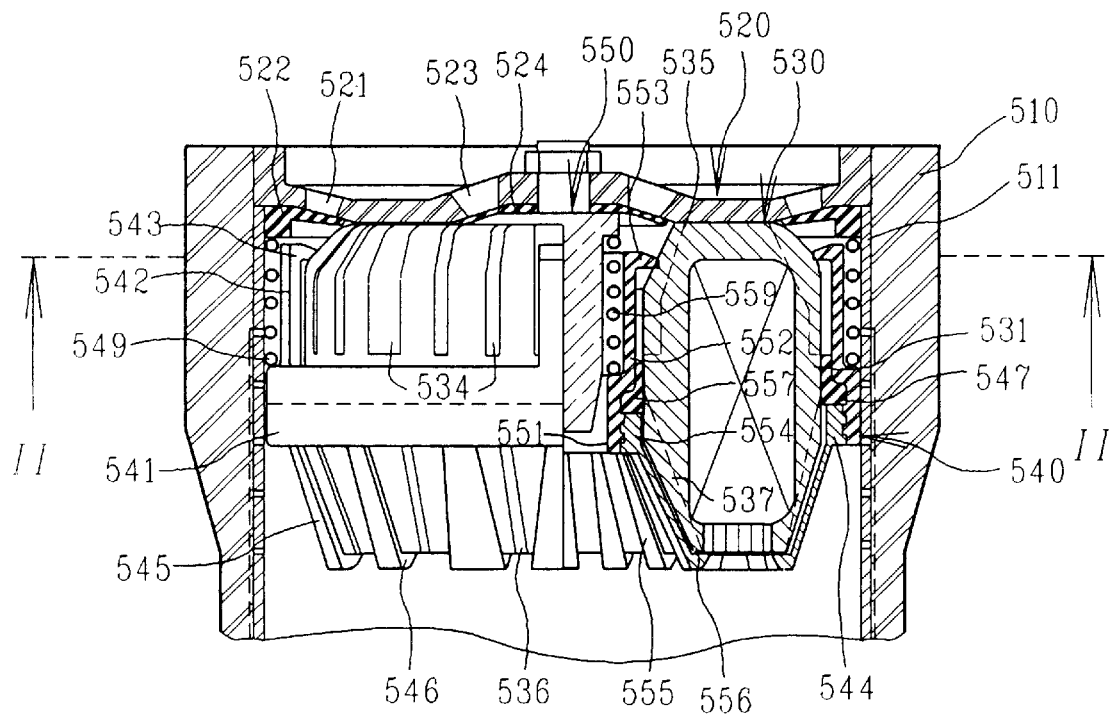
FIGS. 8A and 8B are sectional views of the electromagnet 530 and its cushion arrangements 540 and 550, as shown in FIGS. 6A and 6B.
Figure 8B:
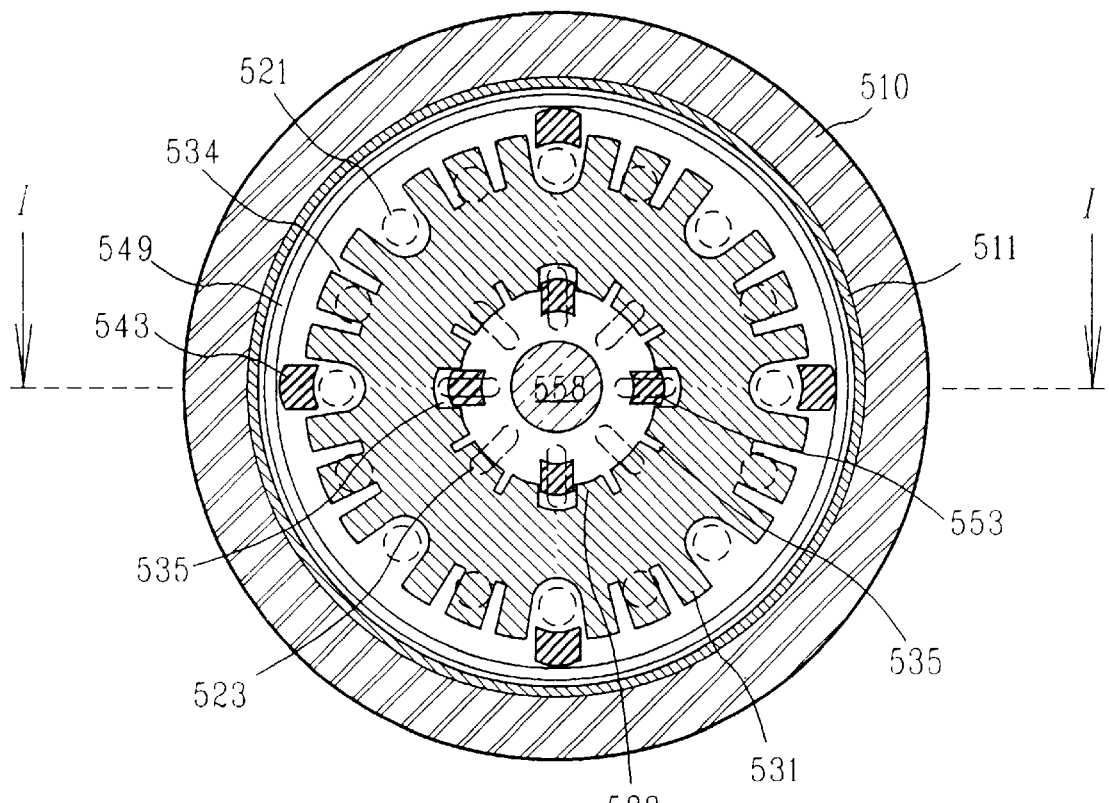

FIGS. 6A to 8B show a compressor 500 according to a fourth embodiment. FIGS. 6A and 6B are cross-sectional views showing the positional changes of the different parts of the compressor during its operation. FIG. 7A shows more details of the piston 560, and FIG. 7B is the cross-sectional view taken along the plane B—B in FIG. 7A. Similarly, FIGS. 8A and 8B show the details of the electromagnet 530 and buffer arrangements 540 and 550.

In FIG. 6A, the compressor 500 has a housing 510 with a lining 511 similar to that shown in FIGS. 4 and 5, a free piston 560 with an active magnetic shunt mechanism 570, two electromagnets 530 and 530', one supported by a plate 520 and the other by a movable support 580. Each electromagnet has outer and inner buffer mechanisms 540 and 550, or 540' and 550' for cushioning the piston 560. The end plate 520 and the movable support 580 also provide the fluid inlets 521 and 523 and outlets 582, respectively. The lining member 511, which is made of non-magnetic steel, and the movable support 580 are similar to and operate in the same way as the members 220 and 280 shown in FIG. 4 to provide lubricant circulation and automatic stroke length adjustment. When the compressor 500 is used to work with a liquid, e.g. it can be used as a hydraulic pump for high pressure and leak-free applications, the piston can be lubricated by the working medium therefore the lubricant circulation arrangement would not be needed. In this case further outlet holes can be formed close to the outer periphery of the support 580 to match the holes 521 on the top end plate 520.

When analysed from the viewpoint of the fluid compression, the piston's down strokes suck in fluid through the inlet holes 521 and 523 on the top plate 520, and at the same time drive the fluid already in the compressor out of the outlet holes 582 in the bottom support 580. In contrast, the upward strokes merely force the fluid from upper side of the piston to its lower side without producing any output. That is to say, the two strokes are unbalanced with most of the actual work done by the downward strokes and with its upward strokes simply as return movements. Such unbalanced piston movements reduce the compressor's energy efficiency. In order to tackle this problem, arrangements are made in the compressor 500 to balance the two types of strokes by converting the kinetic energy of the upward piston movements into energy reserve in different buffer mechanisms, which is then released during the piston's downward strokes. These arrangements include the inner and outer buffers 540, 550, 540' and 550' associated with the two electromagnets 530 and 530' and the springs in the shunt mechanism 570.

In FIG. 7A, the piston 560 has a main permanent magnet 561 in the shape of an annular disc. The polarity of the magnet 561 is in radial direction, i.e. with its outer periphery as the south S, and the inner periphery as the north N. The thickness of the disc 561 increases from its outer periphery inwards to ensure that the inner and outer pole faces are of the similar sizes and the cross sectional area perpendicular to the magnet flux maintains unchanged along the flux direction to avoid local flux saturation. A cylindrical magnetic member 562 is secured to the outer periphery of the disc 561, serving as the pole piece for the outer pole and a generally tubular pole piece 563 is secured to the inner pole, so as to form generally radially directed magnetic flux between them, as shown by the dash lines in FIG. 7A.

The disc 561 is sandwiched between two protection member 564 or 564' to protect this relatively brittle member from being damaged by mechanical shocks and also to hold the disc and its two pole pieces together. The two members 564 and 564' can be formed by injection moulding, preferably by using gasified plastics or foamed rubber, after the disc and the pole pieces having been assembled so as to form an integrated structure of good mechanical strength and light weight. The members 564 and 564' also define smooth surfaces which closely match with the pole faces of the two electromagnets, to reduce any "dead space" between the piston faces and the driving electromagnets. The member 564' also has a groove fitted with a valve member 566. As also shown in FIG. 7B, a number of angled through-holes 565 are formed in the disc 561 and the protection members 564 and 564', which are covered by the valve member 566 for causing the piston 560 to rotate in direction R, similar to the previous embodiment.

The inner pole piece 563 has a central supporting part 567 which carries a magnetic shunt mechanism 570. The shunt 570 is formed by two permanent magnets 571 and 571' connected together by a non-magnetic bar 572. The bar 572 is movably supported by the part 567 which has seals to prevent any leakage through the sliding engagement between them. Two springs 573 and 574 are each used between the part 567 and one of the magnets 571 and 571' to provide biasing forces. Low friction bushing is used for the springs to allow the shunt to rotate relative to the piston. The springs 573 and 574 are made of magnetic steel so they also provide magnetic connection, via the inner pole piece 563, between the magnet 571 or 571' and the disc magnet 561. The polarity of the shunt magnets are arranged in a way that both of them are magnetically attracted by the inner pole of disc magnet 561. The leading face of the shunt magnet 571 or 571' is covered by a soft layer, such as rubber, to protect it.

The piston's magnetic circuit has two branches, each includes an air gap between a leading edge of the pole piece 562 and the pole face of the magnet 571 or 571' for acting with a corresponding electromagnet, and the main magnet 561 serves as the common route shared by the two circuit branches. In FIG. 7A, the magnetic shunt 570 is at a neutral position relative to the disc magnet 561, where the two circuit branches have equal flux distribution indicated by the dash lines. However, this balanced flux distribution is unstable because a very slight axial movement of the shunt 570 relative to the disc 561 would increase the flux in one branch at the expense of the other. In other words, from the viewpoint of the flux distribution the shunt 570 serves as a magnetic switch which decides by its axial position that which circuit branch would have a bigger share of the total flux. This arrangement is also used as a buffer mechanism by having a natural status predetermined for the magnetic switch by the two springs 573 and 574 which are arranged to form a push-and-pull pair, i.e. the upper spring 573 is a compression one which tends to expand and push the magnet 571 upwards and away from the disc magnet 561, while the lower spring 574 is an extension one which tends to contract and pull the magnet 571' towards the disc magnet 561. When not subjected to external forces the shunt 570 would end up at a position where the magnet 571' engages with the lower end of the inner pole piece 563, pushing the other magnet 571, via the bar 572, to a position far away from the top end of the inner pole piece 563. At this position the flux of the lower branch would be much larger than that of the upper branch. In operation the piston has to overcome the biasing forces of the springs 573 and 574 in its return strokes and then release the energy during its output strokes. Furthermore, the axial movement of the shunt 570 switches the main magnetic flux from one end of the piston to the other so as to act with electromagnets 530 or 530' in a more efficient way, as to be described later.

FIG. 8A is a partial sectional view with the right half of the electromagnet 530 and the outer buffer 540 shown in section and their left half in front view. It also shows details of the top end plate 520 and the inner buffer 550. Details of the corresponding members 530', 540' and 550' at the bottom end of the compressor are basically the same, unless to be described otherwise.

More specifically, the end plate 520 is secured onto the housing 510 and it carries the electromagnet 530 and its buffer mechanisms. A series of outer inlet holes 521 and a series of inner inlet holes 523 are formed on the end plate 520, corresponding to the outer periphery and the central hole of the annular electromagnet 530, and being covered by flap member 522 or 524 to form one-way valves. Details of the flap members 522 and 524 are not shown in FIG. 8B but they are similar to the flap member 566 shown in FIG. 7B. The new features of the electromagnet 530 are the angled slots 536 and 537 formed on its outer and inner conical pole faces, and the slots 534 and 535 formed on the opposite end, all in axial direction. The slots are formed to facilitate the fluid flow from the holes 521 and 523 into the compressor chamber and at the same time helping to cool the electromagnet 530 and to reduce eddy currents in the core material. As also shown in FIG. 6B, that the slots 534 and 536 on the surface of the outer pole 531 are not connected to one other, neither the slots 535 and 537 on the surface of the inner pole 533. On each of the surface a narrow band free of any slots remains between the two sets of slots, which co-operates with a seal member 547 or 557 of the two buffer 540 and 550 to provide air cushion effects.

Associated with the electromagnet 530 are the outer buffer 540 surrounding it and an inner buffer 550 in its central hole. The buffer 540 includes a cushion ring 541 biased downwards by an expansion spring 549. The ring 541 has a number of retaining fingers 542 extending in axial direction, each having a hooked tip 543 fitted into one of the slots 534 to define the range of the buffer's movement by the length of the slots 534, as shown in FIGS. 6A and 6B. The ring 541 with its finger members 542 is made of a non-magnetic and rigid material, such as aluminium or plastics, to provide good mechanical strength. The ring 541 carries a flux coupler 544 made of a magnetic material, which is in the shape of a ring carrying a number of fingers 545 each with a hooked tip 546. The fingers 545 are made of flexible and resilient material so that the fingers can bend easily when attracted by magnetic force. The tips 546 are rigid and they also have the function of limiting the buffer's upward movement by engaging the leading edge of the outer pole 531. The fingers 545 are configured to fit closely to the conical pole face of the outer pole 531 when the cushion ring is in the contracted position, as shown in FIG. 8A. Shallow groves can be formed on the conical surface so that the fingers 545 can fit into them to provide a smooth pole face to match with the complementing face of the piston 560, as mentioned above. The sealing ring 547 is clamped between the rings 541 and 544, to form an air cushion when it engages the annular band on the outer pole 531.

Similar to the outer buffer 540, the inner buffer 550 has a cushion ring 551 of a non-magnetic and rigid material, biased by a spring 559. The ring 551 has a number of retaining fingers 552 each having a hooked tip 553 fitted into one of the slots 535 to define its movement. A flux coupler 554 has a number of resilient fingers 555 each with a hooked tip 556 to match with a corresponding tip 546 of the outer buffer 540. A sealing ring 557 is fitted between the rings 551 and 554, for forming an air cushion in the central hole of the electromagnet 530. The inner buffer 550 also includes a permanent magnet 558 with a polarity repulsive to that of the shunt magnet 571 for providing magnetic cushion to the piston 560. The operations of the buffers 540 and 550 are to be explained below.

Now the operations of the compressor 500 are to be described with reference to FIGS. 6A and 6B, in which different positions of the piston 560 are shown together with the changes of the cushion and driving mechanisms.

Firstly, the operation of the buffer mechanisms is explained in details. FIG. 6A shows that the piston 560 is moved to its up end position where it is well cushioned by the two buffers 540 and 550, which provide air cushion by the effects of the seals 547 and 557, spring cushion by the compressed springs 549 and 559 and magnetic cushion by the central magnet 558 which expels the shunt magnet 571. In FIG. 6B, the piston 560 is in the middle of its downward stroke, as indicated by the arrow A. At the this particular position, in addition to the magnetic driving force by the electromagnets, the piston's outer cylinder pole piece is pushed downwards by the outer cushion ring 541 and the shunt 570 is forced down by the inner buffer 550. The piston is moving to the bottom end, where the main cushion effect will be provided by the resistance of the compressed fluid, which is being forced out through the outlet holes 582, together with the effects of the buffers 540' and 550' at the end of the movement. In addition to these, the lubricating liquid surrounding the lower outer periphery of the electromagnet 530' also helps to buffer the piston's final movement, therefore air cushion effects are not provided by the buffers 540' and 550', i.e. their rings 547' and 557' do not have sealing effects.

Since the working load of the piston's upward strokes is smaller than that of the downward strokes, as mentioned before, the upper cushion springs 549 and 559 are selected to be stronger than the springs 549' and 559'. That is to say, the piston's upward strokes are powered basically by the push-and-pull force of the electromagnets alone and the piston's upward kinetic energy is converted into the elastic energy of the springs 549 and 559 for helping the piston's down stroke. Further compensation is made by the permanent magnets 558 and 558', which are arranged with the permanent 558 opposing the piston's upward movement while the magnet 558' attracting its downward movement, forming another push-and-pull pair. Finally the springs 573 and 574 of the shunt mechanism 570 also urges the piston downwards, as mentioned above. Due to these compensating arrangements, a significant portion of the push-and-pull force by the two electromagnets for piston's upward strokes is converted to make the piston's downward strokes more powerful, therefore effectively balanced the piston's movements.

In FIG. 6A, the piston 560 is driven to the top where the upper branch of the piston's magnetic circuit is included into the magnetic circuit of the electromagnet 530. At the same time, the magnetic circuit of the bottom electromagnet 530' is "closed" by the magnetic fingers 545' and 555' of the buffers 540' and 550' because the fingers are raised by springs and magnetised by the electromagnet to attract one another until they bend and their tips contact one another. This magnetic coupling increases the electromagnet's self-induction, therefore reduce the electric current passing through its coil at this particular moment. Since at this moment the distance between the electromagnet 530' and the piston is large, the electromagnet has no important influence to the piston's movement. In other words, electric power consumption by the electromagnet 530' is saved when it is lest effective. In Pig. 6B, here the electric currents to the electromagnets are reversed, the piston 560 is driven downwards so the lower shunt magnet 571' contacts the buffer 550' first to break the magnetic coupling between the fingers 545' and 555'. Once they are separated, the fingers 545' are attracted to the lower edge of piston's outer pole piece to form a more effective magnetic connection between the outer pole of the electromagnet 530' and the outer pole of the piston, and the fingers 555' are attracted to the shunt magnet 571'. Such contacts form direct connection between the lower branch of piston's magnetic circuit and the electromagnet 530', causing stronger attraction between them. On the other hand, once the piston has moved away from the top electromagnet 530, it makes enough room for the fingers 545 and 555, attracted to one another by their magnetic polarity, to bend until they touch one another. When this happens, the magnetic flux from the electromagnet 530 is effectively "turned off" from the piston 560.

It is clear from the above description that by incorporating the magnetic coupling mechanisms, each of the electromagnets is automatically "turned off" when it no longer has effective contribution in driving the piston, therefore the consumption of electric energy at such ineffective moments is significantly reduced and the compressor's overall energy efficiency is improved. Furthermore, the arrangement also improves magnetic connection between the piston and the electromagnet by reducing the average size of the air gaps between them, i.e. increasing the magnetic flux and the effectiveness of the magnetic connection. This is shown by the facts that when in operation the piston has a stroke length S shown at the left side of FIG. 6A, while the maximum air gap between the shunt magnet 571' and the magnetic fingers 555' is merely g, shown in FIG. 6A, which is much smaller compared with S. In addition, each of the buffer mechanisms 540, 550, 540' and 550' has a movable range of d, which is slightly less than a half of the stroke length S. That is to say, for most of time in operation the piston 560, including the shunt 570, is in direct contact with at least one of the buffers which serves as pole extension to act between the piston and electromagnets.

Figure 9A:
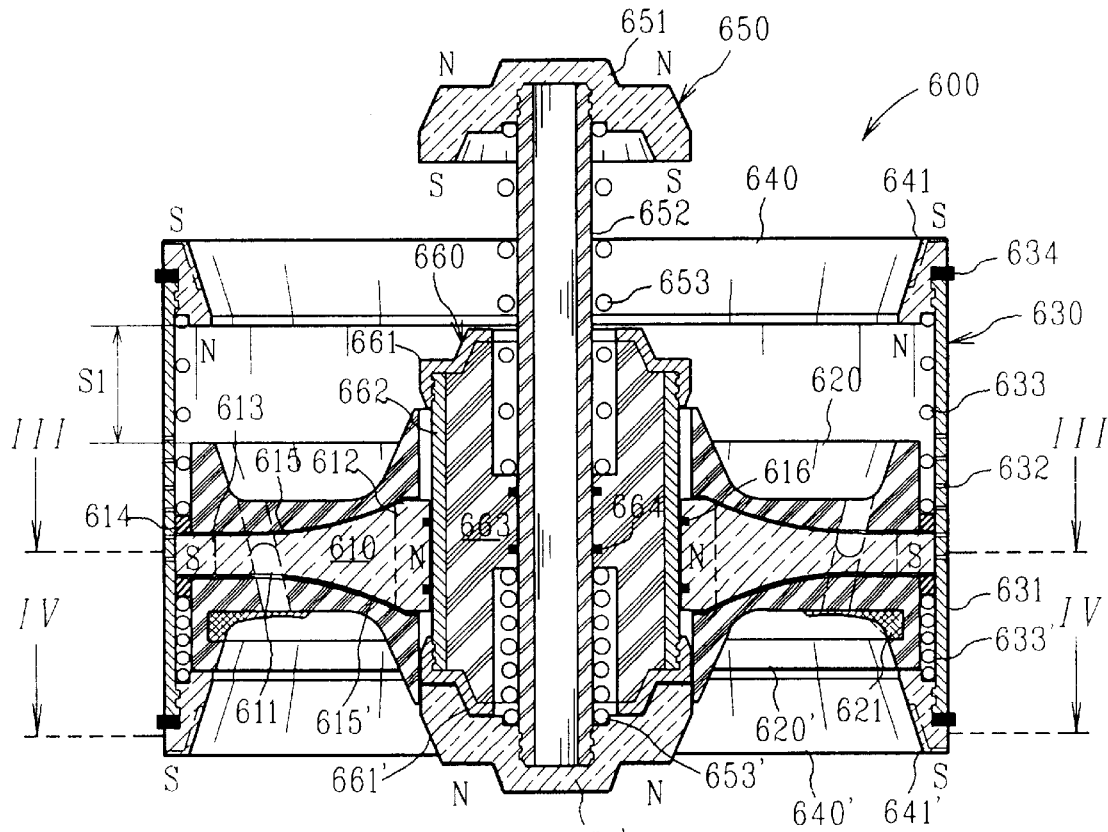
FIGS. 9A and 9B are cross-sectional views of a piston according to a fifth embodiment.
Figure 9B:
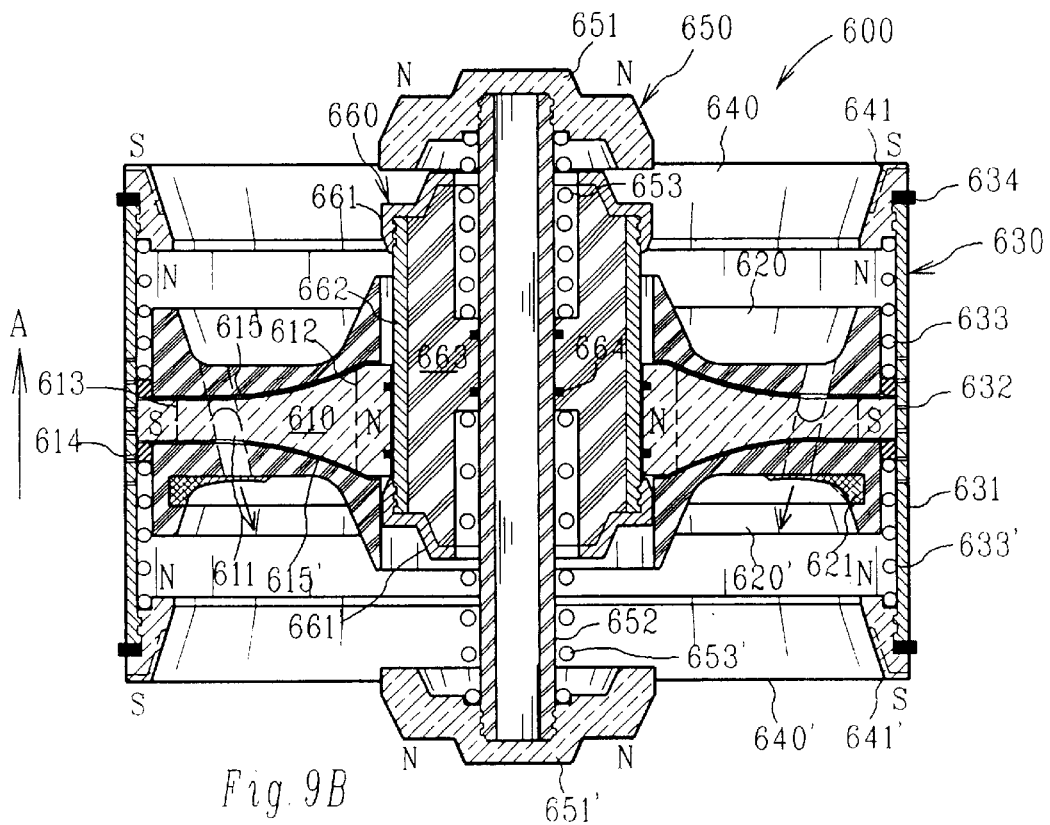
Figure 10A:
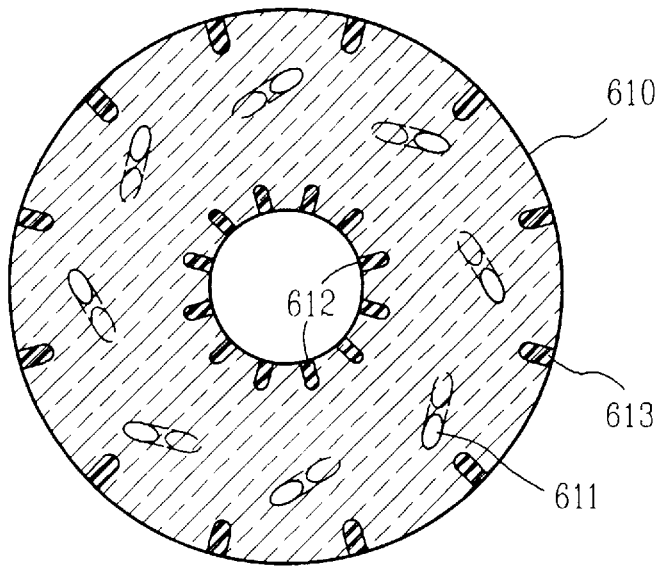
FIGS. 10A and 10B are sectional views of a magnet disc 610 and a magnet ring 640' taken along the planes C—C and D—D, respectively, as shown in FIG. 9A.
Figure 10B:
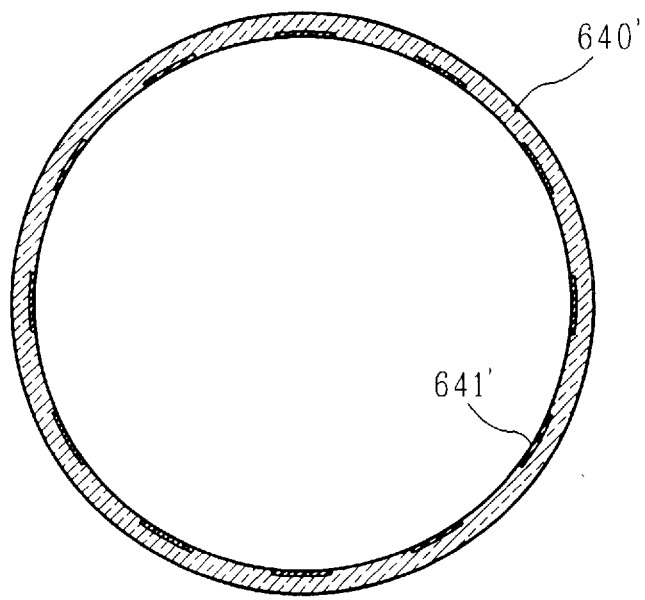

FIGS. 9A to 10B show a piston 600 according to a fifth embodiment. This piston can be used in the compressor of the previous embodiment to replace the piston 560, and it is suitable when the compressor's dimensions are large. FIGS. 9A and 9B are cross-sectional views showing the positional changes of its different parts during its operation. FIG. 10A is the cross-sectional view taken along the plane C—C in FIG. 9A, showing details of a magnet disc 610, and FIG. 10B is the cross-sectional view taken along the plane D-D in FIG. 9A, showing details of a magnet ring 640'.

In FIGS. 9A and 9B, the piston 600 has an annular permanent magnet disc 610 sandwiched between protection layers 620 and 620'. An outer pole piece 630 engages the outer periphery of the disc 610 and an inner pole piece 660 engages its inner periphery. The inner pole piece 660 carries an active magnetic shunt 650 which works in a similar way as that of the previous embodiment. More specifically, as also shown in FIG. 10A, the disc 610 has a number of inner channels 612 and outer channels 613 formed in axial direction on its inner and outer periphery. The protective layers 620 and 620' on two sides of the disc are made by moulding plastic or rubber material to cover both sides and they are connected to each other via these channels to form an integrated body with the disc "caged" inside. This structure protects the brittle disc and also defines angled valve holes 611 covered by a valve member 621.

Now back to FIG. 9A, the outer pole piece 630 includes a cylinder member 631 made of a soft magnetic material, which is arranged to have sliding engagement with the outer periphery of the disc 610 fitted with two sliding seals 614. Two permanent magnet rings 640 are each fitted to an end of the cylinder 631, to provide a secondary magnet in each of the two circuit branches of the piston's magnetic circuit. A seal 634 is clamped between each ring 640 or 640' and the cylinder 631. A pair of springs 633 and 633' are each fitted between a ring 640 and a seal 614, to keep the disc 610 biased relative to the rings 640. The inner pole piece 660 includes a magnetic cylinder 662 engaging the inner periphery of the disc 610, two magnetic end caps 661 each fitted to an end of the cylinder 662, and a non-magnetic filling stuff 663, such as gasified plastics, filed in the cylinder 662. The shunt 650 includes two permanent magnet caps 651 and 651' connected to each other by a non-magnetic tube 652, which is supported on the inner pole piece 660 by the filling stuff 663 and sealed by seals 664. A pair of springs 653 and 653' keep the shunt 650 biased relative to the pole piece 660. The magnet cap 651 or 651' is shaped to have a leading surface providing pole face matching with that of an electromagnet as shown in FIGS. 6A and 6B, and a back pole face matching that of the cap 661 or 661'. The magnet caps 651 and 651' form the secondary magnets at the other end of the piston's two circuit branches. The polarities of the main and secondary magnets are arranged, as shown in FIGS. 9A and 9B, to make each secondary magnet being attracted by the main magnet 610. When in operation, the disc 610 would slide along the cylinder 631 towards one end, under the effects of the two electromagnets. FIG. 9A shows the disc at its lower end, where the lower protection member 620' engages both the magnet ring 640' and the magnet cap 651' to define a smooth piston face matching that of the pole faces of the lower electromagnet (not shown). At this position, the inner pole of the disc 610 is magnetically connected to the cap 651' via the cylinder 662 and the cap 661' of the inner pole piece 660, so is the outer pole to the magnet ring 640' via the cylinder 631 and the spring 633'. From the viewpoint of the lower electromagnet, the piston 600 behaves as one powerful permanent magnet.

As shown in FIG. 9B, once the electric currents in the two electromagnets are reversed, the piston assembly is forced to move upwards, as indicated by an arrow A to the left. At the same time, since the disc 610 is no longer attracted by the lower electromagnet, it is forced by the springs 633 and 633' to move upwards along the cylinder 631. Similarly, the inner pole piece 660 is also forced upwards by the springs 653 and 653' until the upper edge of the cap 661' engages the disc 610 and carries the same to move with it. Since the inner pole piece 660 is very light and it is not subjected to any significant fluid resistance to its movement, it can move much faster than the disc 610, so as to effectively switch the disk's main magnetic flux from its lower branch to its upper branch, as described before in relation to the previous embodiment. Again, these springs can be arranged to provide more downward biasing forces for balancing the piston's movements. Also the cushioning and magnetic coupling for the piston 600 can be the same. In operation, the disc 610 with its protection layers 620 and 621' can slide a distance S1 along the outer pole piece 630, in additional to the piston's stroke length S, as shown in FIG. 6A. That is to say, the piston's effective stroke length is increased without increasing the pole pieces' movements, so the piston has better agility in response to the driving forces by the electromagnets. The reduced movements of the outer pole piece 630, which contributes to a very large portion of the piston's total weight due to the steel cylinder 631, ensure that the overall energy efficiency is improved. To keep the piston parts lubricated, a number of small holes are made through the cylinder 631, so that lubricant can enter the gap between the outer periphery of the disc 610 and the inner surface of the cylinder 631. Furthermore, a fabric layer 615 is sandwiched between each side face of the disc 610 and a corresponding protection layer 620 or 620' to provide capillary passages for the lubricant to enter the gap between the inner periphery of the disc 610 and the inner pole piece 660.

Finally, an additional feature is that the leading pole face of the magnet rings 640 and 640' has a number of channels 641 and 641' as shown in FIG. 10B, which match the channels 536 formed on the outer pole face 531 in FIG. 6B. During the operation, these channels have the effects of causing the piston to rotate so that they can align with one another, in a way similar to the toothed patterns in the magnetic core of a stepping motor. By arranging the channels on the two rings 640 and 640' at staggered annular positions, they will ensure, together with the effects of the angled valve holes 611, continued rotation of the piston 600 during its reciprocating movements, so as to improve its lubrication and reduce its wear. The channels 641 are filled by a non-magnetic material to define a smooth piston face.

Industrial Applicability

The reciprocating mechanisms disclosed above can be used in many different applications. Due to the tubular structure of the embodiments, they are especially advantageous in meeting the needs of an existing system design or hardware pipeline because such a compressor or pump can be easily fitted into an existing system at any position that a driving force is needed, without any need to re-design the system or change the existing hardware. Standard models can be connected serially or in parallel to meet a wide varieties of requirements to output pressures and/or flow rates. The tubular structure of the compressor makes it easy for heat dissipation, therefore ideal for applications in refrigeration and air-conditioning.

The above description is made by way of examples, which also indicates that different features described above, such as the polarity and/or general shape of the poles of the magnets or the flow direction of the valve arrangements, can be modified or changed by combining the described features in different ways. For example, the cross-sectional shape of the arrangement is described as cylindrical, but it can be replaced by other generally symmetrical polygonal shapes, especially when the number of sides of a polygon is large. Furthermore, the pistons with permanent magnets have the advantage of reduced weight, therefore high efficiency. Obviously, electromagnets can be used which have advantages that the magnetism will not be affected by temperature changes, desirable for high temperature applications. On the other hand, when the piston carries an electromagnet, the two driving magnets fitted to the housing can use permanent magnets so as to reduce the total weight of the motor/compressor as a whole.

Now details of the invention according to the second general object are described.

Figure 11:
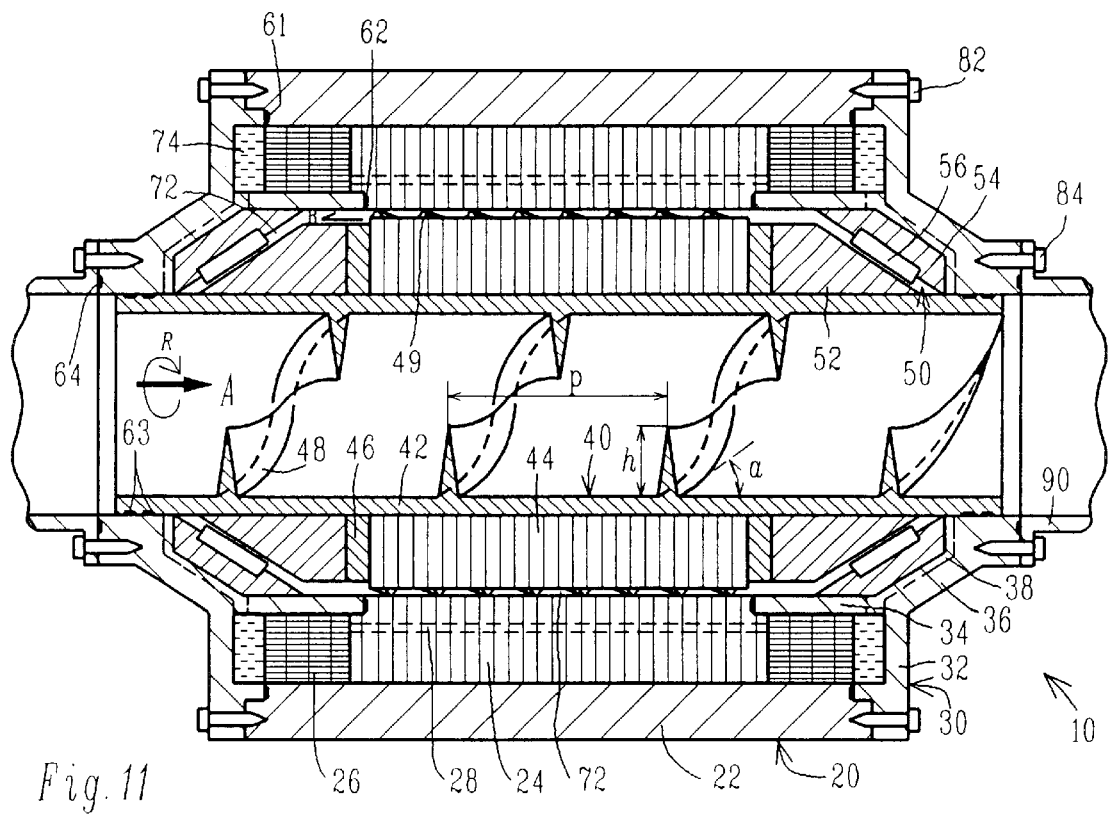
FIG. 11 is a sectional view illustrating a first embodiment of the pump/marine propeller according to the invention.
Figure 12:
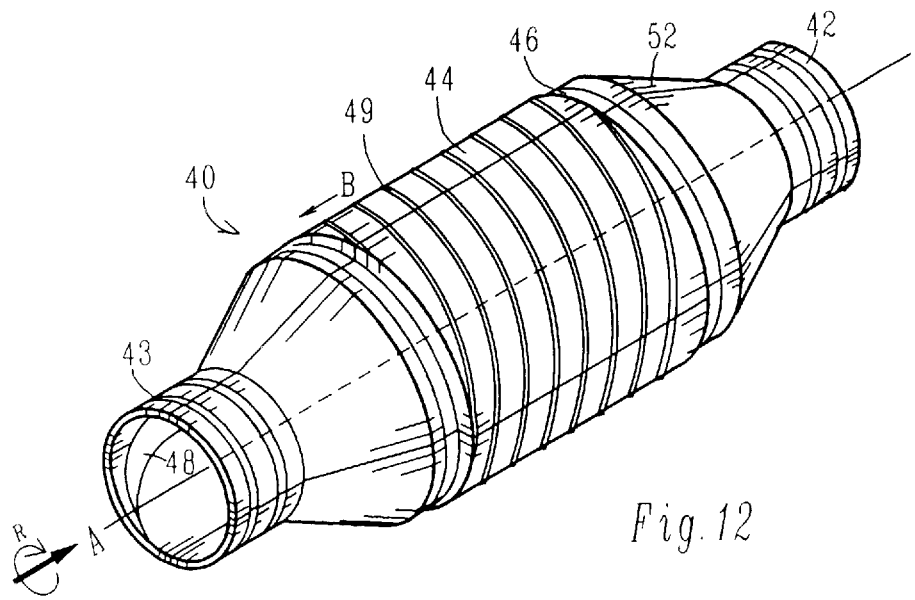
FIG. 12 is a perspective view of the rotor 40 in FIG. 11.

FIGS. 11 and 12 show a pump 10 having a cylindrical stator 20 and two end caps 30, each fitted to one end of the stator 20, for defining a cylindrical inner space in which is fitted a rotor 40. Each cap 30 has a central opening which is coaxial with the cylindrical stator 20 and the rotor 40 so that a fluid passage is formed along the rotational axis of the pump 10. The stator 20 has an outer housing 22, a magnetic core 24 with windings 26 and bores 28 indicated by dash lines. An air gap 72 is formed between the core 24 and the rotor 40 to generate, when electric currents are supplied to the windings 26, a rotational magnetic field as in a conventional electric motor. The caps 30 are of the same general structure, i.e. having an annular flat wall part 32, an annular slope wall part 36 which defines a central opening, and a sleeve part 34. Each cap is secured at its outer edge to the stator 20 by a number of fast members 82, while at the inner edge near the central opening it is secured to a tube 90 by fast members 84. On the inner surface of the slope wall part 36, there are a number of channels 38 extending radially from the inner edge of the central opening of the cap 30 to and passing through the sleeve 34, to enter a chamber 74 formed between the cap and the stator. The two chambers 74 are in fluid communication via the bores 28, and with the gap 72 via the channels 38. Sealing members 61, 62 and 64 are used to ensure sealing between the cap 30 and the stator 20, and between the cap and tubes 90, so that the connection between the pump and pipeline is leak-free.

In FIG. 12, the rotor 40 has a tube 42 carrying a magnetic core 44 on its outer surface secured between two supporting members 46. The core 44 can be constructed as for a squirrel cage motor, to rotate under the influence of the rotational magnetic field generated by the stator 20. The tube 42 has on its inner surface an propelling member 48 in the form of a screw blade, so that when the rotor 40 rotates the blade 48 drives the fluid in the central passage to flow along its axial direction, as shown by the arrow A. On the outer surface of the rotor 40, there are a number of spiral vanes 49 formed by cutting the surface of the magnetic core 44, or by adding a sleeve with the vanes formed on its surface, and this member can be made of an elastic material. The rotor 40 is supported by two mechanical bearings 50, each having an inner bearing member 52 fitted to each end of the rotor 40, an outer bearing member 54 fitted to the cap 30 between the sleeve part 34 and the slope wall part 36, and a number of rollers 56. The purposes of the bearings 50 are to provide both thrust bearing and rotary bearing to the rotor 40 to keep it coaxial with the stator and to ensure its smooth rotation. At each end of the rotor 40, further seals 63 are fitted in the seal grooves 43 (shown in FIG. 12) to provide a fluid-tight contact between the rotor 40 and the cap 30. This arrangement ensures that the air gap 72 is sealed from the mainstream axial flow indicated by the arrow A, so that no dirt carried by the flow can enter the gap 72. In case a corrosive fluid is transferred in the pipeline, effective sealing arrangements also protect the other components of the pump from being corroded since only the caps 30, the seals 63, the tube 42 and the blade 48 are in direct contact with the corrosive fluid.

A lubricating-cooling arrangement is formed between the rotor 40 and the inner surfaces of the pump body by filling the gap 72 with a lubricating-cooling medium. Since the gap 72 is in fluid communication with chambers 74, the same medium can circulate via the channels 38 and the through bores 28 in the magnetic core 24 so as to work as lubricating fluid to the outer surface of the rotor 40 and the bearings 50 and as cooling fluid to the windings 26 and the magnetic core 24. The spiral vanes 49 on the outer surface of the rotor 40 have a spiral direction opposite to that of the inner blade 48, to drive the medium in the gap 72 to flow in the opposite direction through the channels 38 into the chamber 74 at the left end of the pump. Conventional transformer oil can be used as the medium for this purpose. It should be noted that the peripheral cushion of the medium also serves as a hydraulic bearing to help keeping the rotor coaxial with the stator core 24 and to provide a counter-thrust to the rotor, which reduces the burden of the mechanical bearings 50. To enhance the hydraulic bearing effects, spring biased one-way valves (not shown) can be fitted, e.g. in the chamber 74 to block the oil flow into it so that only when the pressure of the oil in the gap 72 is built up by the rotation of the rotor 40 to a value higher than this biasing force, i.e. when the rotor 40 rotates beyond a certain speed level, the circulation of the oil starts. A small oil supply tank (not shown) can be fitted to the pump body for supplying oil into this lubricating-cooling system to compensate any leakage into the main-stream flow via the seals 63, for this purposes, a stable oil pressure need to be maintained in the tank, e.g. by a spring loaded piston. Such arrangement is known in the art and do not need further description. When the stator windings 26 are connected to an electric power supply, a rotational magnetic field is formed between the stator and the rotor which drives the rotor 40 to rotate. As shown in FIG. 11, when the rotational direction of the rotor is that shown by the arrow R, the flow direction is that of the arrow A. The blade 48 forces the fluid in the central passage to flow in its axial direction while at the same time the rotor itself is subject to a counter thrust in the opposite direction. The flow direction is reversible by controlling the electric power supply, hence the rotational direction of the magnetic field. On the other hand, as the rotor 40 rotates, the spiral vanes 49 on the outer surface of the rotor 40 would produce a peripheral flow of the lubricating-cooling oil in the direction as shown by the arrow B, which is opposite to that of the axial flow inside the rotor because their spiral direction is opposite to that of the blade 48, therefore it always provides a counter thrust which helps to balance the rotor's radial and axial position and reduce the thrust force on the bearing. It should be noted that when the rotor's rotating speed is increased, i.e. when the rotor is subject to an increased thrust force, the vanes 49 would produce an increased peripheral flow with an increased balancing effect. That is to say the arrangement is sensitive to the changes of the rotor movements and it provides self-balancing effects which compensate such changes automatically. The back flow of the lubricating oil also keeps the oil pressure higher at the upstream side (left-hand side in FIG. 11) to prevent dirt from entering the gap 72 , and also keeping the seals 63 well lubricated. In this arrangement, as long as the seals 63, especially those at the upstream side which are more subject to the thrust force of the axial flow, are intact, the pump would be able to operate normally because all the other components are less eligible wear.

Figure 13:
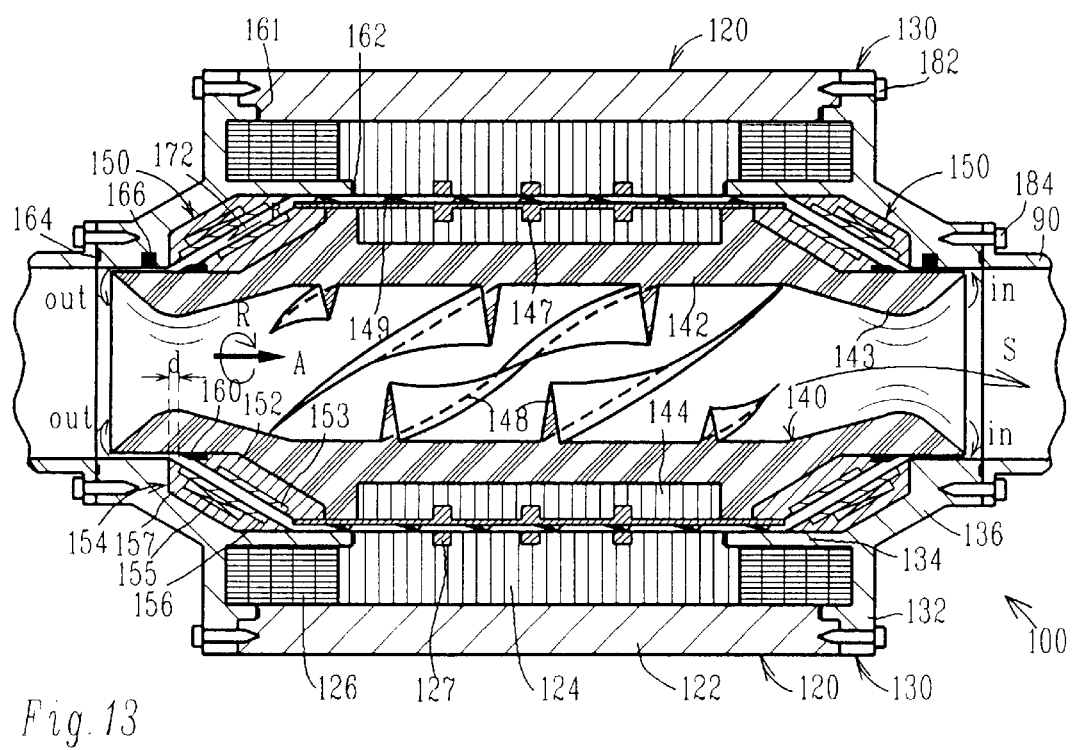
FIG. 13 is a sectional view of a second embodiment of the pump/marine propeller.

FIG. 13 shows a second embodiment of a pump 100 having a general structure similar to that of the first embodiment. A stator 120 and a rotor 140 are arranged to form a brushless DC motor, with an array of permanent magnets 144, preferably rare earth magnets, fitted on the rotor. This makes it suitable for applications requiring easy control of both rotational speed and direction, such as in case of a marine propeller. The rotor 140 is fitted in the pump body as a "free" rotor, in the sense that during its operation, the rotor is fully suspended and levitated by magnetic and hydraulic forces without direct physical contact with any support member. At each end of the rotor 140, there is a space of a distance "d", as shown in FIG. 13, which allows the rotor to have a limited axial movement. This fully suspended or "floated" state of the rotor is maintained by the following suspension bearing mechanisms.

Firstly, a magnetic axial registration mechanism is formed by having a number of non-magnetic or high magnetic resistance rings 127 on the inner surface of the stator's magnetic core 124, and the same number of similar rings 147 on the outer surface of the rotor, and the two sets of rings match each other when the stator and the rotor are in axial alignment. These rings separate the magnetic coupling between the stator and the rotor into separated zones so that a maximum magnetic coupling can be achieved only when the zones have a perfect axial registration, which forms a neutral position, as shown in FIG. 13. Any axial movement of the rotor will cause misalignment of these magnetic zones therefore increase the total magnetic resistance in the magnetic circuit formed by the stator and the rotor hence reduce the magnetic flux. The mechanism is highly sensitive to any axial movement of the rotor and an axial force would be generated between the stator and the rotor which tends to return the rotor to its neutral position. When the magnets 144 are of strong rare earth material, they produce strong registration force against any misalignment of the rotor even when the currents to the windings 126 are switched off.

Secondly, each magnetic suspension bearing 150 has a conical ring shaped electromagnet 154 fitted in the cap 130 and a matching conical ring shaped permanent magnet 152 fitted to an end of the rotor 140. The electromagnet 154 has a magnetic core 157 with a generally U-shaped cross-section, a toroidal coil 155 fitted in the channel of the core 157 and a non-magnetic member 156 covering the coil in the core. When there is an electric current in the coil 155, a magnetic flux forms between the two arms of the U-shaped core across the member 156, to form an evenly distributed annular field if viewed in the axial direction. The polarity can be changed by changing the current direction in the coil. The annular permanent magnet 152 has a similar U-shaped cross-section with a non-magnetic member 153 in it to separate the two poles S and N of the magnet. Obviously, the two magnets 152 and 154 will produce between them a repulsive or attractive force according to the current direction in the coil 155. These two magnets are arranged to have their opposing surfaces in generally conical shape (similar to that of the bearing member 52 shown in FIG. 12) which are complementary to each other so that a centring force formed between them would tend to keep them in a coaxial relationship. The non-magnetic members 153 and 156 are preferably made of low friction materials, such copper, bearing steel or Teflon, so that they can have between them low friction sliding contact as a further buffer arrangement to the rotor's axial movement.

The operation of this suspension mechanism is as follows. Before the stator 120 is switched on, each of the electromagnet 154 is supplied with a current of the same value, to generate from two ends of the rotor two opposite repelling forces which are of the same strength. These opposite forces would "clamp" the rotor at its neutral and balanced position and at the same time keep it radially suspended in the pump body. When an operating current is supplied to the stator, which drives the suspended rotor to rotate, a control signal which is proportional to the stator's average operating current is supplied to each of the electromagnets 154 with the effects of increasing the repelling force of the one at the upstream end of the rotor (left-hand end in FIG. 13) while reducing the repelling force at the other end. The combined effect by this control signal is a net force directing towards the downstream end of the rotor, which is sensitive to the rotor's movement and tends to balance the thrust force on the rotor produced by the axial flow of the liquid. In this way, the rotor's axial position is automatically maintained. When the rotation is reversed by changing the direction of the stator's operating current, so is the direction of the control signal supplied to the electromagnets 154, with the effects of having a reversed balancing force automatically. In order to make further accurate adjustment of this sensitive suspension bearing, sensors 166 are fitted to each end of the pump body which constantly monitor the axial position of the rotor. The output signals from the sensors are sent to a control unit (not shown) to further adjust the current supplied to the electromagnets 154, so that when a significant displacement of the rotor is detected, the bearings 150 can be further adjusted, e.g. having one generating an repelling force and the other an attracting force to help to return the rotor to its neutral position. The sensors 166 can be any conventional type, such as capacitive sensors, Hall's effect sensors, optical or infrared sensors or ultrasonic sensors.

Thirdly, the spiral vanes 149 formed on the outer surface of the rotor 140 work in a way similar to that of the first embodiment, i.e. producing a peripheral fluid cushion which operates as a hydraulic bearing. This hydraulic bearing is formed by sucking water into the gap 172 from the downstream end of the rotor, as shown by arrows In at the right-hand end of the rotor 140 in FIG. 13, driving it to flow backwards and returning it at the upstream end of the rotor, as shown by the arrows Out. By arranging a throttle ring 160 at each end of the rotor 140, this hydraulic bearing also works to damp any axial oscillation of the rotor. For example, when the rotor experiences a sudden increase of the thrusting force, e.g. due to a sudden increase of the output resistance or the increase of the input electric power, it would be forced to move backwards. This brings the throttle ring 160 at the upstream end closer to the member 154, therefore partially block the outlet for the back flow circulation. The reduced outlet will at the same time lead to an increase of the water pressure in the space between the magnets 152 and 154 which is a part of the gap 172, that in turn resists the rotor's further axial movement. This damping effect works when there is a sudden movement of the rotor so it protects the free rotor from hitting the pump body. The gradual change of the rotor's axial position is mainly counter-balanced by the forces provided by the magnetic registration and the suspension bearings 150 as explained above.

In FIG. 13, it is also shown that the tube 142 has an increased thickness compared with that of the first embodiment. This is made to form a buoyant structure by using light materials, such as plastics or resin, or by using metal material with channels or cavities filled with light material to reduce its total weight. The intended effects are to make the rotor 140 as a whole to have a gravity close to the liquid to be pumped, so that when the pump is filled with the liquid, the rotor "floats" in the liquid. This will help to suspend the rotor in the liquid and reduce its radial and axial oscillation relative to the stator when it is suspended. The portion 143 at each end of the tubular member 142 forms a narrowed entrance for liquid to enter the rotor, which has the effect of increasing the flow speed at each end of the rotor. This is intended to reduce the opportunity for the solid particles carried by the flow, such as sand or rust, to enter the gap 172 between the rotor and the stator. When the solid particles are carried by the flow to the inlet end of the rotor 140 (the left-hand end in FIG. 3), they are driven to the centre of the flow by the back flow coming out of the gap 172, as shown by the arrows Out. This annular outlet of the back flow joins the mainstream and further increase the flow speed at the narrow entrance defined by the portion 143, which helps to carry the solid particle, if any, into the hollow rotor. Once the particles are inside the rotor, because they are heavier than the liquid, they would be urged by the centrifugal force of the rotor against the inner surface of the fluid passage and be moved forwards by the axial flow. As they are moved to the outlet end, the shape of the portion 143, which accelerates the flow and "shot" the particles out along the line shown by the arrow S, before they have a chance to enter the gap 172.

Figure 14:
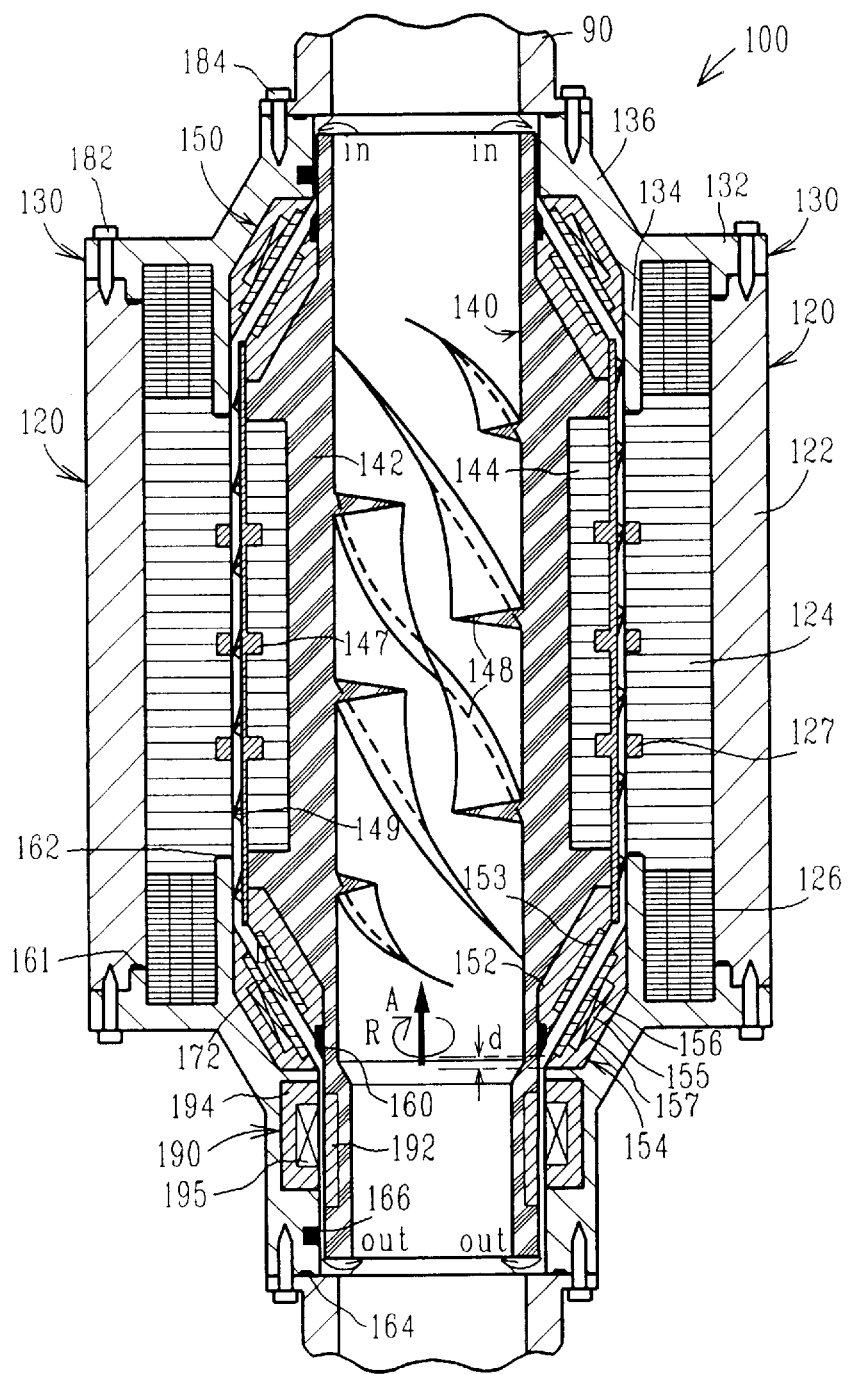
FIG. 14 is a sectional view of a third embodiment of the pump/marine propeller.

FIG. 14 shows a third embodiment of the pump, which is actually the second embodiment adapted to be used in upright position. Therefore, the reference numerals in this figure are same as those in FIG. 13 for those parts which are not changed. When the pump 100 is used in this upright position, the need for preventing the solid particles from entering the gap 172 is not so important and the narrow entrance formed by the portion 143 is not necessary. In this case, the rotor 140 is under a much greater counter force for it has to support the weight of the whole column of liquid above it. In order to compensate the weight of the liquid on the rotor 140, an additional magnetic bearing 190 is fitted to the lower end of the pump, which includes an electromagnet formed by an annular magnetic core 194 and a coil 195 carried by the cap 130, and a permanent magnet 192 carried by the rotor 140. The magnet 192 is arranged not in perfect axial registration relative to the electromagnet 194, so that when the electromagnet is energized the magnet 192 hence the rotor 140 is subject to an upward magnetic force which counter-balance the weight of the liquid on the rotor. Obviously more bearings can be fitted to one or both ends of the rotor to produce enough balancing force. The arrangement of FIG. 14 can be used as a generator when water flows down to drive the rotor so the operation of the magnets 144 and the coil 126 would generate electricity. It can also be used as a flow-meter when made small and light.

Figure 16:
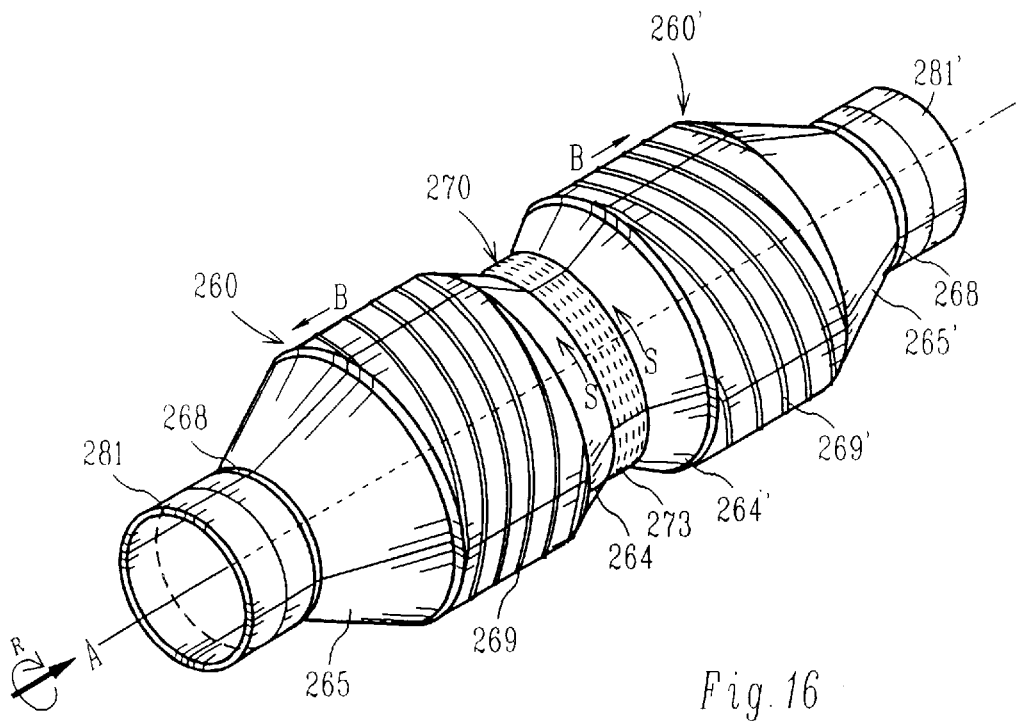
FIG. 16 is a perspective view of the rotor assembly used in the fourth embodiment.

FIGS. 15A to 17 show a pump 200 having a housing 220 and two cap members 230, each carries a bearing electromagnet 250, similar to those shown in FIG. 13. Inside the housing 220, there are two stators 210 and 210', separated by an annular separator 221 which carries a central bearing member 240, to be fully described below with reference to FIG. 17. Within the cylindrical inner space defined by the two stators there is a rotor assembly formed by two hollow rotors 260 and 260' each matching a corresponding stator, an annular connector 270 for connecting the two rotors to each other, and a driving mechanism 280 fitted inside the hollow structure of the rotor assembly. Electric connections (not shown) are made to the two stators so that they produce same rotary electromagnetic fields to drive the two rotors to rotate together. A perspective view of the rotor assembly is shown in FIG. 16 with the details of the connection between the connector 270 and the two rotors shown in FIG. 17. The general structure and bearing arrangements for each rotor 260 or 260' are similar to that shown in FIG. 13.

Figure 15B:
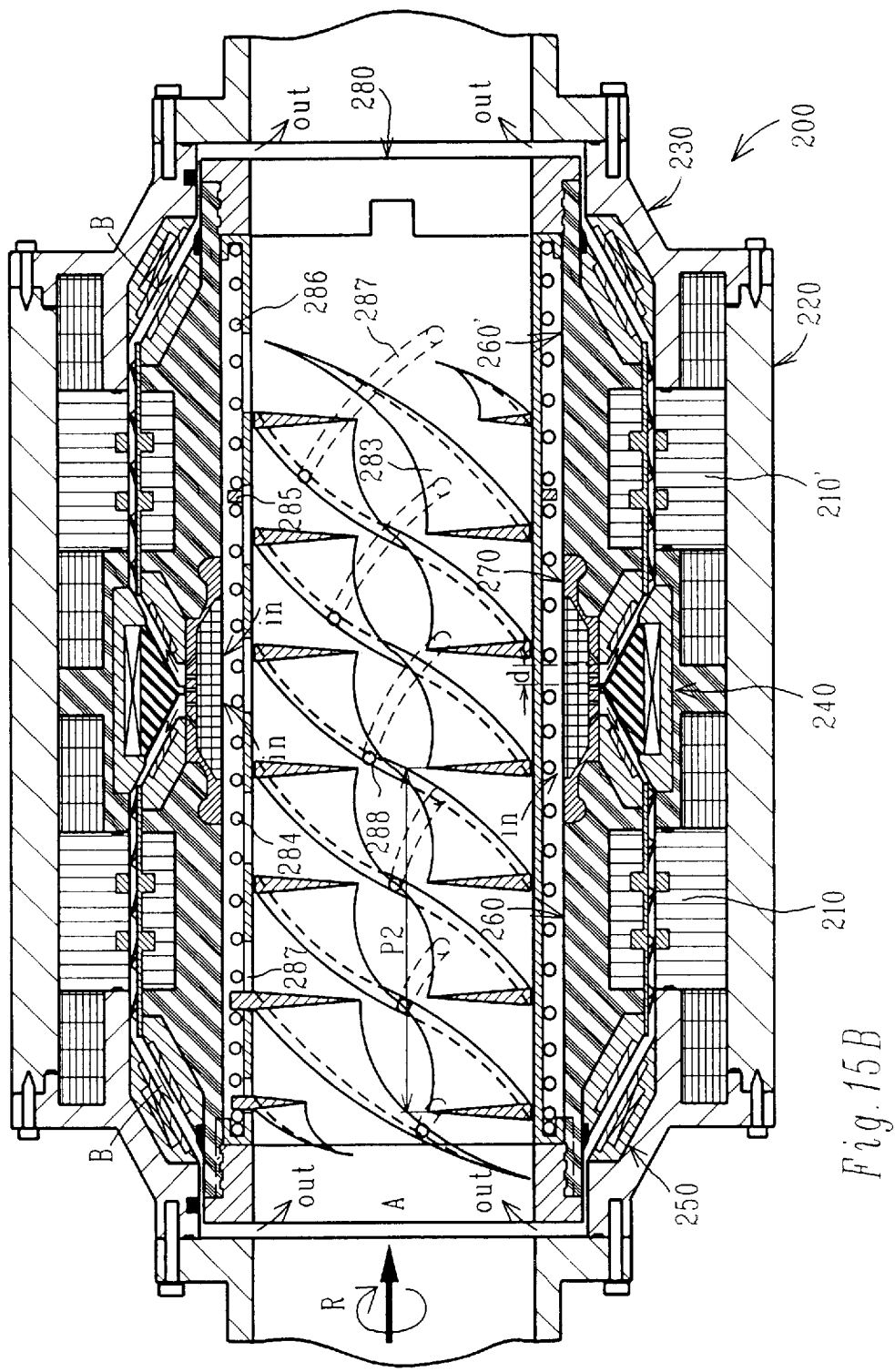

A driving mechanism 280 includes two securing rings 281 and 281' fastened to the rotor assembly, each at one end; a lining tube 282 clamped between the two rings; a number of screw blades 283 of flexible and elastic material fitted inside the tube 282; and tow spiral wire springs 284 and 286 fitted around the outer surface of the tube 282. The blades 283 have an outer diameter slightly larger than the inner diameter of the tube 282 so that when the blades are fitted into the tube 282 they tend to expand, forming a tight fit. Each blade 283 has a number of studs 288 projecting radially outwards from its outer edge and being evenly located along the blade's length, which studs are fitted into corresponding slots 287 formed in the wall of the tube 282 to keep the blades physically engaged with the tube 282. The two springs 284 and 286 outside the tube 282 are arranged in opposite spiral senses, with the spring 284 in the same spiral manner as the blades 283, and each spring has one end secured to an end of the tube with the other end joined to a connecting ring 285, which is also slidably fitted around the tube 282. Such an arrangement allows smooth sliding movements of the springs and the blades. The studs are engaged by the springs so the blades are biased by the springs. Under the conditions as shown in FIG. 15, the spring 284 tends to expand along its axial direction while the spring 286 tends to contract, thus they produce a joint biasing force on the blades to urge them towards the downstream end of the pump (i.e. the right-hand side in FIG. 5A) and keep them there in their fully expanded status. The shape and orientation of the slots 287 are different from one another and the array of slots are arranged in a way that their lengths are progressively increased along the flow direction shown by the arrow A. That is to say that the downstream end of each blade is relatively "free" because its stud is fitted in a long slot which gives it more room to move, compared with the stud at the upstream end, which is virtually fixed. The purposes for this arrangement is to make the blades 283 compressible during the pump's operation by allowing the studs 288 to slid within and along the slots 287, so as to keep the blades always engaged with the tube 282. When the blades 283 are compressed, they tend to expand radially but this radial expansion is restricted by the tube 282. The result is for the blades to twist while being squeezed between it two ends. The shape and length of each slot is made to accommodate this twisting factor to ensure blades' smooth movement during their compression.

In operation, when the rotating rotor assembly produces a forward driving force, the fluid would produce a backward thrust to compress the blades. In a low load operation, this counter force is balanced by the elasticity of the blades and the two springs 284 and 286. When the counter thrust is increased beyond a limit, for example when there is a big increase of the output resistance or a big increase of input driving power, the counter thrust on the blades would overcome the biasing forces and cause the blades to be compressed. Once this happens it increases the biasing forces by the springs so a new balance would be established at a new position, where since the blades are compressed to a smaller pitch (see P2 in FIG. 5B in contrast with P1 in FIG. 15A), the pump operation would be stabilised again for a smaller flow rate under a higher output pressure, without affecting the rotor's rotating speed. The pump with such an adjustable driving mechanism can automatically and instantly response to changes of output resistance or input power, or both, from an operation of low pressure and high flow rate to one of high pressure and low flow rate, or vise versa, without compromising its energy efficiency. This makes the pump operable over a much wider range of working conditions and capable to provide smooth operation during its start-up or slow-down. This adjustability is particularly desirable when the pump is used as a marine propeller for, e.g. a speedboat, where quick acceleration/deceleration and smooth transformation under changing conditions are essential for good performance.

Figure 17:
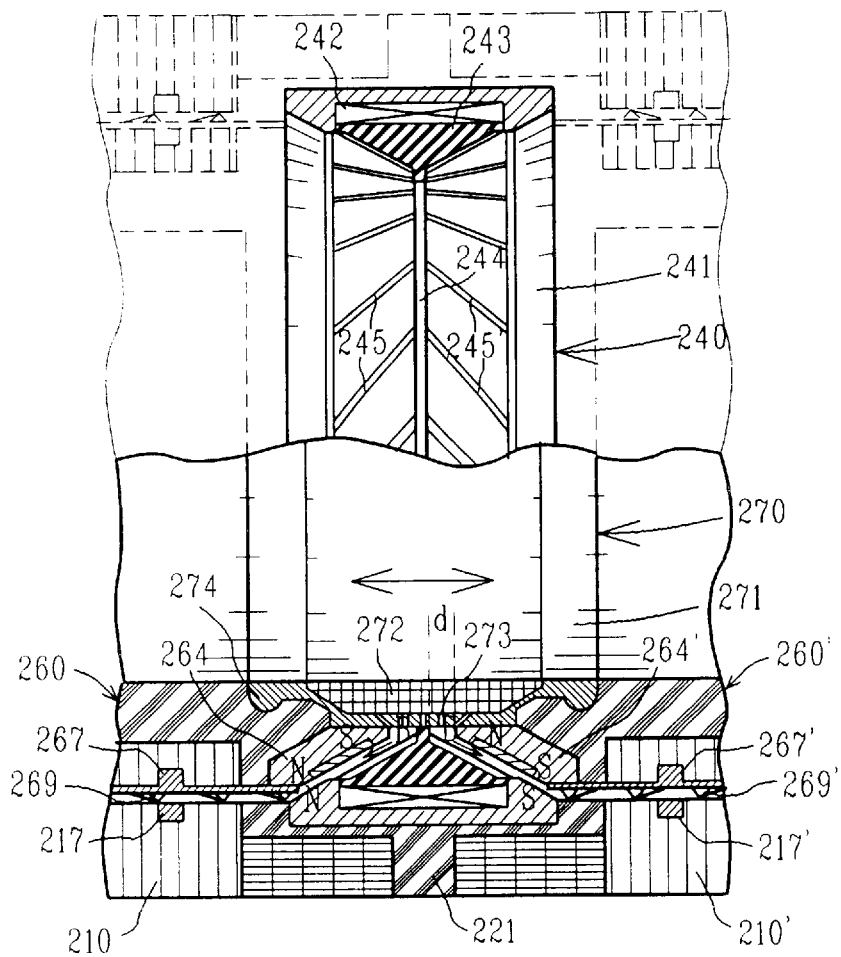
FIG. 17 is an enlarged sectional view showing details of a localised portion of FIGS. 15A and 15B.

In FIG. 17, the driving mechanism 280 is removed to show a cross-sectional and partially exposed view of the details of the central bearing member 240 and the annular connector 270. The combination of the central bearing member 240 and the annular connector member 270, together with the magnets 264 and 264', provide both magnetic and hydraulic suspension bearing effects. For the sake of easy understanding, these two aspects are to be explained separately.

The annular connector 270 has a base ring 271 made of a magnetic material, such as iron, which connects the two rotors 260 and 260' to each other by snap engagements 274, so as to form an integrated rotor assembly. The base ring 271 also serves as a magnetic bridge for connecting the two magnets 264 and 264' to form a complete magnetic ring with corresponding poles matching that of the two annular poles of the core member 241 of the electromagnet 240, separated by a non-magnetic member 243. In operation, when the coil 242 is energised, the electromagnet 240 and the permanent magnets 264 and 264' form a suspension pair with their corresponding poles opposing one other, causing mutual-repelling, so as to "lock" the rotor assembly to its neutral position as described above.

When a liquid is filled into the pump structure, it enters the gap between the tube 282 and the inner surface of the rotor assembly via the slots 287. The base ring 271 has several rows of small holes 273, also shown in FIG. 6, which are covered by a filter member 272 which soaks up the liquid once it enters the gap. When the rotor assembly starts to rotate, liquid soaked up by the member 272 will be spun off by centrifugal forces through the holes 273 to form a tangential flow indicated by the arrows S in FIG. 6. This tangential flow of the spin-off liquid is equally divided by a dividing edge 244 on the inner surface of the dividing member 243 to form two separated flows, each of a width "d", and to be directed by the guiding fins 245 or 245' towards the correspond spiral vanes 269 or 269' to form two opposite bearing flows represented by the arrows B. The remaining parts of each bearing flow passage are similar to that of FIG. 3. Since these two bearing flows produce equal-sized but oppositely directed bearing forces, they make further contributions in keeping the rotor assembly close to its neutral position. The width d to each side of the dividing edge 244 is about the same as the width of the axial registration members 217 and 267. In operation, the rotating rotor assembly is always kept within a small axial range of "d" to each side of its neutral position although there is no physical support except the bearing arrangements. Whenever the rotor assembly is forced to move away from its neutral position, e.g. due to the counter thrust caused by the axial flow, the base ring 271 would also move relative to the fixed dividing edge 244 so that the holes to the one side of the dividing edge 244 would be increased with a corresponding decrease to the other side. This change will cause an imbalance between the two bearing flows, which is enhanced due to the effects of the throttle ring 268 or 268' at the downstream end of each bearing flow B. Because of this shift of balance, any further movement of the rotor assembly form its neutral position would meet increased resistance until the rotor stabilised at a new balanced position. Furthermore, when the rotor assembly is moved away from it neutral position for a distance close to the size of "d", the misalignment between the rings 217 and 267 would be at its maximum, causing a maximum registration force to return the rotor assembly to its neutral position, further restricting the rotor assembly's deviation from its neutral position. Finally, it should be mentioned that additional suspension control can be conducted according to the sensing signals provided by the sensors (166 in FIG. 3) fitted in each cap members, as described before.

The assembly of the pump 200 can be made in the following procedure. First of all, the electromagnet 240 and the separator 221 are made as one member by moulding the separator 221 around the electromagnet and forming the member 243 at the same time. The two stators 210 and 210' are then fitted to each side of the moulded member, and the three of them are inserted into the housing 220 to form the tubular stator structure. After this is done, the connector 270 is located in the inner space of the stator structure and the two rotors 260 and 260' are snap-fitted to the connector from two ends to form the rotor assembly. Once the rotor assembly is fixed, the driving mechanism 280 can be assembled by first fitting the end ring 281' to one end of the rotor assembly, then sliding the tube 282 together with the springs and the blades into the rotor assembly from the other end. The tube 282 engages the ring 281' by the projection 289' at its leading end and also engages with the channels formed on the inner surface of the rotor 260 by the ribs indicated by the dash lines 289 at the other end, so that the tube 282 is carried to rotate by the rotor assembly. Then the end ring 281 is fasted to the other end. Finally the two cap members 230 are fitted to the housing to produce a finished pump.

Figure 19A:
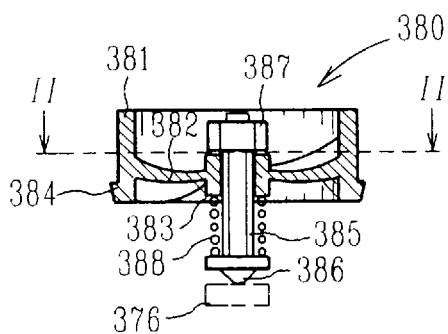
FIGS. 19A to 19D show different parts of the fifth embodiment.
Figure 19B:
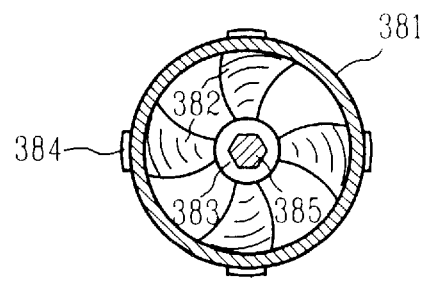
Figure 18:
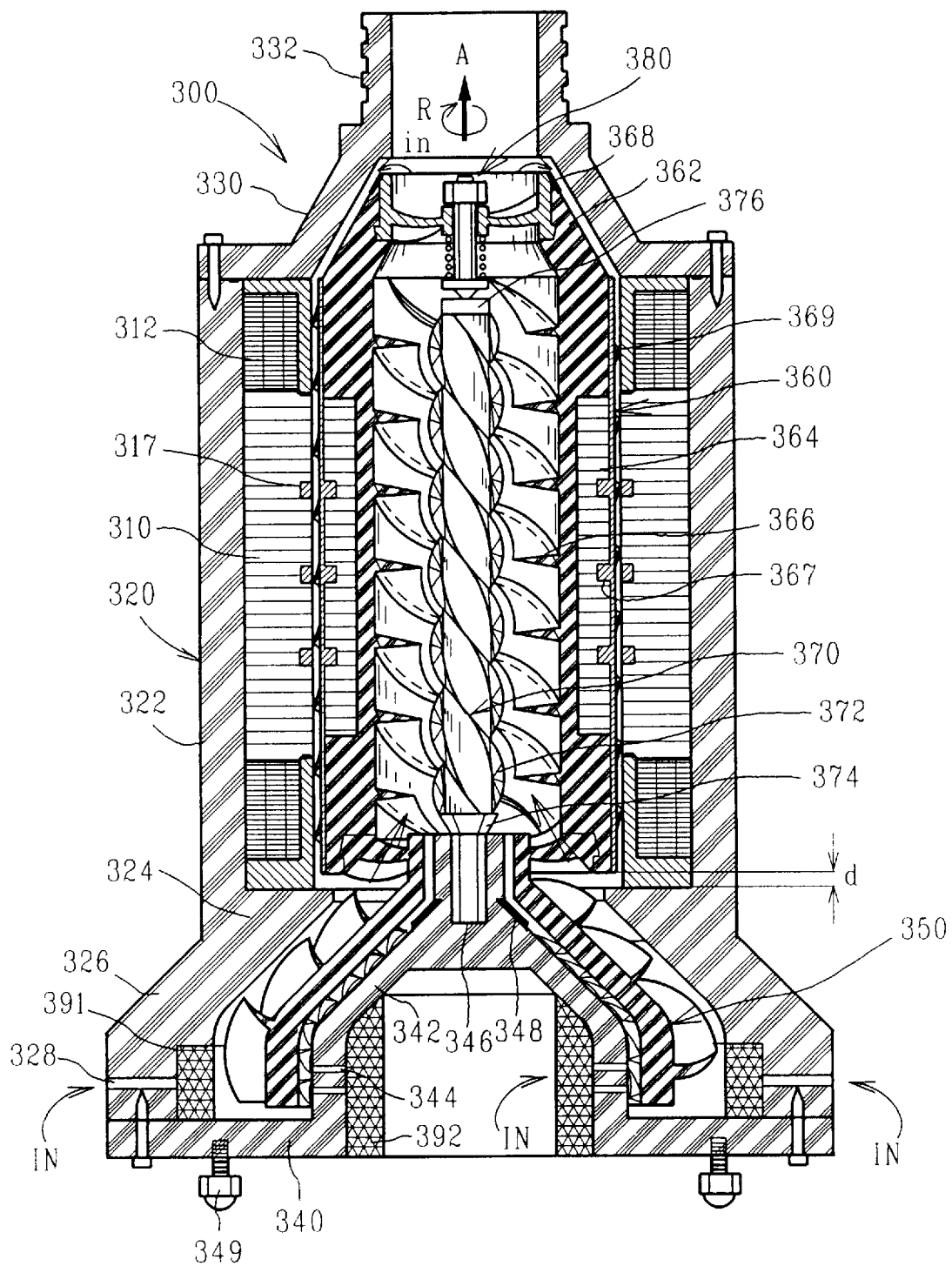
FIG. 18 is a sectional view showing a fifth embodiment.
Figure 19C:
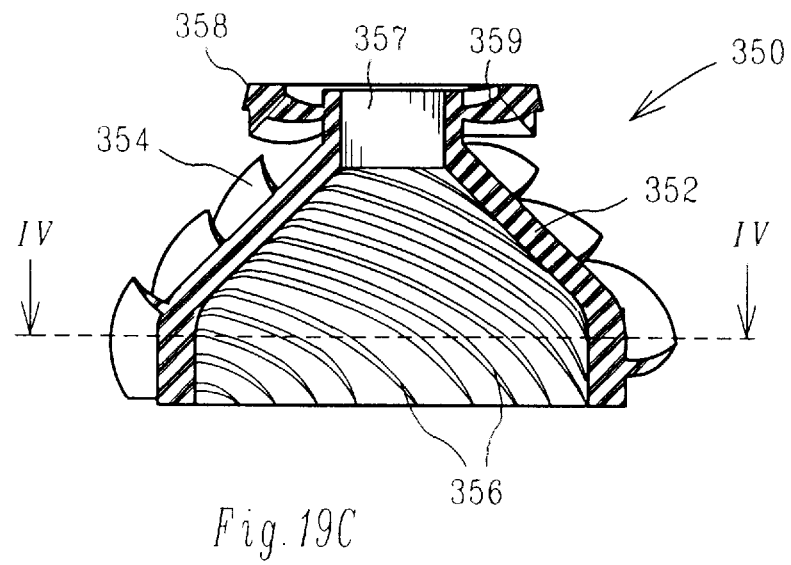
Figure 19D:
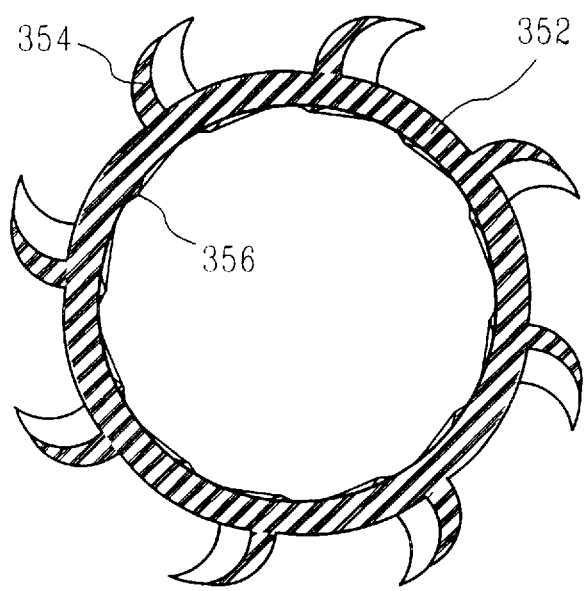

FIG. 18 shows a fifth embodiment of a pump 300. FIG. 19A is an enlarged view of a bearing mechanism 380 shown in FIG. 18; FIG. 19B is a cross-sectional view of the bearing mechanism 380 taken along the line B—B in FIG. 19A; FIG. 19C is a cross-sectional view of an impeller 350 shown in FIG. 18; and FIG. 19D is a cross-sectional view of the impeller 350 taken along the line D—D in FIG. 19C. The pump 300 is to be kept upright. It has a housing 320, a top cap member 330 and a base member 340. Inside the housing 320, there is a stator 310 which has axial registration rings 317, as described with reference to FIG. 13, and a rotor assembly formed by a hollow rotor 360, an impeller member 350 connected to the bottom end of the rotor 360 and a pivot bearing mechanism 380 fitted inside the rotor close to its upper end. A supporting shaft 370, which is not in section, is also fitted inside the rotor extending between the base 340 and the bearing 380.

More particularly, the housing 320 has a cylindrical portion defining an upper motor chamber for the stator 310 and the rotor 360, and an extended lower portion 326 defining, together with the base member 340, an impeller chamber for the impeller 350. An annular part 324 of the housing 320 separates the two chambers and forms a support for the stator 310. Liquid inlet holes 328 are formed around the lower part of the portion 326, which holes are covered by a filter 391. The base member 340 has a central portion 342 of a generally conical shape protruding into the impeller chamber to define with the housing portion 326 an annular and generally conical inner space for the similarly shaped impeller 350. The base 340 also has adjustable supports 349 for keeping the pump upright. Liquid inlet holes 344 are formed in the base member and covered by a second filter 392. The purpose of using the filters 391 and 392 is to prevent any solid particles from entering the interior of the pump which may cause damages to hydraulic bearing vanes and surfaces. They are not incorporated when the pump is used for pumping clean liquids or highly viscous or pasty stuff. At the centre of the base portion 342 there is a cylindrical protrusion which has a central hole 346 of a polyhedral cross-section for receiving the low end of the shaft 370, to be described later. A throttle ring 348 is fitted around the cylindrical protrusion for hydraulic bearing effects, also to be described later. The cap 330 is similar to that of the previous embodiments, and it has a top portion with a screw thread 332 for connecting to a pipeline or hose.

The rotor 360, similar to that shown in FIG. 14, has magnets 364 and axial registration rings 367 matching that of the stator 310, inner screw blades 366 for driving the liquid flow, outer spiral vanes 369 for hydraulic bearing and a throttle ring 368 fitted at its top end. Inside the hollow space of the rotor 360 is fitted the supporting shaft 370 which has screw blades 372 in a spiral direction opposite to that of the blades 366. The lower end of the shaft 370 has a polyhedral connector which is snap-fitted in the polyhedral hole 346 of the base member 340 to ensure that the shaft is not rotatable. The top end of the shaft is fitted with a bearing base 376 of a very hard material, allowing the tip of the pivot bearing 380 to form a gimbal mount.

In FIGS. 19A and 19B, the bearing mechanism 380 includes a ring member 381 with a number of engaging teeth 384 for snap-engaging with the end portion 362 of the rotor 360. The teeth 384 ensure that the ring 381 is fixed to the rotor and the mechanism 380 as a whole would rotate with the rotor 360 during pump operation. A central part 383 is connected to the ring 381 by a number of connecting members 382 which also serve as propelling blades when they rotate with the rotor. The central part 383 has a hexahedral hole for accommodating a pin 385 of the same cross section, so that the pin rotates with the rotor. The pin 385 is secured by a nut 387 at its upper end and biased downwards by a spring 388 at its lower end. The tip 386 at the lower end of the pin 385 is made of a very hard material, such as ceramic, glass or super-hard metal, for forming a single point bearing contact with the bearing base 376 of a similarly hard material. The use of the spring 388 ensures that the tip 386 is always biased against the base 376, so that although the rotor assembly as a whole may have a small degree of axial movement, of a distance "d" as shown in FIG. 18, it is prevented from any direct impact with the hard bearing base due to sudden changes of output load or electric driving input. It should be noted that when in operation, the whole rotor assembly formed by the members 380, 360 and 350 is borne, except the effects of the hydraulic bearings and the axial registration arrangement, solely by the tip 386 on the base 376 which provides a gimbal mount of high stability and low wear and rotating resistance, and no magnetic bearing is used in this embodiment.

FIGS. 19C and 19D show the details of the impeller 350 which is to be secured to the lower end of the rotor 360 by an engaging ring 358, so as to rotate with the rotor. The engaging ring itself can be made as a separate member which is then secured to the impeller by a similar engaging arrangement. The engagement can be of the similar construction as that of the ring 381 shown in FIG. 19A. The impeller 350 has a hollow conical body 352 with outer blades 354 and inner vanes 356. The blades and vanes are in the same spiral direction so that when the impeller rotates with the rotor, the blades 354 produce a generally upward liquid flow from the holes 328 towards the hollow rotor while at the same time the vanes 356 produce an upward bearing flow which keeps the impeller "floated" on the outer surface of the base portion 342. The bearing flow is eventually forced to pass over the throttle ring 348 and enters the hollow rotor via the annular gap between the inner surface of the cylindrical portion 357 and the outer surface of the central protrusion of the base member 340. That is to say, when the rotor assembly rotates at a stable speed, the hydraulic bearing flow formed by the vanes 369 on the outer surface of the rotor 360 and that by the vanes 356 on the inner surface of the body 352 would provide joint bearing effects which keep the whole assembly "floated" and also lubricated, therefore significantly reduce the bearing load on the pivot tip 386.

In operation, once the rotor 360 starts to rotate under the influence of the magnetic driving force produced by the stator 310, it would carry the impeller 350 and the bearing mechanism 380 to rotate with it. The liquid sucked into the impeller chamber via the holes 328 and 344 would be forced to flow upwards by the blades 354 and the vanes 356 to enter the hollow rotor, where it would be forced to flow upwards by the effects of the blades 366 which are rotating and the blades 372 on the supporting shaft 370, which are not rotating. Since the blades 372 are in a spiral direction opposite to that of the blades 366, they work together to reduce the swirling factor of the liquid flow passing between them and to increase the upward driving force, therefore producing a significantly increased output pressure. This upward flow is further promoted by the blades 359 of the impeller 350 and the blades 382 of the bearing 380, both sets rotate with the rotor.

When there is a sudden change of load or electric input, the rotor assembly would tend to move axially. This tendency is compensated by the elastic bearing force by the pivot bearing 380 and the two throttle rings 348 and 368. For example, assuming there is a sudden drop of output pressure due to the fact the hose connected to the top cap 330 is burst under the output pressure, the whole rotor assembly would unavoidably move upwards, which leads to the situation that the upper throttle ring 368 would block the bearing flow inlet to the hydraulic bearing on the outer surface of the rotor 360, and at the same time the gap defined by the lower throttle ring 348 is increased so much that the vanes 356 on the inner surface of the impeller 350 would not be able to produce bearing effects. That is to say both hydraulic bearing arrangements stop to provide upward bearing forces so the whole rotor assembly would move to a new balanced position. When the rotor assembly moves downwards, e.g. due to increased output pressure, the arrangement works in the opposite way to balance the system automatically. Since the pump 300 has two sets of liquid inlet holes 328 and 344, it can be conveniently used as a mixing pump with the holes 328 for the main liquid component while the holes 344 for adding a second component which would be fully mixed with the main flow in the hollow rotor. This is also useful in the case where the main flow is a highly viscous or thick mixture and a lubricant and/or diluent liquid can be introduced via the holes 344 to keep the system lubricated to reduce flow resistance. All the structural components of this pump, except the electric or magnetic parts and the hard gimbal bearing tip and base, can be made by moulding plastics or resin, so it is easy to achieve high precision and low manufacturing costs.

Figure 20:
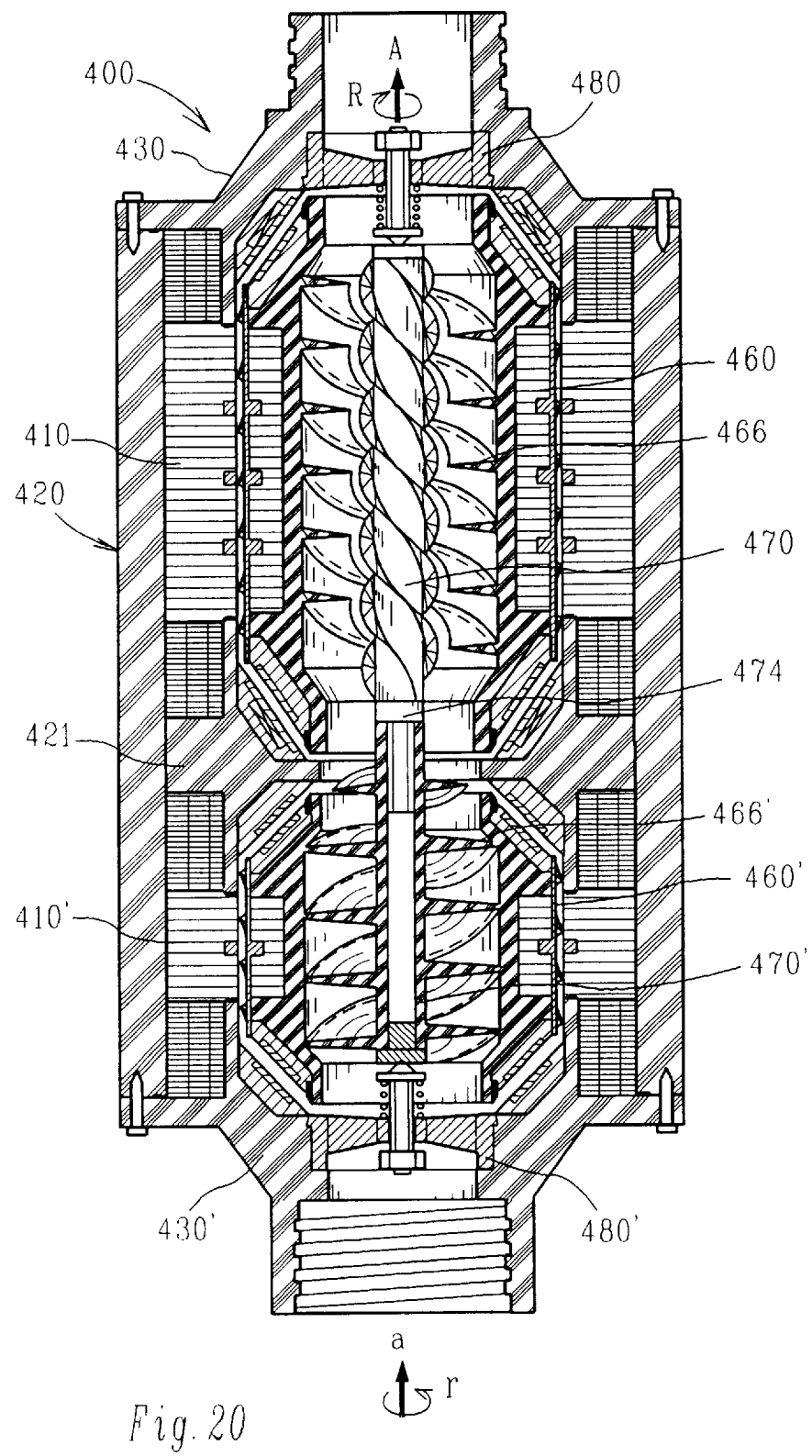
FIG. 20 is a sectional view showing a sixth embodiment.

FIG. 20 shows a cross-sectional view of a sixth embodiment of a pump 400 having a housing 420 accommodating two stators 410 and 410' separated by a separator 421, and two rotors 460 and 460', which are kept between two cap members 430 and 430', each carrying a gimbal bearing 480 or 480'. Generally speaking, the stator/rotor combination 410 and 460 work in a way similar to that of FIG. 14, with hydraulic and magnetic bearings and an magnetic axial registration arrangement formed between them. The operation of the stator/rotor combination 410' and 460' is similar. New features of the rotor 460' include the central propelling member 470' which is integral with the screw blades 466' and the hollow rotor body. The member 470' has a polyhedral central hole. The hole engages at its upper end the connector part 474 of a central propelling shaft 470, which is similar to the central shaft 370 shown in FIG. 8. The low end of the hollow member 470' engages the bearing base of the gimbal bearing 480' supported by the cap 430', while the upper end of the propelling shaft 470 carries the bearing base of the other gimbal bearing 480 fitted in the cap 430. That is to say, the two bearings 480 and 480' "clamp" between them the combination of the propelling shaft 470 and the whole rotor 460', which are made to rotate together. The structure of the bearings 480 and 480' is similar to that of the bearing 380 shown in FIGS. 8A and 8B, except that the connecting members 382 are arranged along the axial direction because they do not work as propelling blades.

In operation, the rotor 460 rotates in direction of the arrow "R", which produces an axial flow in direction "A". On the other hand, the rotor 460' and the shaft 470 rotate in the opposite direction shown by the arrow "r" at the bottom, and produce an axial flow in direction "a". This arrangement ensures that the two sets of screw blades always cancel each other's swirling effects to the liquid flow and at the same time enhance the common axial direction driving force. That is to say, a significantly increased output pressure is achieved without sacrificing the flow rate. The rotor 460' can be manufactured by first making a central propeller 470' with integrated screw blades 466'. It can be made as a separate part with spiral channels formed on its inner surface, matching the outer edge of the blades 466'. Then the propeller 470' is fitted into the rotor 460' by screwing the blades in the channels. Adhesive is used to bind the blades 466' to the rotor body. Since these parts can be easily made of plastics or resins, the manufacturing costs are low. The pump 400 is suitable for forming a high pressure fluid jet of a stable flow rate. In case of high pressure applications, a number of them can be connected by simply screw one to another. Because of its very compact structure, it can be conveniently fitted to the outlet of a pipeline and the whole pipeline can be operated under a much lower internal pressure for transferring the fluid medium, therefore the costs and difficulties of using and maintaining high pressure pipes and associated connectors are avoided without compromising the operational requirements.

Industrial Applicability

The simple and highly symmetrical structures disclosed in the present application make them suitable for mass-production and high quality control, therefore low cost per item. The caps and the housing should be made of non-magnetic materials, such as aluminium, stainless steel, copper, plastics or fibre reinforced resin. Similarly, the tubular member of the rotor together with the propelling blade(s) should also be made of nonmagnetic material. The screw blade(s) can be made as a separate member first then welded to a tube or casting/moulding the tube around it. Alternatively, the whole structure can be formed by casting around a cylinder die with a spiral channel for forming the blade(s), then the final product can be unscrewed from the die. A continuous casting process can also be used to from a long tube with an internal blade, then it can be cut to required length for making the tubular rotor member. The number of the blades, its height h, pitch p and propelling angle $\alpha$, as shown in Pig. 11, can be changed or adjusted to suit the needs of a particular application.

The internal blade structure of the rotor provides a clog-free propelling structure which is able to propel through it anything that can by all means enter the pipeline at the first place, therefore it is suitable to a wide variety of applications, especially when used for handling liquids carrying a high proportion of solid contents, e.g. applications as marine propeller, sludge pump, sewerage pump or pump for impelling or injecting pasty or viscous mixtures. The relatively long screw or spiral blade is able to distribute stress evenly over its whole length so it can undergo large load without causing over-stress. Because the pump can be wholly sealed, it is suitable for submerged applications and/or leak-free applications. Furthermore, it is easy to fit such a pump into an existing pipeline at any desirable position since the pump can be configured in roughly the same dimension as a piece of tube, and a number of pumps can be connected in series into the same pipeline to increase the total driving force, or to have one or more of them kept idle as back-up units. When an idle pump is fitted to a pipeline, its rotor will be able to rotate freely therefore not causing significant resistance to the flow through it. The hydraulic bearing vanes can also be formed on the inner surface of the stator, instead of or in addition to that formed on the outer surface of the rotor. However it is easier to form them on the outer surface of the rotor from the point of view of machine operation. In the above description the term "spiral vane" should be interpreted to include both the form of projecting ribs or grooves, which are easier to manufacture and can produce the satisfactory effects, especially when made of elastic materials. It is worth mentioning that in the accompanying drawings the size of the bearing vanes is exaggerated for the sake of easy recognition. In practice they are made very small to ensure a close fit between the moving parts. In a relatively small pump the magnetic suspension bearing 150 can be formed by two permanent magnets arranged to repel each other, instead of using an electromagnet 154. This will reduce power consumption and weight.

Now, details of the embodiments according to the third general object are described below.

Figure 21:
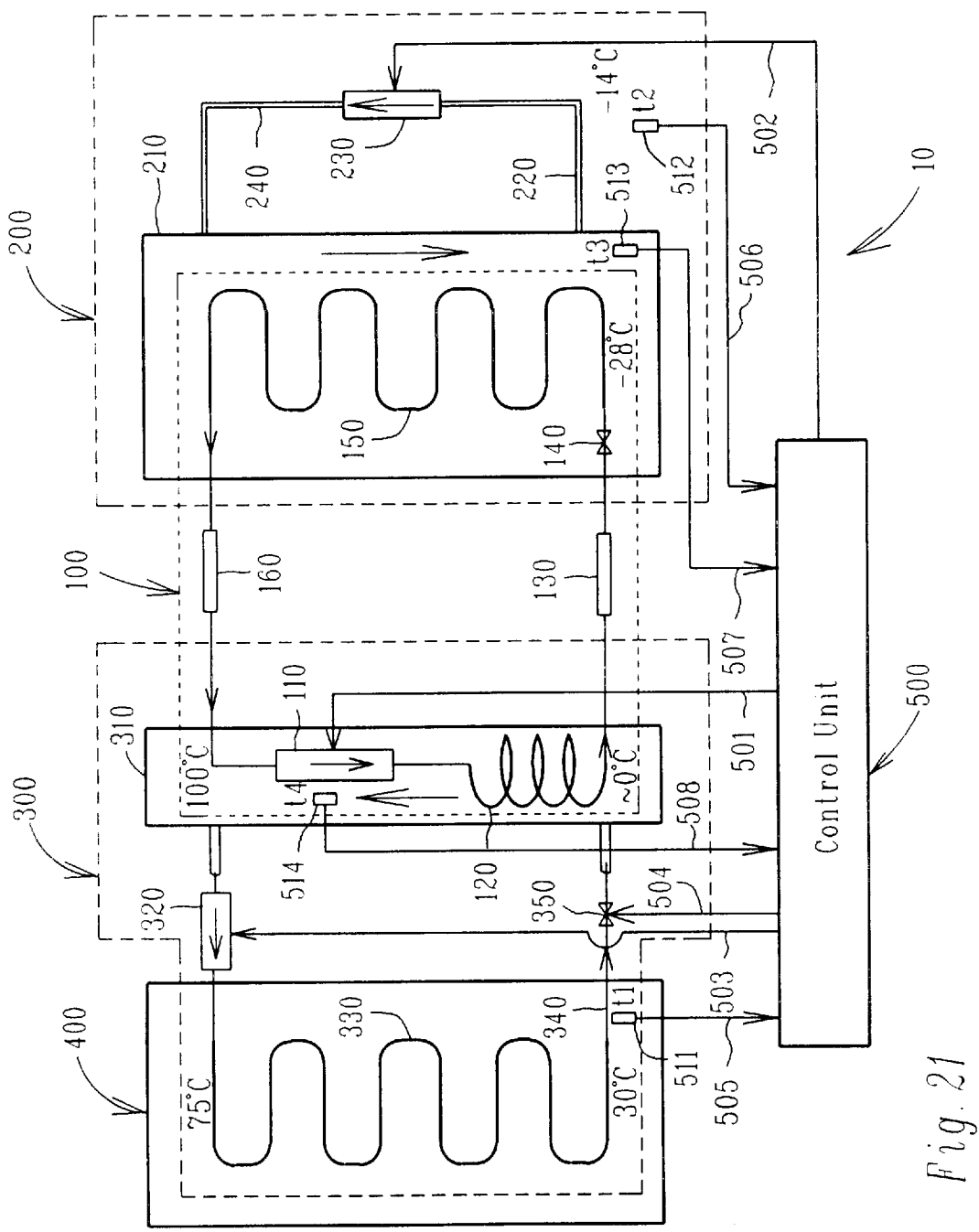
FIG. 21 is a block diagram illustrating basic concepts and the operational and functional relationship between the components of a cooling system according to the invention.

In FIG. 21, a cooling system 10 has four functional units, represented respectively by dash-line blocks 100, 200, 300 and 400, each for a different working medium, thermally coupled to form a cascade heat transfer chain. The system 10 also includes a control unit 500 which is electrically connected to these blocks.

The block 100 is a primary cooling mechanism in the form of a vapour-compression circuit. It has a compressor assembly 110, a condenser 120, both physically adapted within a coolant column 310, a dryer 130, an expansion valve 140, an evaporator 150 positioned in a cold storage tank 210, and an accumulator 160. Except the compressor assembly 110 and the condenser 120, the remaining parts of the circuit 100 can use commercially available components. The block 200 represents a brine circulating circuit located within a thermally insulated and closed space. The circuit includes a cold storage tank 210 holding an antifreeze liquid which submerges the evaporator 150 of the above circuit 100. A flow passage is formed by an outlet connection 220, a circulating pump 230 and a return connection 240 which is connected back to the cold storage tank 210. The block 300 is a secondary cooling mechanism in the form of a coolant circulating circuit which includes a coolant column 310, a compressor 320 connected between a coolant outlet of the column 310 and an inlet end of a coolant passage 330 arranged in the block 400 which is a heat storage tank. The outlet end of the passage 330 is connected via tubing 340 and a control valve 350 to a coolant inlet of the column 310. A control unit 500 is connected via, respectively, a control line 501 to the compressor assembly 110, a control line 502 to the antifreeze circulating pump 230, a control line 503 to the compressor 320, a control line 504 to the control valve 350 and signal lines 505, 506, 507 and 508 to sensors 511, 512, 513 and 514, each fitted in the heat storage tank 400, closed space 200, cold storage tank 210 and coolant column 310.

Generally speaking, heat is transferred in the cascade system 10 from its right-hand side, i.e. the block 200, to its left-hand side, i.e. the block 400, where it is dissipated to the ambient air. The basic concept of the invention is to improve the heat exchange of the primary cooling mechanism 100 at both the heat-receiving side, i.e. the evaporator 150 where the heat is absorbed, and the heat-rejecting side, i.e. the assembly 110 and the condenser 120 where the heat is rejected. When in operation, the evaporator 150 transfers cold energy (i.e. negative heat energy) directly to the antifreeze liquid in the cold storage tank 210, and the liquid in turn dissipates, under a forced convection driven by the pump 230, cold energy to contents in the space 200, e.g. when it is a freezer, or to an air flow when it is an air-conditioner. Since a basically water-based liquid is used, which has better thermal conductivity and higher specific heat than air, the arrangement works better than using the evaporator to cool air directly by conduction and natural convection. On the other hand, the heat generated by the compressor assembly 110 is directly transferred to the coolant in the column 310, which again provides a more efficient heat transfer than in the case where the heat is transferred directly to the ambient air. The heat exchange efficiency is further improved because the heat rejected by the circuit 100 is used to circulate in the circuit 300 the coolant solution having evaporable components and/or endothermic salt components, so that the coolant circuit 300 can take heat away from the compressor assembly 110 in the form of latent heat of vaporisation which is more efficient than do it in the form of sensible heat, and also cause endothermic dissolution of the salt to cool the refrigerant liquid in the condenser 120.

Since these beneficial effects are produced by using the heat which is conventionally rejected to the ambient as waste, the overall energy consumption is reduced. Any excessive heat is to be temporarily stored in the heat storage tank 400 which serves as a heat buffer to ensure that no part of the system will overheat during its normal operation. By having this heat buffer, the system as a whole can dissipate heat continuously although the compressor assembly operates intermittently. Because of improved efficiency for both the cold and hot sides, physical size of the circuit 100 can be reduced significantly for it no longer needs large heat exchange surfaces and this leads to a much reduced length of the circulating route actually travelled by refrigerant during a compression cycle. It means the overall flow resistance is reduced, hence a further improvement of efficiency and reduction of cost. Finally, since the size of the circuit is minimised, so is the amount of the refrigerant needed in the circuit, making it easier to meet safety requirements when an environmentally acceptable but toxic and/or flammable refrigerant, such as ammonia or propane, is used in the system. The above explanation regarding the basic concept of the invention is made with reference to a primary cooling mechanism of vapour-compression type. However, the same principles would also apply if a different cooling mechanism is used, e.g. an absorption type, a thermoelectric one (by Peltier effect) or a magnetic one (by thermomagnetic effect). The compression type is preferable because it is by far the most energy efficient and also the most commonly used in existing facilities.

In the following description, details of the block 200 are explained with reference to FIGS. 22A to 22C, the heat storage tank 400 with reference to FIGS. 23A to 23C, the coolant column 310 with reference to FIGS. 24A to 24C, a defrosting arrangement 600 with reference to FIGS. 25A and 25B, and a control method is illustrated in the flow-chart of FIG. 26.

Figure 22A:
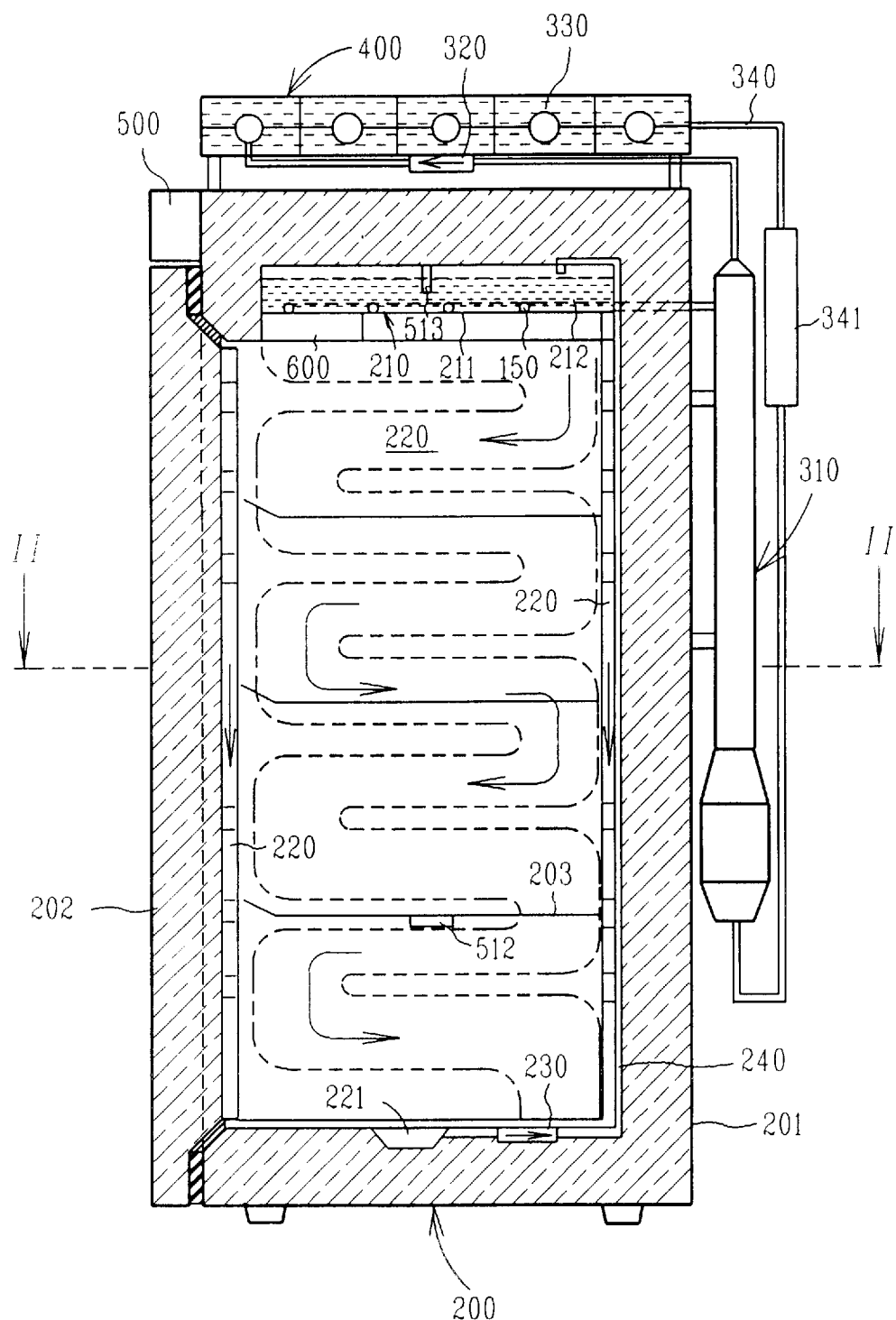
FIGS. 22A to 22C are sectional views of a freezer according to the invention.
Figure 22B:
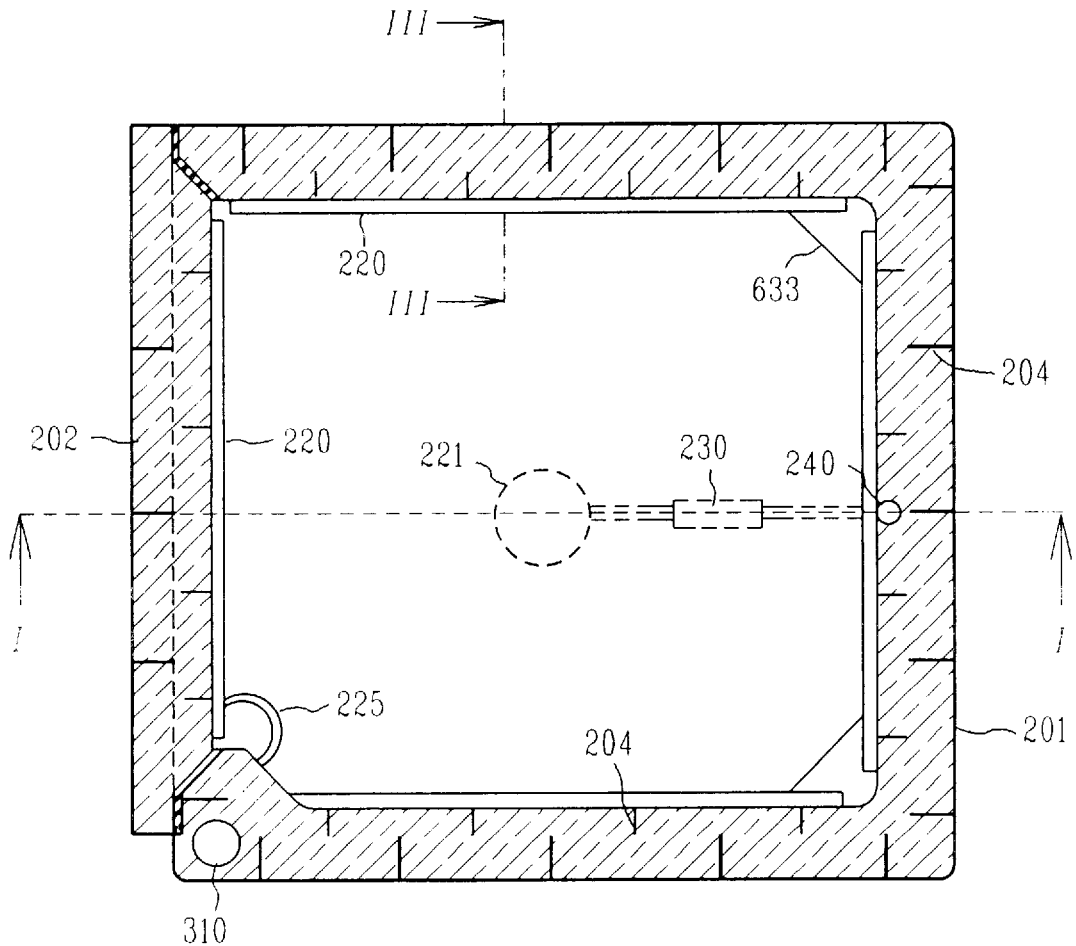
Figure 22C:
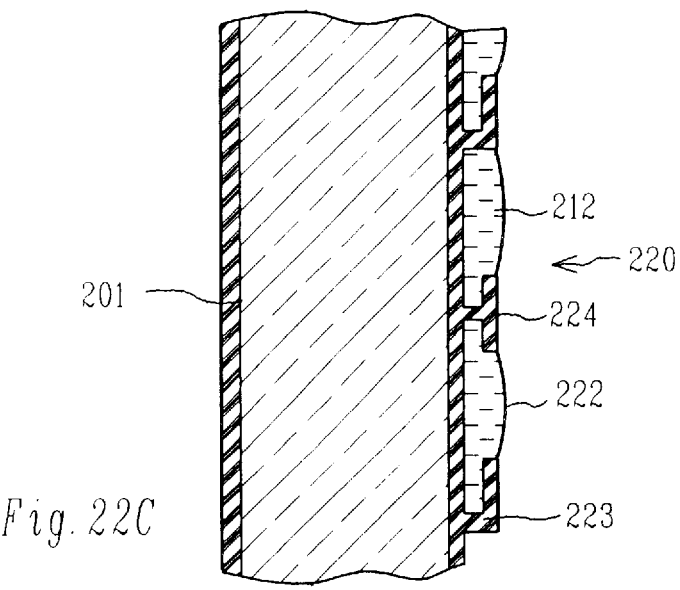

FIG. 22A is a cross-sectional view taking along the plane A—A shown in FIG. 22B, while FIG. 22B is a cross-sectional view taking along the plane B—B in FIG. 22A, and FIG. 22C is a cross-sectional view taking along the plane C—C shown in FIG. 22B. In FIG. 22A, a freezer 200 has an insulated casing 201, an insulated door 202 and a number of shelf members 203 for supporting goods. For the purpose of easy illustration, a coolant column 310 is shown to be attached to the back of the casing 201, which in practice can be built into the insulating wall of the casing 201, as shown in FIG. 22B. A thermal storage tank (heat tank) 400 is on top of the freezer 200, but again it can be located at other places. For example, in a large system it is practical to fit the tank outdoor for maximum efficiency. The column 310 is connected via a compressor 320 to a coolant passage 330 in the tank 400, which passage is connected in turn, via the tubing 340 and a solvent collector (collector) 341, to the bottom end of the column 310. The collector 341 is positioned to maintain a proper liquid level in the column 310, as to be described later. The compressor 320 is arranged to be thermally coupled with the heat tank 400, so that the heat generated during its operation is absorbed by the heat storage material in the tank 400. The control unit 500 is fitted to the top front face of the freezer 200.

Within the freezer 200, the cold storage tank (cold tank) 210 is fitted to the ceiling of the inner space, which tank 210 has a bottom wall 211 made of a thermally conductive material and the evaporator 150 is fitted on the bottom wall 211 so that they form an integrated cold-generating member. A brine 212 is filled in the cold tank 210, which keep the evaporator 150 submerged. An commercially available antifreeze solution can be used as the brine 212. The concentration of the solution is controlled to ensure it has a freezing point a few degrees below the temperature to be maintained in the freezer. This makes it possible to use the liquid as cold storage material when the temperature in the freezer is deliberately brought to its freezing point. It is worth mentioning that once ice crystals are formed, the remaining liquid will have a higher concentration of antifreeze compound so a lower freezing point. The liquid does not have a single freezing point as pure water, instead it will freeze over a temperature range. Eventually the liquid will freeze into a slush which stores latent cold energy, to be released later when the slush melts. A headroom is kept in the cold tank 210 to cope with the expansion of the liquid 212 when it is frozen. The temperature of the liquid is monitored by the sensor 513 in the tank 210, while the air temperature inside the freezer 200 is monitored by the sensor 512, for control purposes to be explained later. Underneath the cold tank 210 is fitted a deep-freezing/defrosting system 600.

In FIGS. 22B and 22C, on each of the four side-walls, including the inner surface of the door 202, is formed a circulating path 220 which connects the cold tank 210 to a collecting chamber 221 formed on the bottom wall of the casing 201. Flexible tubes 225, one of them being shown in FIG. 22B, are used to connect the channel 220 formed on the inner surface of the door so that the brine circulation is not affected by door movements. A small circulating pump 230 is connected to the collecting chamber 221 for returning the liquid back to the tank 210 via a return pipe 240. The pump 230 and pipe 240 are embedded in the insulating material of the casing 201. Two vertical corner channels 633 are shown in FIG. 22B, which provide air circulation passages. The casing 201 and the door 202 are made by moulding plastic materials, preferably gasified plastics, which provides good strength and thermal insulation. A number of internal ridges 204 are formed to enhance their mechanical strength, which also provide good attachments for the foamed insulating material. The pump 230 can be of any conventional type, but it is preferable to us a small axial flow and block-free pump as described above regarding the second general object of the invention.

As shown in FIG. 22C, the channel 220 is defined by channel members 223 formed on a flat panel, which are also made by moulding a plastic material, and covered by a flexible sheet 222 which is preferably a laminated sheet with at least one metal foil layer. A central support member 224 is formed in the middle of the channel to enhance the attachment of the flexible sheet to the channel base. The members 223 and 224 provide main support to the weight of the liquid in the channel 220, which reduces the stress subjected to by the flexible sheet 222. In this way, a layer of antifreeze liquid 212 is formed by the serpentine channels 220 which cover virtually the entire inner surface of the freezer 200, and in a large system, such channels can also be formed on the shelf members 203, to further increase the overall size of the heat exchange surface. By using the flexible sheet 222, which is very thin and thermally conductive, a good heat exchange surface is formed between the liquid 212 in the channel 220 and the interior of the freezer 200. On the other hand, the flexibility makes the sheet 222 well adapted to cope with the expansion of the liquid when it is frozen in its cold storage mode, as mentioned above. Since the laminated sheet 222 has plastic cover layers, it is stable against any potential corrosive effects of the antifreeze compound to its metal foil layer(s). Such sheets are used, e.g. for food and beverage packaging, and they can be easily attached to the supporting members 223 and 224 by adhesive or thermal welding, with or without further fastening means. It is clear from the above description that except the cold tank 210, the evaporator 150 and the defrosting system 600, the whole freezer body 201 and the door 202 can be made of plastics by moulding, therefore having a better thermal insulation and also lower costs of material and manufacturing. It also makes the whole casing easily recyclable after its service life.

FIGS. 23A and 23B are top views showing two embodiments of the heat tank 400 of FIG. 22A. The differences between these embodiments are that FIG. 23A shows a serpentine vapour passage 330 while FIG. 23B shows a coil passage. FIG. 23C is a cross-sectional view taking along the plane C—C shown in FIG. 23A. As shown in FIGS. 23A to 23C, the heat tank 400 has a generally flat casing formed by two casing members 401 which can be identical in structure. Each member 401 has a number of external ribs 402 and internal section walls 403 which separate the interior of the tank 400 into a number of chambers as shown in FIG. 3A or a central chamber 401' and an outer coil chamber as shown in FIG. 23B. In use the central chamber 401' provides a hot spot convenient for thawing frozen product taken out of the freezer. A coolant passage 330 is formed by two flexible and thermally conductive sheets 332, which can be of the similar type as the sheet 222 shown in FIG. 22C. The two sheets 332 are clamped between the two casing members 401 and separated by a supporting member 331 in the form of a perforated pipe or a coil of a spiral wire. The function of the supporting member 331 is to separate the two sheets 332 so as to prevent the passage 330 become blocked when there is a low pressure in the passage, as to be explained later. A number of internal ridges 404 are formed on the inner surface of the casing 401, to increase its strength and provide support to the sheets 332 when they are inflated by an internal pressure, as shown by the dash lines 332' in FIG. 23C. A phase change heat storage material 410 is filled in each chamber for receiving heat via the sheets 332 and storing it both as sensible heat and latent heat of fusion when its temperature is raised to its melting (fusion) point.

The heat storage capacity of the tank 400 should be large enough to cope with the need of hot weather. To increase the storage capacity and the heat exchange efficiency of the tank 400, it is preferable to have different heat storage materials 410 in different chambers, so that the chamber at the vapour inlet end of the passage 330 has a material of a higher phase change temperature (fusion point) than those to the downstream end of the passage 330. In such an arrangement, a temperature gradient is formed along the passage 330 and each chamber may absorb heat from the vapour flow over a temperature range so that heat is stored evenly along the whole length of the passage 330. For control purposes, this temperature is monitored by the sensor 511 embedded in the heat storage materiel. The phase change temperature at the inlet end can be about 75° C. which is below the vapour output temperature from the column 310, while at the outlet end it can be about 30° C. which should be above a practical high ambient temperature, to ensure that the material will not absorb heat from ambient air during a hot summer day. These values can be easily adjusted by selecting different heat storage materials to meet the needs of different climatic conditions. For this purpose, many materials can be used in the tank 400, which can be hyrated inorganic salts and their eutectic mixtures or reciprocal salt pairs. The suitable examples include: calcium chloride hexahydrate (of a fusion point of 29° C.); sodium sulphate decahydrate (of a fusion point of 32° C.); calcium bromide tetrahydrate (of a fusion point of 33.8° C.); calcium bromide hexahydrate (of a fusion point of 34.3° C.); zinc nitrate hexahydrate (of a fusion point of 35° C.); sodium carbonate decahydrate (of a fusion point of 35° C.); disodium hydrogen phosphate dodecahydrate (of a fusion point of 35.5° C.); sodium thiosulphate pentahydrate (of a fusion point of 50° C.); sodium acetate trihydrate (of a fusion point of 58° C.); and barium hydroxide octahydrate (of a fusion point of 75° C.).

When the tank 400 is cool, i.e. all the heat storage materials are in frozen status, a vacuum space 420 as in FIG. 23C is formed above the surface of the storage material 410 for coping with the expansion of the passage 330, as shown by the dash line 332'. Fluid communication (not shown) is formed between the spaces above and below the passage 330 to allow the material 410 to flow in each chamber when it melts. The interior of the passage 330 is also in low pressure under this condition so that the tank is ready to accept vapour output from the column 310. When vapour enters the passage 330, it condenses on the inner surface of the sheets 332 and give up heat to the heat storage material 410, mainly in the form of heat of fusion, and eventually dissipate it to ambient air by natural convection via the casing 401 and its inner ridges 403 and 404 and outer ribs 402 which are thermally conductive. The casing can be made of metal materials, but to reduce cost, it also can be made of plastic materials which are moulded to form the casing member 401, then covered by a thermally conductive coating, or covered on each surface by a metal layer to increase its thermal conductivity. The checked pattern of the inner ridges and outer ribs ensure that the casing has enough mechanical strength to undergo the internal pressure changes and they also serve as fins for heat dissipation. The casing wall is made relatively thin to further improve thermal conductivity. The plastic material also has the advantage that it is stable against corrosive effects of the heat storage material 410. Again, the main considerations are to provide high efficiency together with low cost and recyclable structure.

Figure 24A:
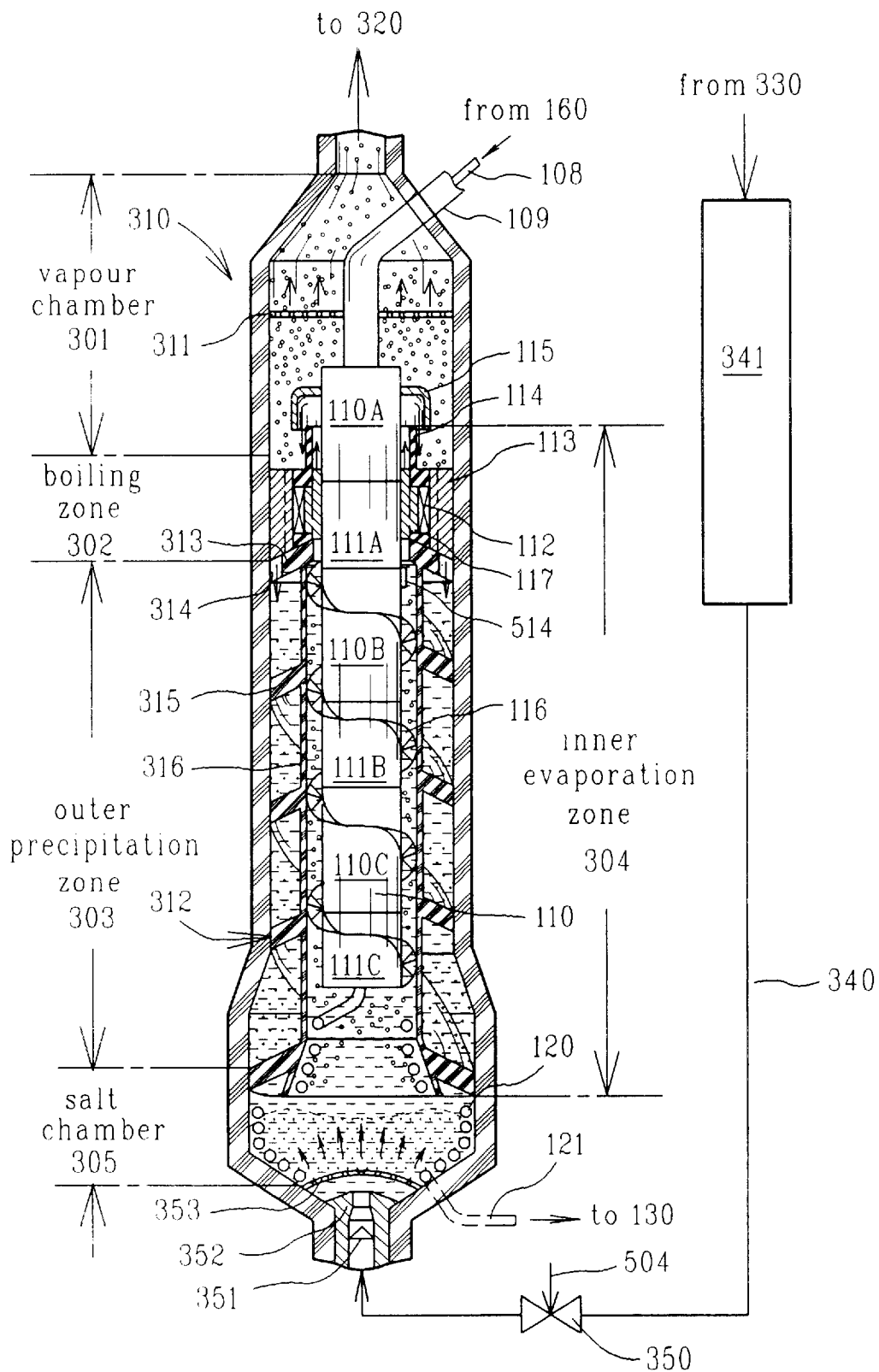
FIGS. 24A to 24C are sectional views of different embodiments of the coolant column 310.
Figure 24B:
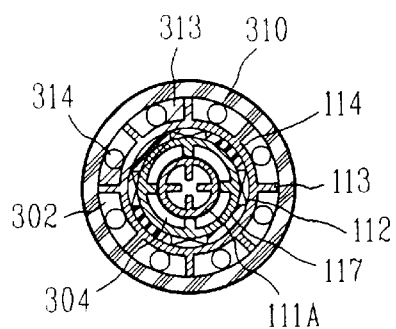
Figure 24C:
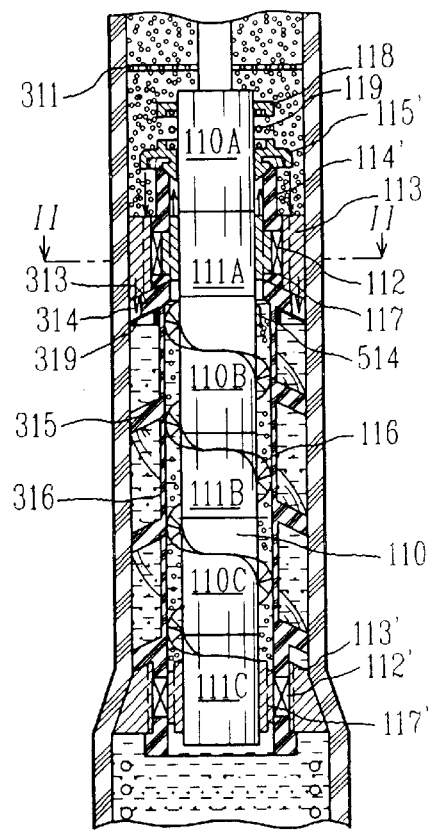
Figure 25B:
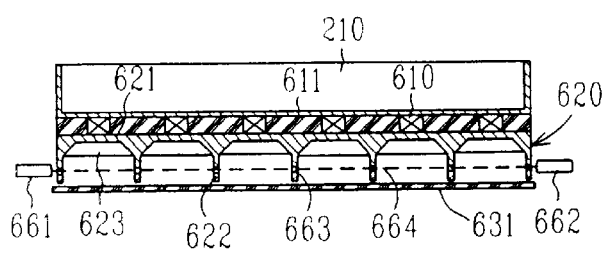
FIGS. 25A and 25B are sectional views of the defrosting arrangement.

FIG. 24A is a sectional view of one embodiment of the coolant column 310, with the compressor assembly 310 in it fully exposed but not in section, and FIG. 24C is a partial view of another embodiment of the column. FIG. 24B is a cross-sectional view taking along the plane B—B shown in FIG. 24C. In FIG. 24A, the coolant column has a tubular housing 310. The upper end of the housing 310 is a vapour outlet connected to the compressor 320 and its lower end is a coolant inlet connected to the collector 341 via the control valve 350. Inside the housing 310 is arranged the compressor assembly 110 with its upper end connected to a suction line 108 covered by a thermal insulation layer 109, which leads to the accumulator 160, and its lower end connected to the condenser 120 which is formed by a spiral coil of metal tubing leading to the dryer 130, as shown in FIG. 21. A further compressor can be used between the accumulator 160 and the pipeline 108 to pre-compress the refrigerant thus to increase its pressure and temperature before it enters the housing 310.

The compressor assembly 110 has a series of compressors 110A, 110B and 110C and chambers for compressed refrigerant, 111A, 111B and 111C, forming a multistage chain through which the refrigerant is compressed progressively. The compressors 110A to 110C are preferably a free-piston type as described above regarding the first general object of the invention. The compressor 110A is connected to the chamber 111A, which in turn is connected to the next stage compressor 110B, and so on. Their outer surface can be formed by a single cylindrical member made of thermally conductive material, to achieve good heat exchange. Internal fins can be formed inside each of the chambers 111A to 111C, as shown in FIG. 4B, to further enhance heat exchange efficiency, and also mechanical strength so that the side wall of the cylindrical member can be made relatively thin. The number of compressors can be changed to meet the needs of different refrigerants or application requirements. That is to say, the whole arrangement is highly flexible for different needs.

From the upper end of the assembly 110 downwards are fitted in sequence a cup member 115, a collar member 114, an inner heat exchange member 117 surrounding the chamber 111A, and a spiral fin 116 extending from the compressor 110B down to the last chamber 111C, which in turn is connected to the condenser 120. A sensor 514 is fitted close to the top end of the fin 116. As also shown in FIG. 24B, the four thermoelectric members 112 are circumferentially fitted between the outer annular surface of the inner heat exchange member 117, which has fins extending inwards to form thermal contact with the chamber 111A, and the inner annular surface of an outer heat exchange member 113 which has radially outward extending fins. Their functions are to be explained later. Within the tubular housing 310, it is fitted close to its upper end a vapour separator 311 which is a porous or perforated board allowing vapours to pass through but not any liquid droplets carried up by a vapour flow. Below the heat exchange member 113, there is a flow guide member 312 which has a tubular portion 316, a collar portion 313 at the upper end of the tubular portion 316, and a number of parallelly arranged spiral flanges 315 formed on the outer surface of the tubular portion 316. At the bottom end of the housing 310 is fitted a nozzle 352 which has an internal one-way valve 351 allowing a coolant outflow from the nozzle but not a flow back into it. A particle separator 353 is fitted to cover the nozzle 352, which separator functions as a filter allowing liquid from the nozzle 352 to pass through but not allowing solid particles to settle into the nozzle.

The coolant is preferably formed by a cocktail of aqueous ammonia with one or more endothermic salts dissolvable in it. Suitable salts include ammonium nitrate, potassium thiocyanate, ammonium chloride, potassium nitrate, urea etc. or a mixture of any of them. The concentration of the aqueous ammonia is made below saturation within the normal range of ambient temperature, i.e. in the concentration range of 20–35 wt. %, its exact value is to be determined according to local climate. A salt mixture of ammonium nitrate and urea is preferable for their low commercial cost (both are used as common chemical fertiliser). Carbon dioxide an also be included in this cocktail to increase its evaporable contents.

From the operational point of view, the internal space of the column housing 310 is divided into the following functional areas. Firstly, the top portion forms a vapour chamber 301 in which ammonia and water vapours rise upwards to the vapour outlet. Below the vapour chamber 301 is a boiling zone 302 which is formed by the thermoelectric members 112 and its outer heat exchange member 113. The space below the boiling zone 302 is divided by the flow guide member 312 into an outer precipitation zone 303 which is the annular space between the housing 310 and the outer surface of the tubular portion 316 of the flow guide member 312, and an inner evaporation zone 304 which is the annular space between the inner surface of the tubular portion 316 and the outer surface of the compressor assembly 110, and the zone extends upwards to the cap 115. Below the flow guide member 312 is a salt chamber 305 which is connected at its bottom to the coolant inlet nozzle 352.

The operation of the circuit 300 is now described with reference to FIG. 23A to 23C, 24A and 24B. When the compressor assembly 110 starts working, it sucks in gaseous refrigerant from the suction line 108 and compresses it progressively through the chain of the compressors 110A to 110C and the chambers 111A to 111C. During this process the temperature of the assembly 110 and condenser 120 begins to rise because of the pressure increase. At the same time, the valve 350 is opened to allow the aqueous ammonia in the collector 341 to enter the salt chamber 305 through the nozzle 352 and the salt separator 353 and to form a upward counterflow to reach a liquid level in the lower part of the boiling zone 302. The liquid level is stabilised within the zone 302 due to the relative vertical position of the collector 341 which supplies the solvent.

During this process a quantity of salt particles in the chamber 305 is dissolved by aqueous ammonia, producing endothermic effects in the salt chamber 305 to about 0° C., therefore the part of the condenser coil 120 within the chamber 305 is cooled and the refrigerant in it is properly condensed to liquid although the total length of the coil is very short. The saturated salt solution formed in the salt chamber 305 flows upwards into the inner evaporation zone 304 defined by the inner tubular surface of the flow guide member 312. Once this upward flow comes into contact with the upstream part of the condenser 120 and the compressor assembly 110, which are at a higher temperature as explained above, the temperature of this saturated solution begins to rise. This has the effects that on the one hand it reduces the solubility of the ammonia in the solution, which causes ammonia evaporation, as indicated by the small circles shown in the inner evaporation zone 304, while on the other hand, it increases the solubility of the salts so the solution becomes less saturated and the salts remain dissolved although its relative concentration becomes higher after the evaporation of the ammonia. Due to the existence of the spiral heat exchange fin 116, the upward flow of the coolant solution in the inner evaporation zone 304 has a very good thermal contact with the compressor assembly 110, therefore keeps it cooled. The heat transferred from the assembly 110 to the coolant flow in the zone 304 causes a temperature increase along the flow path, hence more evaporation of the ammonia, forming a strong bubbling flow. Finally this bubbling flow passes the gaps between the inner heat exchange member 117 and the chamber 111A, and is turned by the cap 115 downwards into the boiling zone 302. The temperature of this bubbling flow is constantly monitored by the sensor 514, so that the control unit 500 in FIG. 21 can adjust the flow rate via the control valve 350, and also the current through the thermoelectric member 112 to keep the temperature of the assembly 110 stable, so as to compensate the changes of its load.

The vapours in the bubbling flow rise immediately into the vapour chamber 301, as shown by the small circles therein, while the liquid part of the bubbling flow coming out of the cap member 115 enters the boiling zone 302. The outer heat exchange member 113 in the boiling zone 302 is thermally engaged with the hot side of the thermoelectric members 112 to receive heat transferred by their Peltier's effect from the wall of the chamber 111A via the inner member 117, as shown in FIG. 24B. This arrangement is made to maintain the outer member 113 thermally elevated to the boiling temperature of the coolant solution, which is also the highest temperature in the whole column 310, so a significant amount of the water in the boiling zone is evaporated. Because of the high temperature in the zone 302, the solubility of the salt components in the solution is further increased to form a solution of very high salt concentration after the water evaporation. This strong solution is heavier than the solution below it in the outer precipitation zone 303, which causes it to sink through the throughholes 314 formed in the collar portion 313 of the flow guide member 312. After the strong solution enters the zone 303, it is guided by the flanges 315 to flow downwards and at the same time losing its heat to the solution in the inner zone 304 through the thin wall 316. As this solution is cooled progressively during the downward flow, the solubility of its salt contents decrease so the salts begin to form crystal particles, as represented by the small cross signs in the zone 303. These particles would first settle onto slope surfaces of the flanges 315 then slip down into the salt chamber 305, to be re-dissolved by the incoming aqueous ammonia flow for a new cycle of the salt circulation.

It is clear from the above description that under the control of the unit 500 based on the value sensed by the sensor 514, a dynamic circulation is carried on between the inner evaporation zone 304, the boiling zone 302, the outer precipitation zone 303 and the salt chamber 305. A temperature gradient along the axial direction of the column 310 is therefore stabilised between the salt chamber 305, which is about 0° C., and the boiling zone 302 which is about 100° C., due to the baffling effects of the spiral fin 116 in the zone 304 and also the spiral flanges 315 in the zone 303, which prevent turbulent mixing of the liquid in each of the zones. The flow guide member 312 is made by moulding a plastic material to form the flanges 315, which are relative thick compared with the tubular wall 316, which can be made of thermally conductive materials, e.g. by moulding the flanges 315 around a metal tube 316, so that the heat exchange in the radical direction between the inner and outer zones 304 and 303 is promoted against the heat exchange in the axial direction within each zone. The column housing 310 is made of plastics and has a heat reflective inner surface, so it provides good thermal insulation which helps to maintain the temperature gradient in its axial direction. The system efficiency is therefore significantly improved due to two mutually supporting factors which reduce energy losses during its operation. Firstly, the whole compressing chain is cooled by the coolant flow which reduces the compressor loss and also takes a significant amount of heat away from the refrigerant before it enters the condenser 120. Secondly, the cooling effects in the salt chamber lower the condensation pressure of the refrigerant in the condenser, hence reduce condenser loss and throttling loss in the system. The reduced condensation pressure makes it practical to use environmentally benign refrigerant, such as carbon dioxide or anhydrous ammonia which would otherwise condense only under a much higher pressure.

At the top end of the column 310, a mixture of ammonia and water vapours in the vapour chamber 301 form an upward flow promoted by the sucking force of the compressor 320, which can be of the same type as the compressors in the assembly 110. Between the compressor 320 and the thermoelectric members 112, a mutually compensating relationship is formed to encourage the water evaporation by maintaining a low pressure in the chamber 301, which lowers the boiling temperature of the salt solution in the boiling zone 302 to improve the efficiency of the members 112, or vice versa.

Refer to FIG. 23C, when the vapour mixture enters the passage 330, its water content would be the first to condense onto the flexible sheets 332 and give up its heat to the heat storage material 410. Then the condensed water would absorb the ammonia vapour to form an aqueous solution. This process slows down pressure build-up in the passage 330 to make room for vapours coming afterwards. By using the flexible sheets 332, the passage 330 can be inflated under the vapour pressure to increase the total size of the heat exchange surface hence the rate of water condensation and ammonia absorption. The ammonia absorption is an exothermic process and the heat so evolved is transferred to the heat storage material 410. Finally, the aqueous ammonia formed in the passage 330 would flow via the connection tubing 340 into the collector 341 for another cycle of the solvent circulation. To encourage the return flow, the heat tank 400 is tilted towards the outlet end of the passage 330 so the flow is achieved mainly by gravity, however, the actual flow rate is decided by the valve 350 under the control of the unit 500.

When the compressor assembly 110 stops operating when the temperature inside the freezer is below a predetermined value, and the valve 350 is shut to stop the incoming flow of the aqueous ammonia solvent. At the same time, the compressor 320 is switched to a low-power operation which allows out-flow of the vapour mixture, so that the coolant solution in the column 310 cools down gradually by further evaporation which causes more salt to precipitate and sink to the salt chamber 305. Similarly, the heat tank 400 would also cool down by dissipating stored heat to ambient air, therefore causing the vapour inside the passage 330 to condense and dissolve thus to create a low pressure in the passage 330. Due to the continuing operation of the compressor 320, which does not consume much power but acts more like an active one-way valve, low pressure is also established in the vapour chamber 301, which in turn causes more water evaporation, therefore cools the interior of the column further, although the column housing 310 itself provides a good thermal insulation which prevents heat dissipation through its wall. The one-way valve 351 and the control valve 350 help to prevent any salt from entering the pipeline 340. At this final status, most of the salt content is accumulated as solid particles in the chamber 305 while most of the solvent, i.e. aqueous ammonia, is accumulated in the passage 330 and the collector 341. Because the temperature in the tank 400 and the collector 341 will eventually approach ambient (e.g. room) temperature, the aqueous ammonia collected in them would be below saturated concentration, i.e. forming a weak solution ready to absorb ammonia vapour in next session. This is highly beneficial when the compressor assembly 110 works intermittently with relatively short operating periods and long idle periods so that ammonia is evaporated mainly during the operation while water over all periods.

FIG. 24C shows a second embodiment of the coolant column 310. The differences between this embodiment and that of FIG. 24A are that the cap 115 in FIG. 24A is replaced by a valve assembly formed by a valve member 115', a support member 118 and a spring 119, and a flap valve 319 is attached beneath the collar portion 313 of the flow guide 312 to cover the through-holes 314. In operation, the valve member 115' is biased by the spring 119 to keep the inner evaporation zone 304 closed, at the same time the flap valve 319 closes all the through-holes 314. Alternatively, the member 115' can be biased by magnetic force, with or without the spring 119. That is to say, the boiling zone 302 and the vapour chamber 301 are separated from the inner and outer zones 304 and 303, to allow a low pressure to be formed by the effect of the compressor 320. The low pressure and the elevated temperature of the heat exchange member 113 in the boiling zone work together to drive water to evaporate so that a proper proportion of water vapour will enter the tank 400 with the ammonia vapour to form the aqueous ammonia. During this time, a high pressure is built up in the inner evaporation zone 304, which would, in combination with the low pressure in the vapour chamber 301, eventually overcome the biasing force on the valve member 115' and force it to open. Once this happens, a bubbling flow will rush into the boiling zone, and at the same time the flap valve 319 will also be opened to allow the high concentration solution in the boiling zone to enter the outer precipitation zone 303 below. In this way an intermittent local circulation of the coolant solution is formed which balances the amounts of water and ammonia vapours formed in the process. For control purposes, the average temperature value provided by the sensor 514 is used by the unit 500 to balance this intermittent operation. Due to this balanced evaporation of different vapour components, the embodiment can be used for continuous operation or for intermittent operation with relatively short idle periods.

Also shown in FIG. 24C is a second thermoelectric arrangement at the lower end of the assembly 110, which is formed by the inner heat exchange member 117', thermoelectric members 112' and an outer heat exchange member 113'. They work in the same way as the members 112, 113 and 117 described above, but in an opposite direction, i.e. the member 113' forms the cold side of the arrangement so it cools the solution in the outer zone 303 to encourage more salt precipitation. Again it is used to maintain the temperature gradient in the column 310, as described above.

Figure 25A:
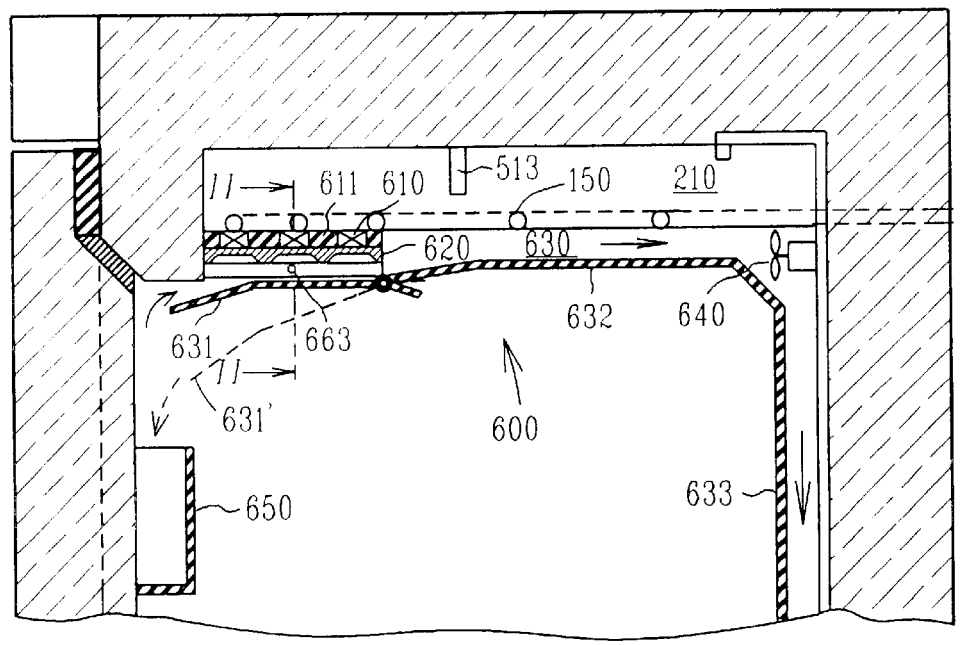

FIG. 25A shows details of the defrosting system 600, which has a thermoelectric member 610 attached to the bottom of the tank 210, and a heat exchange member 620 fitted beneath it. The member 610 is formed by an array of Peltier elements surrounded by an insulating member 611 for separating the member 620 from the tank 210 and also for absorbing thermal stress between them. A space 630 is formed below the tank 210 by a hinged member 631 which also serves as an ice collecting member and a separation board 632. Two corner channels 633, also shown in FIG. 22B, extend downwards. Two small fans 640 are each fitted to one back corner to draw in air from the front edge of the member 620, then to drive the air out into the inner space of the freezer. FIG. 25B shows that the member 620 has a base 621 in direct contact with the bottom surface of the thermoelectric elements 610, and a number of fins 622 extending downwards, separating the space between the base 621 and the hinged member 631 into a number of parallel channels. A number of concave cells 623 are formed on the base, each corresponding to one of the thermoelectric elements. An ice detecting system is formed by a light emitting diode (LED) 661 fitted to one side of the heat exchange member 620 with a light sensor 662 fitted opposite to it. A series of small holes 663 are formed in the fins 622 allowing a light beam 664 from the LED 620 to pass through and be received by the sensor 662.

The defrosting arrangement 600 can work in two different modes, i.e. the first mode for deep-freezing and the second mode for defrosting/ice collecting.

When the arrangement 600 operates in the first mode, an electric current is supplied to the thermoelectric element array 610 in a first direction, in which the top surface of each element 610 warms up and gives heat to the evaporator 150, while the bottom surface of each element becomes colder, cooling the member 620 to a temperature lower than that of the evaporator 150 and the antifreeze liquid in the cold tank 210. That is to say, the heat exchange member 620 becomes the coldest part inside the freezer 200, which can be well below −30° C., i.e. lower than the operation range when ammonia is used as refrigerant. At the same time, the fans 640 cause an air flow passing through the channels defined by the fins 622, in which the air is dehydrated and its moisture content becomes frost. Then the dry and cold air is driven by the fans 640 down into the corner channels 633 to be released at the bottom into the inner space of the freezer 200. Because the temperature in the concave cells 623 is lower than at any other position in the freezer, frost accumulates in these cells, which helps to keep other parts of the freezer frost-free. When a certain amount of frost/ice is collected in the cells 623, the light passage 663 will be blocked and this will be sensed by the sensor 662, so the control unit 500 can switch the operation to the defrosting mode.

In the defrosting mode, a large current of reversed direction is supplied to the thermoelectric elements 610, which has the effect of causing them to reverse their operation to absorb heat from the cold storage tank 210 and transferring the same to the heat exchange member 620 to cause a sharp raise of its temperature. This temperature change of the member 620 causes a thermal expansion of the side walls of the concave ice cells 623 which produces a thermal shock to break the accumulated ice, which is brittle. The broken pieces of the ice then drop onto the ice collecting member 631, forcing it to swing downwards, as shown by the dash line 631', to deliver the ice pieces into an ice collecting pocket 650 attached to the inner surface of the door 202. After the frost/ice accumulated on the member 620 has been cleared, the sensor 662 would be able to receive light signals from the LED 661, and the operation can be switched back to the first mode.

During the defrosting operation, the frost/ice accumulation is physically expelled by the thermal shock produced by the heat exchange member 620, and to achieve this effect the amount of energy and the length of time needed are very small because it does not need to melt the ice, as in most conventional arrangements. On the other hand, the ice is formed by pure water, so the pieces themselves are valuable commodities ready for human consumption. In this sense, nothing is wasted during the operation of the arrangement. Obviously, this arrangement can also be used for the purposes of ice-making or quick-freezing. To achieve this, a control button can be fitted to the unit 500 so that a user can make ice or quickly freeze fresh goods by putting a tray of water or the goods into the freezer 200, suitably at the bottom close to the air outlet of the corner channels 633, then starting the deep-freezing mode of the arrangement 600 by pressing the control button. In due course, the defrosting mode would be actuated and a light signal indicates that the ice pieces are collected in the pocket 650, ready for use.

A method for controlling the operation of the cooling system according to the invention is described hereinbelow with reference to FIG. 21 and FIG. 26. The operation of the control unit 500 is based on constant evaluation of four temperature values including: t1, sensed by the sensor 511 in the heat tank 400, indicating the temperature of the heat storage material at the outlet end of the passage 330; t2, sensed by the sensor 512 in the freezer 200, indicating its internal temperature; t3, sensed by the sensor 513 in the cold tank 210, indicating the temperature of the antifreeze liquid; and t4, sensed by the sensor 514 in the inner evaporation zone, as described before. In practice, each of the sensors 511 to 514 can be formed by a set of sensing elements fitted at different positions of the relevant components, and the values of t1 to t4 would be the average values of each set of the sensing elements. The temperature sensor 511 in the heat tank can also be replaced by a pressure sensor for the same control purpose, then the control can be conducted on the basis of the vapour pressure in the passage 330. To facilitate the description, predetermined reference values of a set of control parameters for each parts of the system are marked in FIG. 21, which are suitable, e.g. for a standard four star (* * * *) freezer, in which the temperature inside the freezer, i.e. t2, should be controlled below −14° C. Corresponding to this value, the freezing point of the antifreeze liquid in the cold storage tank 210 is adjusted to about −20° C., that is to say ice crystals begin to appear in the liquid at −20° C., and it can be considered as fully frozen when below −28° C. For practical purposes the highest expected room temperature, e.g. in England, is assumed to be below 30° C. so this value is selected as the required fusion point of the heat storage material at the outlet of the passage 330 in the heat tank 400. In operation, as long as t1 is not beyond this fusion point, one can assume that the tank 400 has not been charged to its full heat storage capacity. Obviously, these values are given as examples, and they should be adjusted when conditions change.

From control point of view, the system can operate in any of the following modes:

(a) Full capacity cooling operation (Full cooling) In this mode, the refrigerant circulating circuit 100, the coolant circuit 300, the brine circuit 200 and the thermoelectric system 600 (in its deep freezing mode) are all operating at their respective full capacity. This is achieved by the unit 500 by actuating the compressor assembly 110 and the thermoelectric members 112, the compressor 320, the control valve 350, the pump 230, the thermoelectric member 610 and the fans 640 (shown in FIG. 25A).

(b) Deep freezing operation (Deep freezing) In this mode, it is intended to achieve the full capacity cold storage in the cold tank 210. The system operation is basically the same as that of mode (a) except that the circulating pump 230 is turned off to allow the antifreeze liquid to freeze.

(c) Economic cooling operation (Economic cooling) The difference between this mode and the above mode (a) is that the system 600 (including the fans 640) does not work so the power consumption is lower.

(d) Air circulating operation (Air circulating) In this mode, only the fans 640 work to circulate air in the freezer 200. The air is cooled in the space 630 by the frozen antifreeze liquid in the cold tank 210.

(e) Defrosting operation (Defrosting) In this mode, the system 600 is switched to its defrosting mode as described before. It will switch back automatically when the frost/ice accumulation has been cleared. This operation happens during the full cooling mode (a) or the deep freezing mode (b).

(f) Pause In this mode, the control unit 500 turns the system off for a predetermined period, e.g. of 10 minutes. All components are off except the relevant sensors for monitoring condition changes, but the compressor 320 is kept operating at low power as an active one-way valve for at least a part of this period, as explained before. This mode is prolonged when the freezer door is open and stops when the door shuts.

Figure 26:
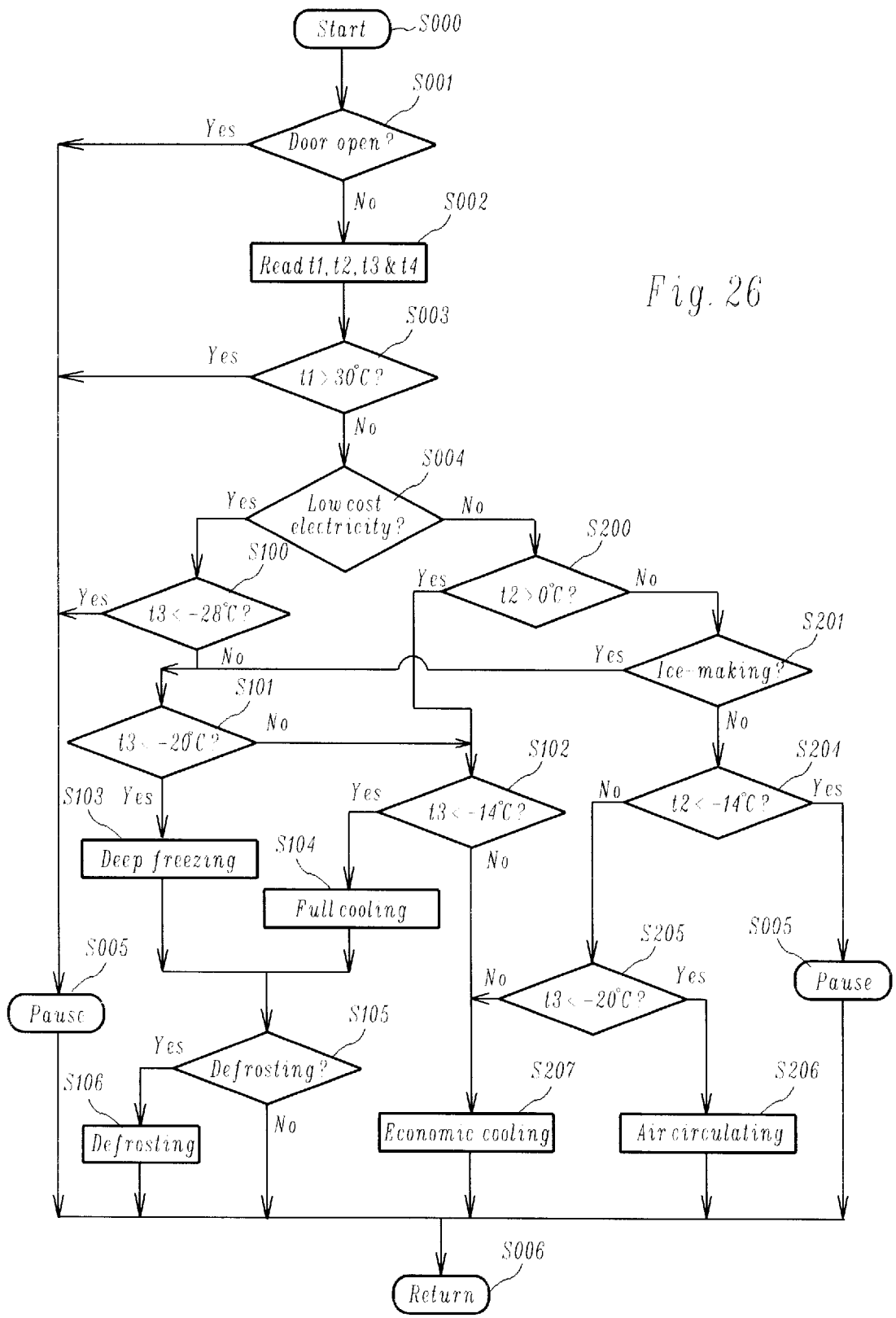
FIG. 26 is a flow-chart illustrating the control method.

FIG. 26 shows the control logic of the control unit 500, which is based on a CPU with necessary supporting components. In FIG. 26, the first step S000 is the starting point of a control session and also the point that the program returns i.e. form step S006 after each session. Once the process is started, the first thing is to check at step S001 whether the freezer door is open. If the answer is "Yes", the operation is switched to the mode "Pause" at step S005. As mentioned above, this mode is maintained as long as the door is kept open and terminated when the door is shut. Alarming arrangement can be incorporated into the unit 500 to alarm a user when the door is kept open for too long or not being shut properly. If or once the door is shut, the program goes to the next step S002 to read from the sensors 511 to 514 the respective values t1, t2, t3 and t4. Then in step S003, the value of t1 is checked to see whether the heat tank 400 is charged to its fill capacity. If the answer is "Yes", it goes to the step S005 to pause for a while, allowing the tank to cool down. Otherwise it goes to the step S004 to see whether the low cost electricity is available. This can be done by checking the voltage of different power input terminals. In case of using off-peak electricity, this step is simply to check a timer in the control unit to see whether it is the right time. If the answer is "Yes", the system is switched to the low-cost electricity then executes step S100, in which it checks whether t3 is below −28° C. to see whether the cold tank 210 has been charged to its full capacity. If the answer is "Yes", it goes to step S005 to pause e.g. for ten minutes, then returns via step S006 to the starting point S000. If the answer at step S100 is "No", i.e. the tank 210 is not fully charged, the control unit executes step S101 to check the value of t3 to see whether the antifreeze liquid in the tank 210 is partially frozen. If the answer is "Yes", the system starts the "Deep freezing" mode at step S103, otherwise it goes to step S102 to see whether t3 is below −14° C. If it is "Yes", it operate in "Full cooling" mode at step S104 when the antifreeze liquid can circulate. After the operation is started, the ice detecting system checks at step S105 to actuate the defrosting operation at step S106 if the answer is "Yes", then it returns. If the answer at step S102 is "No", it indicates that the antifreeze liquid is very warm, it goes to step S207 for "Economic cooling". This would avoid the system to be overloaded, e.g. during its start-up. Then it returns for next session of the control process.

If at the step S004, it is found that the low-cost electricity is not available, the control unit 500 executes step S200 to see whether the value of t2 is above 0° C., i.e. whether the interior of the freezer 200 is unacceptably warm. This may occur when the freezer is started, its door is kept open for a long time or a large quantity of fresh goods is loaded into it. If the answer is "Yes", it goes to step S102, then the following steps would be the same as that mentioned above. If the answer at step S200 is "No", it checks at step S201 to see whether the ice-making/quick-freezing button is pressed. If the answer is "Yes", it goes to step S101 to decide either to start full cooling or deep freezing operation according to the value of t3. If the answer at step S201 is "No", i.e. no instruction for deep-freezing, the value of t2 is checked at step S204 to see whether the internal temperature is acceptable, i.e. below −14° C. If the answer is "Yes", the system is switched to "Pause" mode at step S005, then restarts, otherwise the value of t3 is checked at step S205 to see whether the antifreeze liquid is still frozen. If it is "Yes", the system starts the air circulation by the fans 640 at step S206, during which the interior of the freezer is cooled by the cold energy stored in the cold tank 210. In practice, this operation would be able to cope with a temporary change of the internal temperature caused, e.g. by the invasion of warm air when the freezer door is opened briefly. If it is "No" at step S205, the system operates at step S207 in "Economic cooling" mode which is the mode when the low-cost electricity is not available. Once one of the operation modes in step S103, S104, S206 or S207 is started, the control unit 500 does not stop the operation until it finds at a later session that one of the control criteria for stopping the operation exists, i.e. at step S001, S003, S100, or S204.

By selectively switching between different modes, the system achieves an improved efficiency. For example, if the system is designed to make full use of off-peak electricity at night, by switching the system to full cooling mode at step S104 or deep freezing mode at step S103, the interior of the freezer is cooled to below −28° C. In this case, a very large quantity of cold energy is stored not only in the frozen antifreeze liquid in the cold tank 210 and the channels 220 shown in FIGS. 2A to 2C, but also in the goods supported on the shelf members 203. The stored cold energy would keep the cooling mechanism idle for a long period after the low cost electricity is no longer available, therefore reducing the amount of "expensive" electricity used during daytime. In this case, since the cold energy is stored during the period from midnight to early morning, when the ambient temperature is the lowest and also it is lest possible for the freezer door to be opened, the overall cooling efficiency is highest.

Industrial Applicability

In the above description, a freezer is used to illustrate the inventive concept. Obviously, the concept can be used in other applications, e.g. a fridge with or without a freezer compartment, a refrigerated display case or cabinet, a cold room, a refrigerated vehicle, vessel or aeroplane, or an air-conditioning system. The concept of using off-peak electricity can be equally applied to other kinds of low-cost electricity, such as solar, wind or tidal power, or in case of a mobile application, the ground power in contrast with the electricity supplied by an on-board generator. Other kinds of power can be used in combination, e.g. using solar power during the day and the off-peak power from national grid at night, combined with wind power whenever it is available. Other evaporable component(s), such as methanol, ethanol and/or carbon dioxide can be used in the coolant solution in case ammonia is not suitable, e.g. when a system has copper parts; the heat storage tank may not be necessary for a system in which heat dissipating is not a problem; and the ice-making/quick-freezing facility would not be needed for air-conditioning or high temperature refrigeration. In the latter case, a cold storage gel of a higher freezing temperature, which is known in the art, can be used to replace the antifreeze for storing cold energy above 0° C., suitable for air-conditioning.

It should be noted that the embodiments according to the second general object of the invention have the following patentable aspects.

1. An axial flow pump/marine propeller comprising: a hollow body; a stator in the body defining an inner space; a tubular rotor with propelling means in the inner space; and electromagnetic means for generating a rotational magnetic field in said inner space; wherein the rotor is supported by suspension means for rotational and thrust bearing to retain it at a balanced position in response to its rotational and/or axial movements.
2. An apparatus of aspect 1, wherein the rotor or the stator has spiral means formed on at least one of the surfaces defining a gap between them, for forming a peripheral flow when the rotor rotates.
3. An apparatus of any preceding aspect, further comprising sealing means at each end of the rotor to seal said gap, so that a lubricating and/or cooling liquid can be filled in the sealed gap.
4. An apparatus of aspect 3, further comprising means for supplying and circulating under a stable pressure said lubricating and/or cooling liquid in said gap.
5. An apparatus of any preceding aspect, wherein annular members of high magnetic resistance are fitted to corresponding positions on the stator and rotor to form a magnetic registration mechanism therebetween.
6. An apparatus of any preceding aspect, wherein said bearing means include magnetic suspension arrangement comprising: an electromagnet with tow annular poles and a permanent magnet with matching poles so that repelling or attracting forces can be controlled by the electric current to the electromagnet.
7. An apparatus of aspect 6, wherein the poles of the electromagnet and permanent magnet are arranged to form complementary cylindrical and/or conical surfaces so as to provide rotary and/or thrust suspension.
8. An apparatus of aspect 6 or 7, further comprising a control unit and sensing means for adjusting the electric currents supplied to the suspension arrangement to maintain the rotor's axial position.
9. An apparatus of any preceding aspect, wherein a throttle ring is fitted to an axial end of said rotor, which ring restricts the peripheral flow when the rotor moves towards that end.
10. An apparatus of any preceding aspect, wherein the suspension bearing includes flow dividing means for forming two opposite peripheral flows, so as to keep the rotor's position self-balanced.
11. An apparatus of any of the preceding aspects, wherein said propelling means includes one or more flexible spiral blades which are compressible in response to changes of power input or working load.
12. An apparatus of aspect 11, wherein said blades are biased elastically to keep them axially expanded.
13. An apparatus of any preceding aspect, wherein said propelling means includes two coaxial spiral means in opposite spiral directions so as to cancel each other's swirling effects and produce high pressure output.
14. An apparatus of aspect 13, further comprising a second set of a stator, a rotor and electromagnetic means to rotate in an opposite direction.
16. An apparatus of aspect 13 or 14, wherein the central one of said two spiral means is supported by a pivot bearing.
17. An apparatus of any of the preceding aspects, wherein said propelling means includes a conical impeller.

It should be noted that the embodiments according to the third general object of the invention have the following patentable aspects.
1. A cooling system comprising: a primary mechanism for transferring heat from a cold-generating member to a heat-rejecting member, and a circuit thermally engaged with said heat-rejecting member of said mechanism; wherein a coolant with evaporable component is circulated in said circuit which has means for promoting evaporation of said component to improve efficiency of said primary mechanism by said evaporation.
2. A system of aspect 1, wherein said circuit has endothermic salt for cooling by its endothermic dissolution.
3. A system of aspect 1 or 2, wherein said coolant includes aqueous ammonia or carbonated water.
4. A system of any preceding aspect, wherein said promoting means further comprises a thermoelectric member arranged with its cold-side engaging said heat-rejecting member and its hot-side engaging said coolant solution to provide an elevated temperature for increasing said evaporation.
5. A system of any preceding aspect, wherein said promoting means further comprises a vapour pump.
6. A system of any preceding aspect, wherein said circuit further comprises: a heat absorbing portion thermally coupled with said heat-rejecting member and a heat dissipating portion in fluid communication with said heat absorbing portion; wherein said heat absorbing portion has an upper part with a coolant outlet, an lower part with a coolant inlet, and an intermediate zone engaging said heat-rejecting member, said zone has baffle means for stabilising a temperature gradient between said upper and lower parts so that said evaporable component of said coolant can evaporate in said upper part and flow to and condense in said heat dissipating portion.
7. A system of aspect 6 in combination with aspect 2, wherein said heat absorbing portion further comprising a flow guide means which separate said intermediate zone into a first part defining an evaporation zone in thermal contact with said heat-rejecting member in which said coolant component evaporates, and a second part defining a precipitation zone separated from said heat-rejecting member but in fluid communication with said first part so that said endothermic salt in the coolant can precipitate and settle to said lower part.
8. A system of aspect 7, wherein a salt chamber is formed at said lower part of the heat absorbing portion to have said endothermic cooling effect to said heat-rejecting member.
9. A system of any preceding aspect, further comprising: a brine circuit thermally engaged with said cold-generating member for improving its heat-exchange efficiency.
10. A gas compression assembly for a system of any preceding aspect, comprising: a plurality of compressors serially connected so that a refrigerant can be progressively compressed and supplied to a refrigeration circuit; wherein said compressors are arranged as said heat-rejecting member engaging said coolant circuit so that the heat generated therein by them is absorbed and carried away by circulating said coolant.
11. An assembly of aspect 10, further comprising condenser means connected to the downstream end of said gas compression chain, and being thermally coupled with said coolant circuit.
12. A heat storage tank for a cooling system comprising a thermally conductive casing, a fluid passage with a thermally conductive and flexible wall in said casing, and at least one heat storage material filled between said casing and said fluid passage for absorbing heat from fluid passing through said passage; wherein said casing is divided into chambers of different heat storage materials, and wherein the chamber at the up-stream end of said fluid passage has a phase-change material of a fusion point higher than that of the material in the chamber at the down-stream end of said fluid passage.
13. A defrosting arrangement comprising a thermoelectric member with a thermal pole coupled to a cold-generating member of a cooling system and the other thermal pole to a heat exchange member, and a control unit for changing electric supply to said thermoelectric member to reverse the heat transfer direction, therefore selectively changing said heat exchange member from a frost accumulating mode to a defrosting mode.
14. An arrangement of aspect 13, further comprising means for sensing the amount of ice accumulated onto said heat exchange member and indicating the same to said control unit.
15. An arrangement of aspect 13 or 14, further comprising means for collecting ice expelled during its defrosting operation, including a hinged mechanism for delivering ice to a pocket.
16. A method of operating a cooling system having an antifreeze circuit, comprising steps of: a) setting a mode control unit for selecting one of two operational modes in response to the availability of low cost electricity; b) operating in a first mode when said low cost electricity is not available, to cool said antifreeze to a temperature under which it can be circulated; and c) operating in a second mode when said low cost electricity is available, to freeze said antifreeze so as to store cold energy therein.

17. A method of aspect 16, further comprising a step of: d) causing an air circulation within a cooled space during the operation of said second mode; or e) causing frost accumulation on a heat exchange member associated with a thermoelectric member; and f) causing defrosting by reversing the operation of said thermoelectric member.

What I claim is:

1. A linear motor comprising:

two opposing magnetic driving means;

reciprocating means disposed between said two driving means; and means for energising said driving and/or reciprocating means;

wherein each said driving means has an outer pole of a first polarity and a coaxial inner pole of a second polarity located within said outer pole, and said reciprocating means has complementary poles so that when energised, said two driving means produce onto said reciprocating means a push-and-pull driving force pair to cause its linear movement.

2. A linear motor compressor comprising:

cylinder means fitted at its two ends with two opposing magnetic driving means to define an inner space therein;

reciprocating means disposed in said inner space between said two driving means;

valve means for one-way flow into and out of said inner space; and means for energising said driving and/or reciprocating means;

wherein each said driving means has an outer pole of a first polarity and a coaxial inner pole of a second polarity located in said outer pole, and said reciprocating means has complementary poles so that when energised, said two driving means produce onto said reciprocating means a push-and-pull driving force pair to cause its linear movement.

3. An apparatus of claim 1, wherein said driving means are electromagnets and said reciprocating means has permanent magnet.

4. An apparatus of claim 1, wherein the poles of said reciprocating means are electromagnetic.

5. An apparatus of claim 1, wherein said poles of said driving and reciprocating means are annular with substantially conical pole face portions to match one another.

6. An apparatus of claim 1, wherein said reciprocating means carries two magnets, each forms the inner and outer poles facing one of said two driving means.

7. An apparatus of claim 1, wherein said reciprocating means has a magnet with radially directed poles.

8. An apparatus of claim 7, wherein said magnet has inner and outer pole pieces providing pole faces facing said driving means and said magnet is biased relative to said inner and/or outer pole pieces.

9. An apparatus of claim 7, wherein said reciprocating means has a movable magnetic shunt mechanism for regulating magnetic flux to said driving means.

10. An apparatus of claim 9, further comprising secondary permanent magnet means fitted to each axial end of said shunt mechanism and/or said outer pole piece.

11. An apparatus of claim 1, wherein said reciprocating and driving means are protected by buffer means including seal for fluid cushioning, spring for elastic cushioning and/or magnetic cushion means.

12. An apparatus of claim 11, wherein said buffer means are adapted to balance said reciprocating means's axial movements.

13. An apparatus of claim 1, further comprising magnetic coupling means with movable means for selectively adjusting each driving means's magnetic flux.

14. An apparatus of claim 1, further comprising means for detecting the position of said reciprocating means and means for adjusting current accordingly.

15. An apparatus of claim 1, further comprising movable means for supporting at least one said driving means and means for biasing its position in response to load on said reciprocating means.

16. An apparatus of claim 1, further comprising capillary means for circulating a lubricant.

17. An apparatus of claim 2, wherein said driving means are electromagnets and said reciprocating means has permanent magnet.

18. An apparatus of claim 2, wherein the poles of said reciprocating means are electromagnetic.

19. An apparatus of claim 2, wherein said poles of said driving and reciprocating means are annular with substantially conical pole face portions to match one another.

20. An apparatus of claim 2, wherein said reciprocating means carries two magnets, each forms the inner and outer poles facing one of said two driving means.

21. An apparatus of claim 2, wherein said reciprocating means has a magnet with radially directed poles.

22. An apparatus of claim 21, wherein said magnet has inner and outer pole pieces providing pole faces facing said driving means and said magnet is biased relative to said inner and/or outer pole pieces.

23. An apparatus of claim 21, wherein said reciprocating means has a movable magnetic shunt mechanism for regulating magnetic flux to said driving means.

24. An apparatus of claim 23, further comprising secondary permanent magnet means fitted to each axial end of said shunt mechanism and/or said outer pole piece.

25. An apparatus of claim 2, wherein said reciprocating and driving means are protected by buffer means including seal for fluid cushioning, spring for elastic cushioning and/or magnetic cushion means.

26. An apparatus of claim 25, wherein said buffer means are adapted to balance said reciprocating means's axial movements.

27. An apparatus of claim 2, further comprising magnetic coupling means with movable means for selectively adjusting each driving means's magnetic flux.

28. An apparatus of claim 2, further comprising means for detecting the position of said reciprocating means and means for adjusting current accordingly.

29. An apparatus of claim 2, further comprising movable means for supporting at least one said driving means and means for biasing its position in response to load on said reciprocating means.

30. An apparatus of claim 2, further comprising capillary means for circulating a lubricant.

31. An apparatus of claim 2, wherein said reciprocating means has fluid passage means and/or magnetic means for causing it to rotate during its reciprocating movements.

* * * * *